US012548282B2

(12) United States Patent
Sakurabu

(10) Patent No.: US 12,548,282 B2
(45) Date of Patent: Feb. 10, 2026

(54) IMAGING SUPPORT APPARATUS, IMAGING APPARATUS, IMAGING SUPPORT METHOD, AND PROGRAM

(71) Applicant: FUJIFILM CORPORATION, Tokyo (JP)

(72) Inventor: Hitoshi Sakurabu, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 229 days.

(21) Appl. No.: 18/336,027

(22) Filed: Jun. 16, 2023

(65) Prior Publication Data
US 2023/0326170 A1    Oct. 12, 2023

Related U.S. Application Data

(63) Continuation of application No. PCT/JP2021/047375, filed on Dec. 21, 2021.

(30) Foreign Application Priority Data

Dec. 28, 2020  (JP) .................................. 2020-219151

(51) Int. Cl.
G06V 10/26     (2022.01)
G06V 10/25     (2022.01)

(52) U.S. Cl.
CPC .............. *G06V 10/26* (2022.01); *G06V 10/25* (2022.01)

(58) Field of Classification Search
CPC . G02B 7/08; G02B 7/28; G03B 13/36; G03B 15/00; G03B 17/18; G06T 7/00; G06V 10/25; G06V 10/26; G06V 10/82; G06V 40/161; H04N 23/60
See application file for complete search history.

(56) References Cited

U.S. PATENT DOCUMENTS

| 2004/0234260 | A1  | 11/2004 | Arai et al. |
| 2018/0068198 | A1* | 3/2018  | Savvides ............... G06V 40/161 |
| 2019/0050994 | A1  | 2/2019  | Fukagai |
| 2019/0122064 | A1* | 4/2019  | Ishikawa ................ H04N 23/80 |
| 2020/0065936 | A1  | 2/2020  | Ueyama |

(Continued)

FOREIGN PATENT DOCUMENTS

| CN | 110679140 A  | 1/2020 |
| JP | 2010-109671 A | 5/2010 |

(Continued)

OTHER PUBLICATIONS

International Search Report issued in International Application No. PCT/JP2021/047375, on Apr. 5, 2022.

(Continued)

*Primary Examiner* — Michael J Vanchy, Jr.
(74) *Attorney, Agent, or Firm* — SOLARIS Intellectual Property Group, PLLC

(57) ABSTRACT

There is provided an imaging support apparatus including a processor and a memory connected to or built into the processor. The processor is configured to acquire a type of a subject based on an image obtained by capturing an imaging range, which includes the subject, with an image sensor, and output information indicating a division method for dividing a divided region, where the subject is divided to be identifiable from other regions in the imaging range, according to the acquired type.

25 Claims, 38 Drawing Sheets

(56) References Cited

U.S. PATENT DOCUMENTS

2020/0068107 A1　2/2020　Masuda et al.
2020/0099853 A1　3/2020　Sanno

FOREIGN PATENT DOCUMENTS

| JP | 2012-128287 A | 7/2012 |
| JP | 2015-046917 A | 3/2015 |
| JP | 2018-005555 A | 1/2018 |
| JP | 2019-036009 A | 3/2019 |
| JP | 2019-109843 A | 7/2019 |
| JP | 2020-036091 A | 3/2020 |
| JP | 2020-053720 A | 4/2020 |

OTHER PUBLICATIONS

Written Opinion of the ISA issued in International Application No. PCT/JP2021/047375, on Apr. 5, 2022.

English language translation of the following: Office action dated May 21, 2024 from the JPO in a Japanese patent application No. 2022-573013 corresponding to the instant patent application.

English language translation of the following: Office action dated Oct. 22, 2024 from the JPO in a Japanese patent application No. 2022-573013 corresponding to the instant patent application.

English language translation of the following: Decision of Refusal dated Jan. 14, 2025 from the JPO in a Japanese patent application No. 2022-573013 corresponding to the instant patent application.

English language translation of the following: Office action dated Nov. 21, 2025 from the SIPO in a Chinese patent application No. 202180087855.0 corresponding to the instant patent application. This office action translation is submitted now in order to supplement the understanding of the cited references which are being disclosed in the instant Information Disclosure Statement.

* cited by examiner

FIG. 1
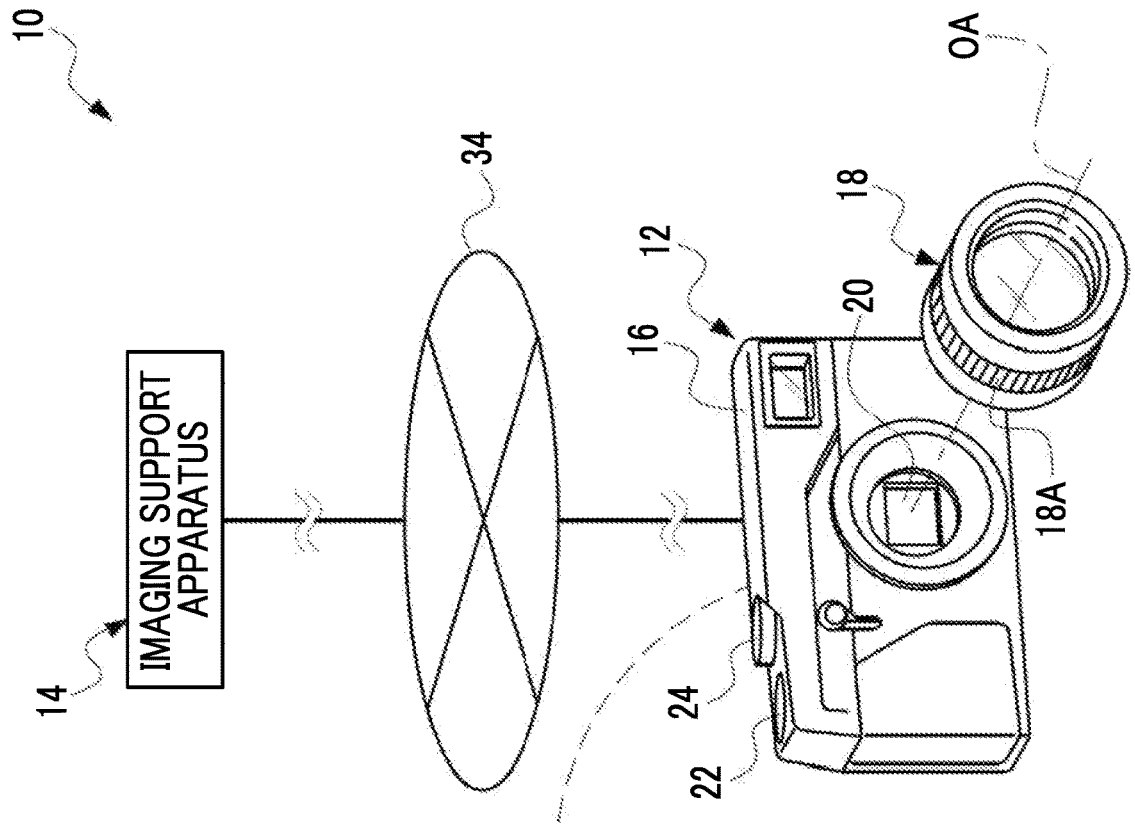
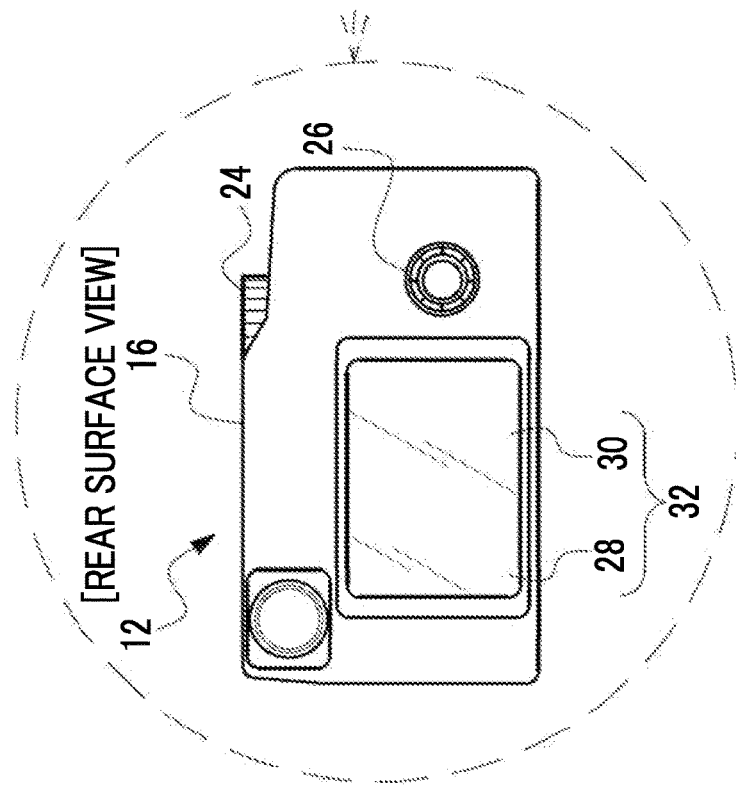

IMAGING SUPPORT APPARATUS, IMAGING APPARATUS, IMAGING SUPPORT METHOD, AND PROGRAM

CROSS-REFERENCE TO RELATED APPLICATIONS

This application is a continuation application of International Application No. PCT/JP2021/047375, filed Dec. 21, 2021, the disclosure of which is incorporated herein by reference in its entirety. Further, this application claims priority under 35 USC 119 from Japanese Patent Application No. 2020-219151, filed Dec. 28, 2020, the disclosure of which is incorporated herein by reference in its entirety.

BACKGROUND

1. Technical Field of the Invention

The present invention relates to an imaging support apparatus, an imaging apparatus, an imaging support method, and a program.

2. Related Art

JP2015-046917A discloses imaging apparatus including: an imaging unit that captures a subject image formed through an imaging lens and outputs image data; a focusing determination unit that performs weighting, which is determined according to at least one of a focus position of a subject and the feature of a subject region and that determines the order of focusing from which region to which region in the captured image according to the result of the weighting; a focusing control unit that drives the imaging lens according to the order of the focusing determined by the focusing determination unit; and a recording unit that records image data of moving images and still images based on the image data, in which the focusing determination unit determines a main subject/sub-subject or a main region/sub-region according to the result of weighting and determines the order of the focusing with one of the main subject/sub-subject or the main region/sub-region as a starting point and the other as an ending point, and the recording unit records the image data of the moving images while the imaging lens is driven by the focusing control unit and records the image data of the still images after the driving of the imaging lens is stopped by the focusing control unit.

JP2012-128287A discloses a focus detection apparatus including: a face detection unit that detects a position and a size, in which a person's face is present, from a captured image; a setting unit that sets a first focus detection region, where a person's face is present as a focus detection region in a case where a focused state is detected from an imaging optical system, and a second focus detection region, where a person's body is predicted to be positioned in a case where viewed from the position of the person's face; and a focus adjustment unit that moves the imaging optical system based on a signal output in the focus detection region and that performs focus adjustment, in which the setting unit sets the size of the second focus detection region to be larger than the size of the first focus detection region in a case where the size of the face detected by the face detection unit is smaller than a predetermined size.

SUMMARY

One embodiment according to the technique of the present disclosure provides an imaging support apparatus, an imaging apparatus, an imaging support method, and a program capable of accurately performing control related to imaging on a subject by an image sensor.

An imaging support apparatus according to a first aspect of the present invention comprises: a processor; and a memory connected to or built into the processor, in which the processor is configured to acquire a type of a subject based on an image obtained by capturing an imaging range, which includes the subject, with an image sensor, and output information indicating a division method for dividing a divided region, where the subject is divided to be identifiable from other regions in the imaging range, according to the acquired type.

In the imaging support apparatus of the first aspect according to a second aspect of the present invention, the processor is configured to acquire the type based on an output result, which is output from a trained model in which machine learning is performed by providing the image to the trained model.

In the imaging support apparatus of the second aspect according to a third aspect of the present invention, the trained model makes an object, which is within a bounding box applied to the image, belong to a corresponding class, and the output result includes a value based on a probability that the object, which is within the bounding box applied to the image, belongs to a specific class.

In the imaging support apparatus of the third aspect according to a fourth aspect of the present invention, the output result includes a value based on a probability that the object, which is within the bounding box, belongs to a specific class in a case where a value, which is based on a probability that an object is present within the bounding box, is equal to or larger than a first threshold value.

In the imaging support apparatus of the third or fourth aspect according to a fifth aspect of the present invention, the output result includes a value equal to or larger than a second threshold value, among the values based on the probability that the object belongs to the specific class.

In the imaging support apparatus of any one of the third to fifth aspects according to a sixth aspect of the present invention, the processor is configured to expand the bounding box in a case where a value, which is based on a probability that the object is present within the bounding box, is less than a third threshold value.

In the imaging support apparatus of any one of the third to sixth aspects according to a seventh aspect of the present invention, the processor is configured to change a size of the divided region according to the value based on the probability that the object belongs to the specific class.

In the imaging support apparatus of any one of the second to seventh aspects according to an eighth aspect of the present invention, a plurality of subjects is included in the imaging range, the trained model makes each of a plurality of objects, which is within a plurality of bounding boxes applied to the image, belong to a corresponding class, the output result includes object specific class information indicating each of the classes to which the plurality of objects, which is within the plurality of bounding boxes applied to the image, belongs, and the processor is configured to narrow down at least one subject to be surrounded by the divided region from the plurality of subjects based on the object specific class information.

In the imaging support apparatus of any one of the first to eighth aspects according to a ninth aspect of the present invention, the division method defines the number of divisions into which the divided region is divided.

In the imaging support apparatus of the ninth aspect according to a tenth aspect of the present invention, the divided region is defined with a first direction and a second direction that intersects with the first direction, and the division method defines the number of divisions in the first direction and the number of divisions in the second direction.

In the imaging support apparatus of any one of the first to tenth aspects according to an eleventh aspect of the present invention, the number of divisions in the first direction and the number of divisions in the second direction are defined based on a composition in the image of a subject image showing the subject in the image.

In the imaging support apparatus of any one of the ninth to eleventh aspects according to a twelfth aspect of the present invention, in a case where a focus of a focus lens, which guides an incident light to the image sensor, is adjustable by moving the focus lens along an optical axis, the processor is configured to output information used for contributing to moving the focus lens to a focusing position corresponding to a division region obtained in accordance with the acquired type among a plurality of division regions obtained by dividing the divided region by the number of divisions.

In the imaging support apparatus of any one of the first to twelfth aspects according to a thirteenth aspect of the present invention, in a case where a focus of a focus lens, which guides an incident light to the image sensor, is adjustable by moving the focus lens along an optical axis, the processor is configured to output information used for contributing to moving the focus lens to a focusing position obtained in accordance with the acquired type.

In the imaging support apparatus of any one of the first to thirteenth aspects according to a fourteenth aspect of the present invention, the divided region is used for control related to imaging on the subject by the image sensor.

In the imaging support apparatus of the fourteenth aspect according to a fifteenth aspect of the present invention, the control related to the imaging includes custom type control, the custom type control has a recommendation of changing a control content of the control related to the imaging according to the subject and is control for changing the control content in response to a provided instruction, and the processor is configured to output information used for contributing to changing the control content according to the acquired type.

In the imaging support apparatus of the fifteenth aspect according to a sixteenth aspect of the present invention, the processor is configured to further acquire a state of the subject based on the image, and output the information used for contributing to changing the control content according to the acquired state and type.

In the imaging support apparatus of the fifteenth or sixteenth aspect according to a seventeenth aspect of the present invention, in a case where a focus of a focus lens, which guides an incident light to the image sensor, is adjustable by moving the focus lens along an optical axis, the custom type control is control that includes at least one of control for moving the focus lens toward a focusing position, where the focus is set on the subject, after waiting for a predetermined time in a case where a position of the focus lens is out of the focusing position, control for setting an allowable range of speed of the subject on which the focus is set, and control for setting which area, among a plurality of areas in the divided region, is prioritized for adjustment of the focus.

In the imaging support apparatus of any one of the first to seventeenth aspects according to an eighteenth aspect of the present invention, the divided region is a frame surrounding the subject.

In the imaging support apparatus of the eighteenth aspect according to a nineteenth aspect of the present invention, the processor is configured to display a live view image based on the image, on a display, and output information used for displaying the frame in the live view image.

In the imaging support apparatus of the eighteenth or nineteenth aspect according to a twentieth aspect of the present invention, the processor is configured to adjust a focus of a focus lens, which guides an incident light to the image sensor, by moving the focus lens along an optical axis, and the frame is a focus frame for defining an area as a candidate on which the focus is set.

An imaging apparatus according to a twenty-first aspect of the present invention comprises: a processor; a memory connected to or built into the processor; and an image sensor, in which the processor is configured to acquire a type of a subject based on an image obtained by capturing an imaging range, which includes the subject, with the image sensor, and output information indicating a division method for dividing a divided region, where the subject is divided to be identifiable from other regions in the imaging range, according to the acquired type.

An imaging support method according to a twenty-second aspect of the present invention comprises: acquiring a type of a subject based on an image obtained by capturing an imaging range, which includes the subject, with an image sensor, and outputting information indicating a division method for dividing a divided region, where the subject is divided to be identifiable from other regions in the imaging range, according to the acquired type.

A program causing a computer to execute a process according to a twenty-third aspect of the present invention comprises: acquiring a type of a subject based on an image obtained by capturing an imaging range, which includes the subject, with an image sensor, and outputting information indicating a division method for dividing a divided region, where the subject is divided to be identifiable from other regions in the imaging range, according to the acquired type.

BRIEF DESCRIPTION OF THE DRAWINGS

Exemplary embodiments of the technology of the disclosure will be described in detail based on the following figures, wherein:

FIG. 1 is a schematic configuration diagram showing an example of a configuration of an entire imaging system;

DETAILED DESCRIPTION

Figure 2:
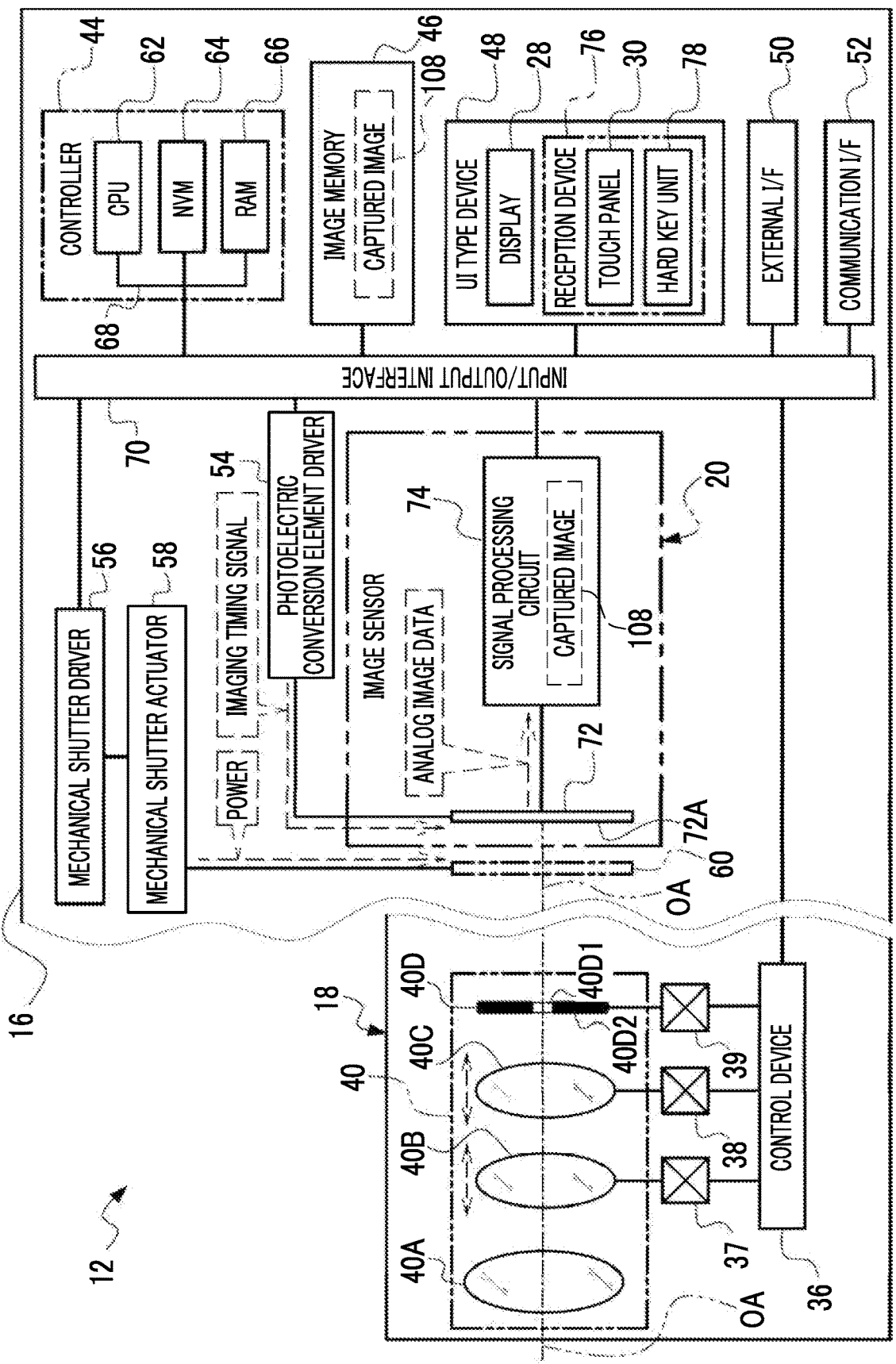
FIG. 2 is a schematic configuration diagram showing an example of hardware configurations of an optical system and an electrical system of an imaging apparatus included in the imaging system.

Hereinafter, an example of an embodiment of an imaging support apparatus, an imaging apparatus, an imaging support method, and a program according to the present disclosed technology will be described with reference to the accompanying drawings.

First, the wording used in the following description will be described.

CPU refers to an abbreviation of a "Central Processing Unit". GPU refers to an abbreviation of a "Graphics Processing Unit". TPU refers to an abbreviation of a "Tensor processing unit". NVM refers to an abbreviation of a "Non-volatile memory". RAM refers to an abbreviation of a "Random Access Memory". IC refers to an abbreviation of an "Integrated Circuit". ASIC refers to an abbreviation of an "Application Specific Integrated Circuit". PLD refers to an abbreviation of a "Programmable Logic Device". FPGA refers to an abbreviation of a "Field-Programmable Gate Array". SoC refers to an abbreviation of a "System-on-a-chip". SSD refers to an abbreviation of a "Solid State Drive". USB refers to an abbreviation of a "Universal Serial Bus". HDD refers to an abbreviation of a "Hard Disk Drive". EEPROM refers to an abbreviation of an "Electrically Erasable and Programmable Read Only Memory". EL refers to an abbreviation of "Electro-Luminescence". I/F refers to an abbreviation of an "Interface". UI refers to an abbreviation of a "User Interface". fps refers to an abbreviation of a "frame per second". MF refers to an abbreviation of "Manual Focus". AF refers to an abbreviation of "Auto Focus". CMOS refers to an abbreviation of a "Complementary Metal Oxide Semiconductor". LAN refers to an abbreviation of a "Local Area Network". WAN refers to an abbreviation of a "Wide Area Network". CNN refers to an abbreviation of a "Convolutional Neural Network". AI refers to an abbreviation of "Artificial Intelligence". TOF refers to an abbreviation of "Time Of Flight".

In the description of the present specification, the "vertical" indicates a vertical in the sense of including an error generally allowed in the technical field, to which the present disclosed technology belongs, in addition to the perfect vertical, and an error that does not go against the gist of the present disclosed technology. In the description of the present specification, the "orthogonal" indicates an orthogonal in the sense of including an error generally allowed in the technical field, to which the present disclosed technology belongs, in addition to the perfect orthogonal, and an error that does not go against the gist of the present disclosed technology. In the description of the present specification, the "parallel" indicates a parallel in the sense of including an error generally allowed in the technical field, to which the present disclosed technology belongs, in addition to the perfect parallel, and an error that does not go against the gist of the present disclosed technology. In the description of the present specification, the "coincidence" indicates a coincidence in the sense of including an error generally allowed in the technical field, to which the present disclosed technology belongs, in addition to the perfect coincidence, and an error that does not go against the gist of the present disclosed technology.

As an example shown in FIG. 1, the imaging system 10 includes an imaging apparatus 12 and an imaging support apparatus 14. The imaging apparatus 12 is an apparatus that images a subject. In the example shown in FIG. 1, a lens-interchangeable digital camera is shown as an example of the imaging apparatus 12. The imaging apparatus 12 includes an imaging apparatus main body 16 and an interchangeable lens 18. The interchangeable lens 18 is interchangeably attached to the imaging apparatus main body 16. The interchangeable lens 18 is provided with a focus ring 18A. In a case where a user or the like of the imaging apparatus 12 (hereinafter, simply referred to as the "user") manually adjusts the focus on the subject by the imaging apparatus 12, the focus ring 18A is operated by the user or the like.

In the present embodiment, although the lens-interchangeable digital camera is exemplified as the imaging apparatus 12, this is only an example, and a digital camera with a fixed lens may be used or a digital camera, which is built into various electronic devices such as a smart device, a wearable terminal, a cell observation device, an ophthalmologic observation device, or a surgical microscope may be used.

An image sensor 20 is provided in the imaging apparatus main body 16. The image sensor 20 is a CMOS image sensor. The image sensor 20 captures an imaging range including at least one subject. In a case where the interchangeable lens 18 is attached to the imaging apparatus main body 16, subject light indicating the subject is transmitted through the interchangeable lens 18 and formed image on the image sensor 20, and then image data indicating an image of the subject is generated by the image sensor 20. The subject light is an example of "incident light" according to the present disclosed technology.

In the present embodiment, although the CMOS image sensor is exemplified as the image sensor 20, the present disclosed technology is not limited to this, and other image sensors may be used.

A release button 22 and a dial 24 are provided on an upper surface of the imaging apparatus main body 16. The dial 24 is operated in a case where an operation mode of the imaging system, an operation mode of a playback system, and the like are set, and by operating the dial 24, an imaging mode and a playback mode are selectively set as the operation mode in the imaging apparatus 12.

The release button 22 functions as an imaging preparation instruction unit and an imaging instruction unit, and is capable of detecting a two-step pressing operation of an imaging preparation instruction state and an imaging instruction state. The imaging preparation instruction state refers to a state in which the release button 22 is pressed, for example, from a standby position to an intermediate position (half pressed position), and the imaging instruction state refers to a state in which the release button 22 is pressed to a final pressed position (fully pressed position) beyond the intermediate position. In the following, the "state of being pressed from the standby position to the half pressed position" is referred to as a "half pressed state", and the "state of being pressed from the standby position to the fully pressed position" is referred to as a "fully pressed state". Depending on the configuration of the imaging apparatus 12, the imaging preparation instruction state may be a state in which the user's finger is in contact with the release button 22, and the imaging instruction state may be a state in which the operating user's finger is moved from the state of being in contact with the release button 22 to the state of being away from the release button 22.

A touch panel display 32 and an instruction key 26 are provided on a rear surface of the imaging apparatus main body 16.

The touch panel display 32 includes a display 28 and a touch panel 30 (see also FIG. 2). Examples of the display 28 include an EL display (for example, an organic EL display or an inorganic EL display). The display 28 may not be an EL display but may be another type of display such as a liquid crystal display.

The display 28 displays image and/or character information and the like. The display 28 is used for imaging for a live view image, that is, for displaying a live view image 130 (see FIG. 16) obtained by performing the continuous imaging in a case where the imaging apparatus 12 is in the imaging mode. The imaging, which is performed to obtain the live view image 130 (see FIG. 16) (hereinafter, also referred to as "imaging for a live view image"), is performed according to, for example, a frame rate of 60 fps. 60 fps is only an example, and a frame rate of fewer than 60 fps may be used, or a frame rate of more than 60 fps may be used.

Here, the "live view image" refers to a moving image for display based on the image data obtained by being imaged by the image sensor 20. The live view image is also commonly referred to as a through image.

The display 28 is also used for displaying a still image obtained by the performance of the imaging for a still image in a case where an instruction for performing the imaging for a still image is provided to the imaging apparatus 12 via the release button 22. The display 28 is also used for displaying a playback image and displaying a menu screen or the like in a case where the imaging apparatus 12 is in the playback mode.

The touch panel 30 is a transmissive touch panel and is superimposed on a surface of a display region of the display 28. The touch panel 30 receives the instruction from the user by detecting contact with an indicator such as a finger or a stylus pen. In the following, for convenience of explanation, the above-mentioned "fully pressed state" includes a state in which the user turns on a softkey for starting the imaging via the touch panel 30.

Further, in the present embodiment, although an out-cell type touch panel display in which the touch panel 30 is superimposed on the surface of the display region of the display 28 is exemplified as an example of the touch panel display 32, this is only an example. For example, as the touch panel display 32, an on-cell type or in-cell type touch panel display can be applied.

The instruction key 26 receives various instructions. Here, the "various instructions" refer to, for example, various instructions such as an instruction for displaying the menu screen from which various menus can be selected, an instruction for selecting one or a plurality of menus, an instruction for confirming a selected content, an instruction for erasing the selected content, zooming in, zooming out, frame forwarding, and the like. Further, these instructions may be provided by the touch panel 30.

As will be described in detail later, the imaging apparatus main body 16 is connected to the imaging support apparatus 14 via a network 34. The network 34 is, for example, the Internet. The network 34 is not limited to the Internet and may be a WAN and/or a LAN such as an intranet. Further, in the present embodiment, the imaging support apparatus 14 is a server that provides the imaging apparatus 12 with a service in response to a request from the imaging apparatus 12. The server may be a mainframe used on-premises together with the imaging apparatus 12 or may be an external server implemented by cloud computing. Further, the server may be an external server implemented by network computing such as fog computing, edge computing, or grid computing. Here, although a server is exemplified as an example of the imaging support apparatus 14, this is only an example, and at least one personal computer or the like may be used as the imaging support apparatus 14 instead of the server.

As an example shown in FIG. 2, the image sensor 20 includes photoelectric conversion elements 72. The photoelectric conversion elements 72 have a light receiving surface 72A. The photoelectric conversion elements 72 are disposed in the imaging apparatus main body 16 such that the center of the light receiving surface 72A and an optical axis OA coincide with each other (see also FIG. 1). The photoelectric conversion elements 72 have a plurality of photosensitive pixels arranged in a matrix shape, and the light receiving surface 72A is formed by the plurality of photosensitive pixels. The photosensitive pixel is a physical pixel having a photodiode (not shown), which photoelectrically converts the received light and outputs an electric signal according to the light receiving amount.

The interchangeable lens 18 includes an imaging lens 40. The imaging lens 40 has an objective lens 40A, a focus lens 40B, a zoom lens 40C, and a stop 40D. The objective lens 40A, the focus lens 40B, the zoom lens 40C, and the stop 40D are disposed in the order of the objective lens 40A, the focus lens 40B, the zoom lens 40C, and the stop 40D along the optical axis OA from the subject side (object side) to the imaging apparatus main body 16 side (image side).

Further, the interchangeable lens 18 includes a control device 36, a first actuator 37, a second actuator 38, and a third actuator 39. The control device 36 controls the entire interchangeable lens 18 according to the instruction from the imaging apparatus main body 16. The control device 36 is a device having a computer including, for example, a CPU, an NVM, a RAM, and the like. Although a computer is exemplified here, this is only an example, and a device including an ASIC, FPGA, and/or PLD may be applied. Further, as the control device 36, for example, a device implemented by a combination of a hardware configuration and a software configuration may be used.

The first actuator 37 includes a slide mechanism for focus (not shown) and a motor for focus (not shown). The focus lens 40B is attached to the slide mechanism for focus so as to be slidable along the optical axis OA. Further, the motor for focus is connected to the slide mechanism for focus, and the slide mechanism for focus operates by receiving the power of the motor for focus to move the focus lens 40B along the optical axis OA.

The second actuator 38 includes a slide mechanism for zoom (not shown) and a motor for zoom (not shown). The zoom lens 40C is attached to the slide mechanism for zoom so as to be slidable along the optical axis OA. Further, the motor for zoom is connected to the slide mechanism for zoom, and the slide mechanism for zoom operates by receiving the power of the motor for zoom to move the zoom lens 40C along the optical axis OA.

The third actuator 39 includes a power transmission mechanism (not shown) and a motor for stop (not shown). The stop 40D has an opening 40D1 and is a stop in which the size of the opening 40D1 is variable. The opening 40D1 is formed by a plurality of stop leaf blades 40D2. The plurality of stop leaf blades 40D2 are connected to the power transmission mechanism. Further, the motor for stop is connected to the power transmission mechanism, and the power transmission mechanism transmits the power of the motor for stop to the plurality of stop leaf blades 40D2. The plurality of stop leaf blades 40D2 receives the power that is transmitted from the power transmission mechanism and changes the size of the opening 40D1 by being operated. The stop 40D adjusts the exposure by changing the size of the opening 40D1.

The motor for focus, the motor for zoom, and the motor for stop are connected to the control device 36, and the control device 36 controls each drive of the motor for focus, the motor for zoom, and the motor for stop. In the present embodiment, a stepping motor is adopted as an example of the motor for focus, the motor for zoom, and the motor for stop. Therefore, the motor for focus, the motor for zoom, and the motor for stop operate in synchronization with a pulse signal in response to a command from the control device 36. Although an example in which the motor for focus, the motor for zoom, and the motor for stop are provided in the interchangeable lens 18 has been described here, this is only an example, and at least one of the motor for focus, the motor for zoom, or the motor for stop may be provided in the imaging apparatus main body 16. The constituent and/or operation method of the interchangeable lens 18 can be changed as needed.

In the imaging apparatus 12, in the case of the imaging mode, an MF mode and an AF mode are selectively set according to the instructions provided to the imaging apparatus main body 16. The MF mode is an operation mode for manually focusing. In the MF mode, for example, by operating the focus ring 18A or the like by the user, the focus lens 40B is moved along the optical axis OA with the movement amount according to the operation amount of the focus ring 18A or the like, thereby the focus is adjusted.

In the AF mode, the imaging apparatus main body 16 calculates a focusing position according to a subject distance and adjusts the focus by moving the focus lens 40B toward the calculated focusing position. Here, the focusing position refers to a position of the focus lens 40B on the optical axis OA in a state of being in focus. In the following, for convenience of explanation, the control for aligning the focus lens 40B with the focusing position is also referred to as "AF control".

The imaging apparatus main body 16 includes the image sensor 20, a controller 44, an image memory 46, a UI type device 48, an external I/F 50, a communication I/F 52, a photoelectric conversion element driver 54, a mechanical shutter driver 56, a mechanical shutter actuator 58, a mechanical shutter 60, and an input/output interface 70. Further, the image sensor 20 includes the photoelectric conversion elements 72 and a signal processing circuit 74.

The controller 44, the image memory 46, the UI type device 48, the external I/F 50, the photoelectric conversion element driver 54, the mechanical shutter driver 56, and the signal processing circuit 74 are connected to the input/output interface 70. Further, the control device 36 of the interchangeable lens 18 is also connected to the input/output interface 70.

The controller 44 includes a CPU 62, an NVM 64, and a RAM 66. The CPU 62, the NVM 64, and the RAM 66 are connected via a bus 68, and the bus 68 is connected to the input/output interface 70.

In the example shown in FIG. 2, one bus is shown as the bus 68 for convenience of illustration, but a plurality of buses may be used. The bus 68 may be a serial bus or may be a parallel bus including a data bus, an address bus, a control bus, and the like.

The NVM 64 is a non-temporary storage medium that stores various parameters and various programs. For example, the NVM 64 is an EEPROM. However, this is only an example, and an HDD and/or SSD or the like may be applied as the NVM 64 instead of or together with the EEPROM. Further, the RAM 66 temporarily stores various information and is used as a work memory.

The CPU 62 reads a necessary program from the NVM 64 and executes the read program in the RAM 66. The CPU 62 controls the entire imaging apparatus 12 according to the program executed on the RAM 66. In the example shown in FIG. 2, the image memory 46, the UI type device 48, the external I/F 50, the communication I/F 52, the photoelectric conversion element driver 54, the mechanical shutter driver 56, and the control device 36 are controlled by the CPU 62.

The photoelectric conversion element driver 54 is connected to the photoelectric conversion elements 72. The photoelectric conversion element driver 54 supplies an imaging timing signal, which defines the timing of the imaging performed by the photoelectric conversion elements 72, to the photoelectric conversion elements 72 according to an instruction from the CPU 62. The photoelectric conversion elements 72 perform reset, exposure, and output of an electric signal according to the imaging timing signal supplied from the photoelectric conversion element driver 54. Examples of the imaging timing signal include a vertical synchronization signal, and a horizontal synchronization signal.

In a case where the interchangeable lens 18 is attached to the imaging apparatus main body 16, the subject light incident on the imaging lens 40 is formed image on the light receiving surface 72A by the imaging lens 40. Under the control of the photoelectric conversion element driver 54, the photoelectric conversion elements 72 photoelectrically convert the subject light, which is received from the light receiving surface 72A and output the electric signal corresponding to the amount of light of the subject light to the signal processing circuit 74 as analog image data indicating the subject light. Specifically, the signal processing circuit 74 reads the analog image data from the photoelectric conversion elements 72 in units of one frame and for each horizontal line by using an exposure sequential reading method.

The signal processing circuit 74 generates digital image data by digitizing the analog image data. In the following, for convenience of explanation, in a case where it is not necessary to distinguish between digital image data to be internally processed in the imaging apparatus main body 16 and an image indicated by the digital image data (that is, an image that is visualized based on the digital image data and displayed on the display 28 or the like), it is referred to as a "captured image 108".

The mechanical shutter 60 is a focal plane shutter and is disposed between the stop 40D and the light receiving surface 72A. The mechanical shutter 60 includes a front curtain (not shown) and a rear curtain (not shown). Each of the front curtain and the rear curtain includes a plurality of leaf blades. The front curtain is disposed closer to the subject side than the rear curtain.

The mechanical shutter actuator 58 is an actuator having a link mechanism (not shown), a solenoid for a front curtain (not shown), and a solenoid for a rear curtain (not shown). The solenoid for a front curtain is a drive source for the front curtain and is mechanically connected to the front curtain via the link mechanism. The solenoid for a rear curtain is a drive source for the rear curtain and is mechanically connected to the rear curtain via the link mechanism. The mechanical shutter driver 56 controls the mechanical shutter actuator 58 according to the instruction from the CPU 62.

The solenoid for a front curtain generates power under the control of the mechanical shutter driver 56 and selectively performs winding up and pulling down the front curtain by applying the generated power to the front curtain. The solenoid for a rear curtain generates power under the control of the mechanical shutter driver 56 and selectively performs winding up and pulling down the rear curtain by applying the generated power to the rear curtain. In the imaging apparatus 12, the exposure amount with respect to the photoelectric conversion elements 72 is controlled by controlling the opening and closing of the front curtain and the opening and closing of the rear curtain by the CPU 62.

In the imaging apparatus 12, the imaging for a live view image and the imaging for a recorded image for recording the still image and/or the moving image are performed by using the exposure sequential reading method (rolling shutter method). The image sensor 20 has an electronic shutter function, and the imaging for a live view image is implemented by achieving an electronic shutter function without operating the mechanical shutter 60 in a fully open state.

In contrast to this, the imaging accompanied by the main exposure, that is, the imaging for a still image is implemented by achieving the electronic shutter function and operating the mechanical shutter 60 so as to shift the mechanical shutter 60 from a front curtain closed state to a rear curtain closed state.

The image memory 46 stores the captured image 108 generated by the signal processing circuit 74. That is, the signal processing circuit 74 stores the captured image 108 in the image memory 46. The CPU 62 acquires a captured image 108 from the image memory 46 and executes various processes by using the acquired captured image 108.

The UI type device 48 includes a display 28, and the CPU 62 displays various information on the display 28. Further, the UI type device 48 includes a reception device 76. The reception device 76 includes a touch panel 30 and a hard key unit 78. The hard key unit 78 is a plurality of hard keys including an instruction key 26 (see FIG. 1). The CPU 62 operates according to various instructions received by using the touch panel 30. Here, although the hard key unit 78 is included in the UI type device 48, the present disclosed technology is not limited to this, for example, the hard key unit 78 may be connected to the external I/F 50.

The external I/F 50 controls the exchange of various information between the imaging apparatus 12 and an apparatus existing outside the imaging apparatus 12 (hereinafter, also referred to as an "external apparatus"). Examples of the external I/F 50 include a USB interface. The external apparatus (not shown) such as a smart device, a personal computer, a server, a USB memory, a memory card, and/or a printer is directly or indirectly connected to the USB interface.

The communication I/F 52 controls the exchange of information between the CPU 62 and the imaging support apparatus 14 (see FIG. 1) via the network 34 (see FIG. 1). For example, the communication I/F 52 transmits information according to the request from the CPU 62 to the imaging support apparatus 14 via the network 34. Further, the communication I/F 52 receives the information transmitted from the imaging support apparatus 14 and outputs the received information to the CPU 62 via the input/output interface 70.

Figure 3:
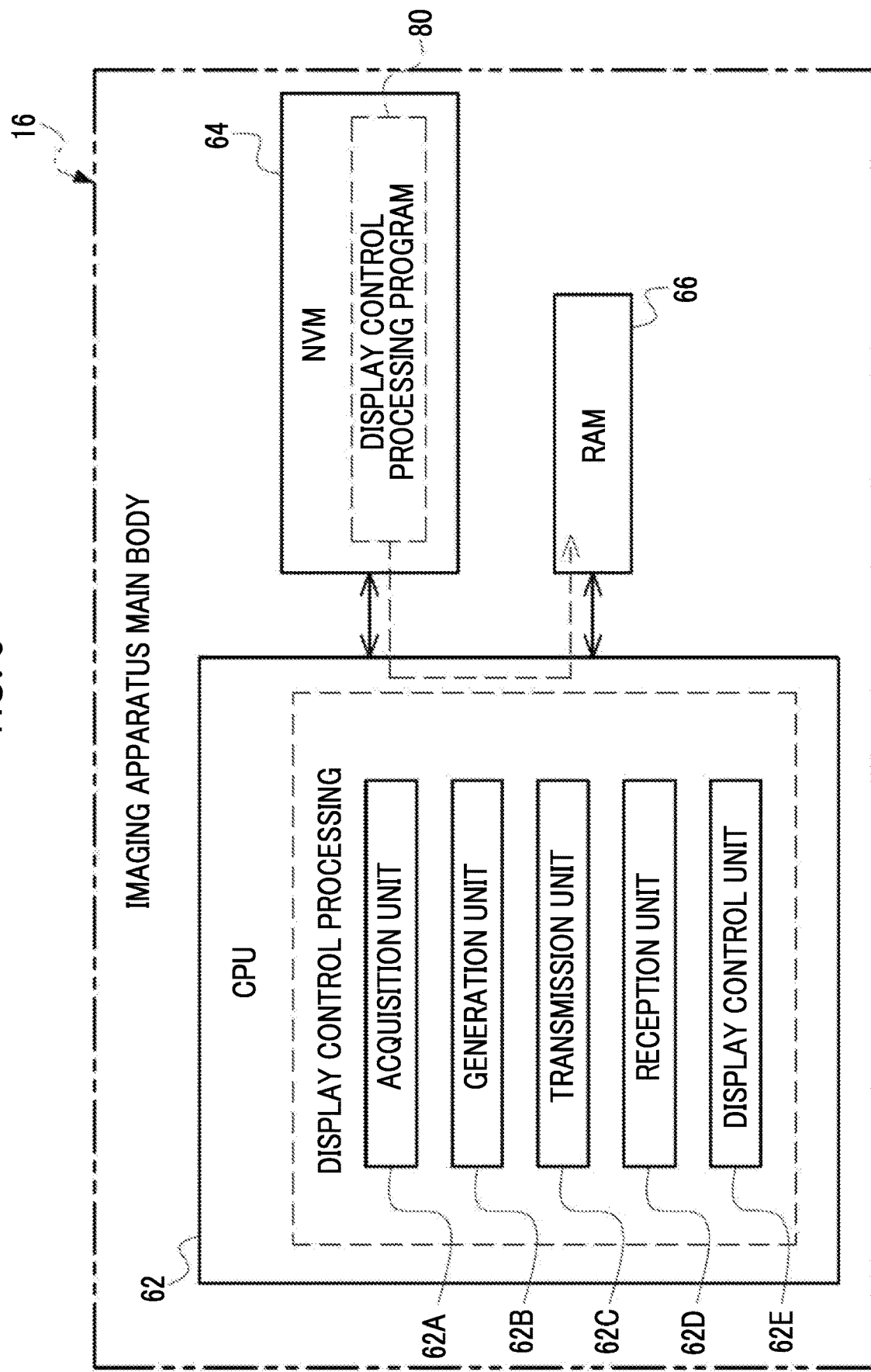
FIG. 3 is a block diagram showing an example of main functions of a CPU included in an imaging apparatus main body.

As an example shown in FIG. 3, a display control processing program 80 is stored in the NVM 64. The CPU 62 reads the display control processing program 80 from the NVM 64 and executes the read display control processing program 80 on the RAM 66. The CPU 62 performs the display control processing in accordance with the display control processing program 80 executed in the RAM 66 (see FIG. 30).

The CPU 62 operates as an acquisition unit 62A, a generation unit 62B, a transmission unit 62C, a reception unit 62D, and a display control unit 62E by executing the display control processing program 80. Specific contents of processing by the acquisition unit 62A, the generation unit 62B, the transmission unit 62C, the reception unit 62D, and the display control unit 62E are described later with reference to FIG. 16, FIG. 17, FIG. 28, FIG. 29, and FIG. 30.

Figure 4:
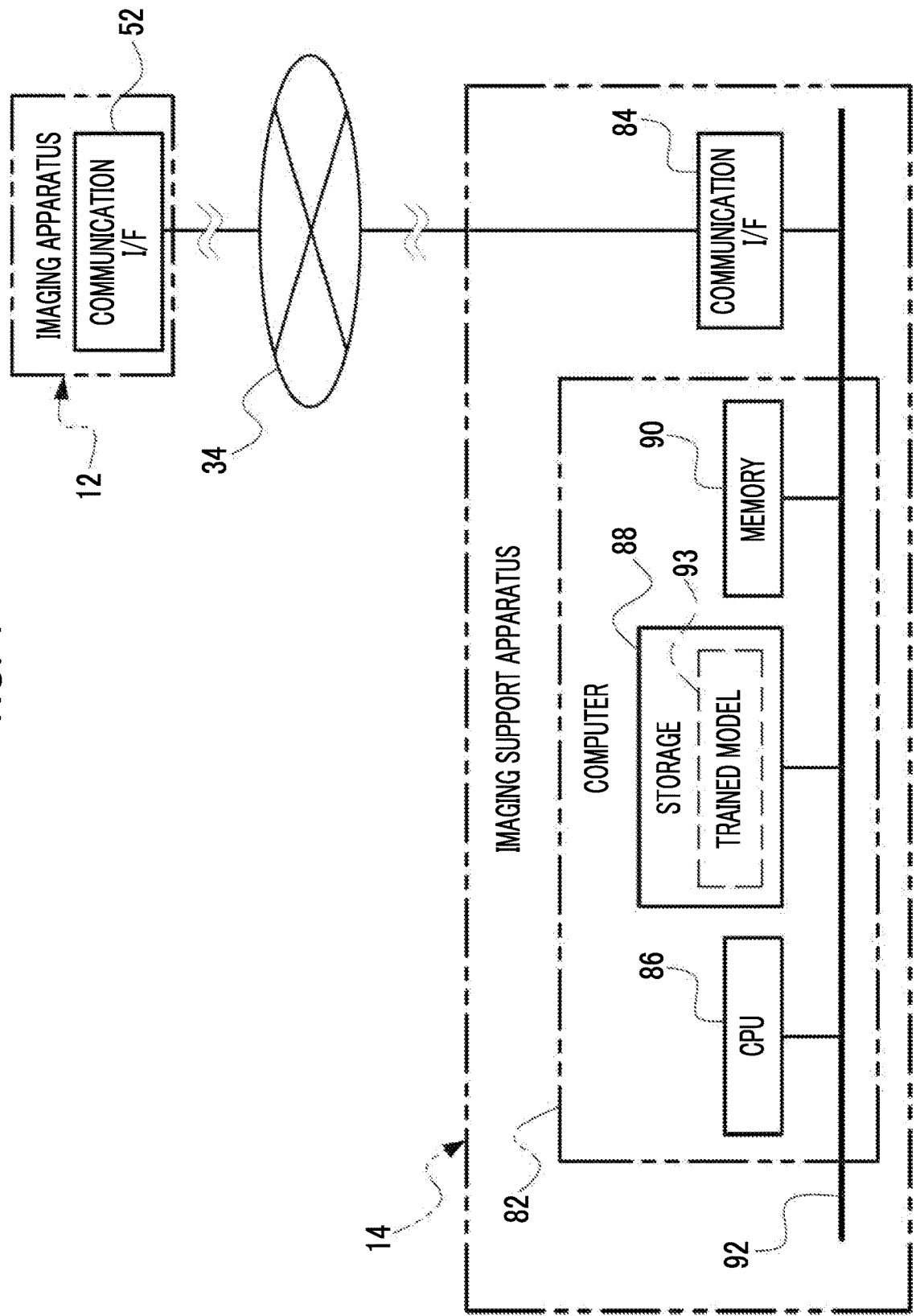
FIG. 4 is a schematic configuration diagram showing an example of a hardware configuration of an electrical system of an imaging support apparatus included in the imaging system.

As an example shown in FIG. 4, the imaging support apparatus 14 includes a computer 82 and a communication I/F 84. The computer 82 includes a CPU 86, a storage 88, and a memory 90. Here, the computer 82 is an example of a "computer" according to the present disclosed technology, the CPU 86 is an example of a "processor" according to the present disclosed technology, and the memory 90 is an example of a "memory" according to the present disclosed technology.

The CPU 86, the storage 88, the memory 90, and the communication I/F 84 are connected to a bus 92. In the example shown in FIG. 4, one bus is shown as the bus 92 for convenience of illustration, but a plurality of buses may be used. The bus 92 may be a serial bus or may be a parallel bus including a data bus, an address bus, a control bus, and the like.

The CPU 86 controls the entire imaging support apparatus 14. The storage 88 is a non-temporary storage medium and is a non-volatile storage device that stores various programs, various parameters, and the like. Examples of the storage 88 include an EEPROM, an SSD, and/or an HDD. The memory 90 is a memory in which information is temporarily stored and is used as a work memory by the CPU 86. Examples of the memory 90 include a RAM.

The communication I/F 84 is connected to the communication I/F 52 of the imaging apparatus 12 via the network 34. The communication I/F 84 controls the exchange of the information between the CPU 86 and the imaging apparatus 12. For example, the communication I/F 84 receives the information transmitted from the imaging apparatus 12 and outputs the received information to the CPU 86. Further, the information according to the request from the CPU 62 is transmitted to the imaging apparatus 12 via the network 34.

The trained model 93 is stored in the storage 88. The trained model 93 is a model generated by training a convolutional neural network, that is, the CNN 96 (see FIG. 5). The CPU 86 performs a recognition of the subject by using the trained model 93 based on the captured image 108.

An example of how to create the trained model 93 (that is, an example of learning steps) will be described with reference to FIGS. 5 and 6.

Figure 5:
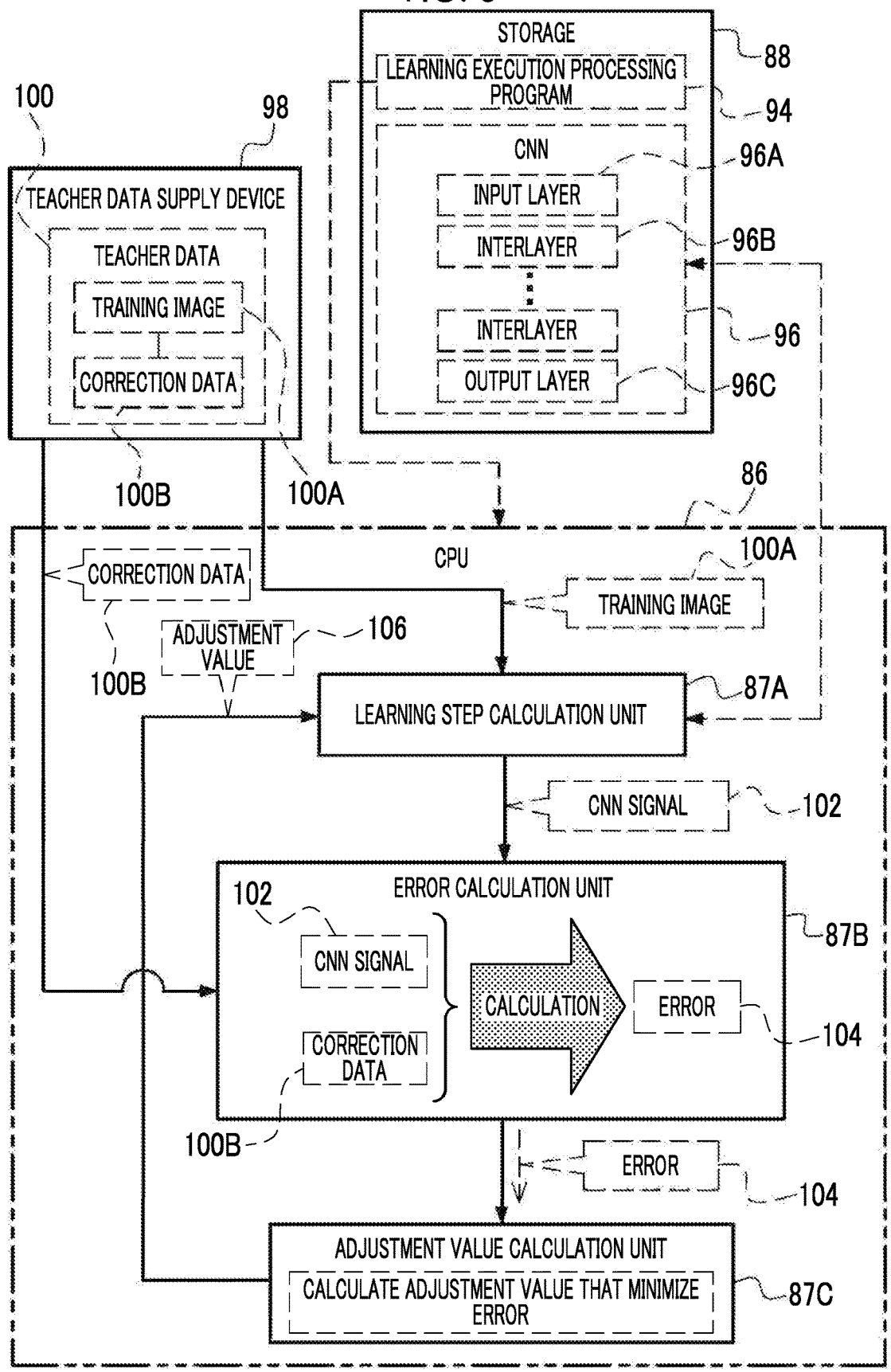
FIG. 5 is a block diagram showing an example of a content of processing in a case where machine learning is performed on a CNN.
Figure 6:
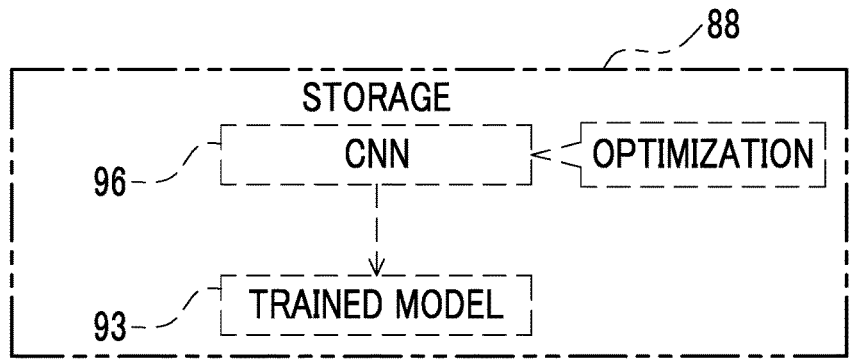
FIG. 6 is a block diagram showing an example of a concept in which a trained model is built by optimizing the CNN.

As an example shown in FIG. 5, a learning execution processing program 94 and the CNN 96 are stored in the storage 88. By reading the learning execution processing program 94 from the storage 88 and executing the read learning execution processing program 94, the CPU 86 operates as a learning step calculation unit 87A, an error calculation unit 87B, and an adjustment value calculation unit 87C.

The teacher data supply device 98 is used for the learning step. The teacher data supply device 98 stores the teacher data 100 and supplies the teacher data 100 to the CPU 86. The teacher data 100 has training images 100A having a plurality of frames and a plurality of correction data 100B. One correction data 100B is associated with each of the training images 100A having the plurality of frames.

The learning step calculation unit 87A acquires the training image 100A. The error calculation unit 87B acquires the correction data 100B corresponding to the training image 100A acquired by the learning step calculation unit 87A.

The CNN 96 has an input layer 96A, a plurality of interlayers 96B, and an output layer 96C. By passing the training image 100A through the input layer 96A, the plurality of interlayers 96B, and the output layer 96C, the learning step calculation unit 87A extracts feature data, which indicates features of the specified subject, from the training image 100A. The features of the subject refer to, for example, a contour, a tint, a texture of a surface, a feature of a component, and a comprehensive feature of the whole. The output layer 96C determines to which cluster among a plurality of clusters the plurality of feature data, which is extracted through the input layer 96A and the plurality of interlayers 96B, belongs, and outputs a CNN signal 102 indicating the determination result. The cluster refers to collective feature data for each of a plurality of subjects. The determination result is, for example, information (for example, information including information indicating a probability that the correspondence relationship between the feature data and the class 110C is a correct answer) indicating a probabilistic correspondence relationship between the feature data and a class 110C (see FIG. 7) specified from the cluster. The class 110C refers to a type of subject. The class 110C is an example of a "type of a subject" of the present disclosed technology.

The correction data 100B is data predetermined as data corresponding to an ideal CNN signal 102 output from the output layer 96C. The correction data 100B includes information in which the feature data and the class 110C correspond to each other.

The error calculation unit 87B calculates an error 104 between the CNN signal 102 and the correction data 100B. The adjustment value calculation unit 87C calculates a plurality of adjustment values 106 that minimize the error 104 calculated by the error calculation unit 87B. The learning step calculation unit 87A adjusts a plurality of optimization variables in the CNN 96 by using the plurality of adjustment values 106 such that the error 104 is minimized. Here, the plurality of optimization variables refer to, for example, a plurality of bonding loads and a plurality of offset values included in the CNN 96, and the like.

By adjusting the plurality of optimization variables in the CNN 96 by using the plurality of adjustment values 106 calculated by the adjustment value calculation unit 87C, the learning step calculation unit 87A optimizes the CNN 96 such that the error 104 is minimized for each of the training images 100A for the plurality of frames. Thereafter, as an example shown in FIG. 6, the CNN 96 is optimized by adjusting the plurality of optimization variables, whereby the trained model 93 is built.

Figure 7:
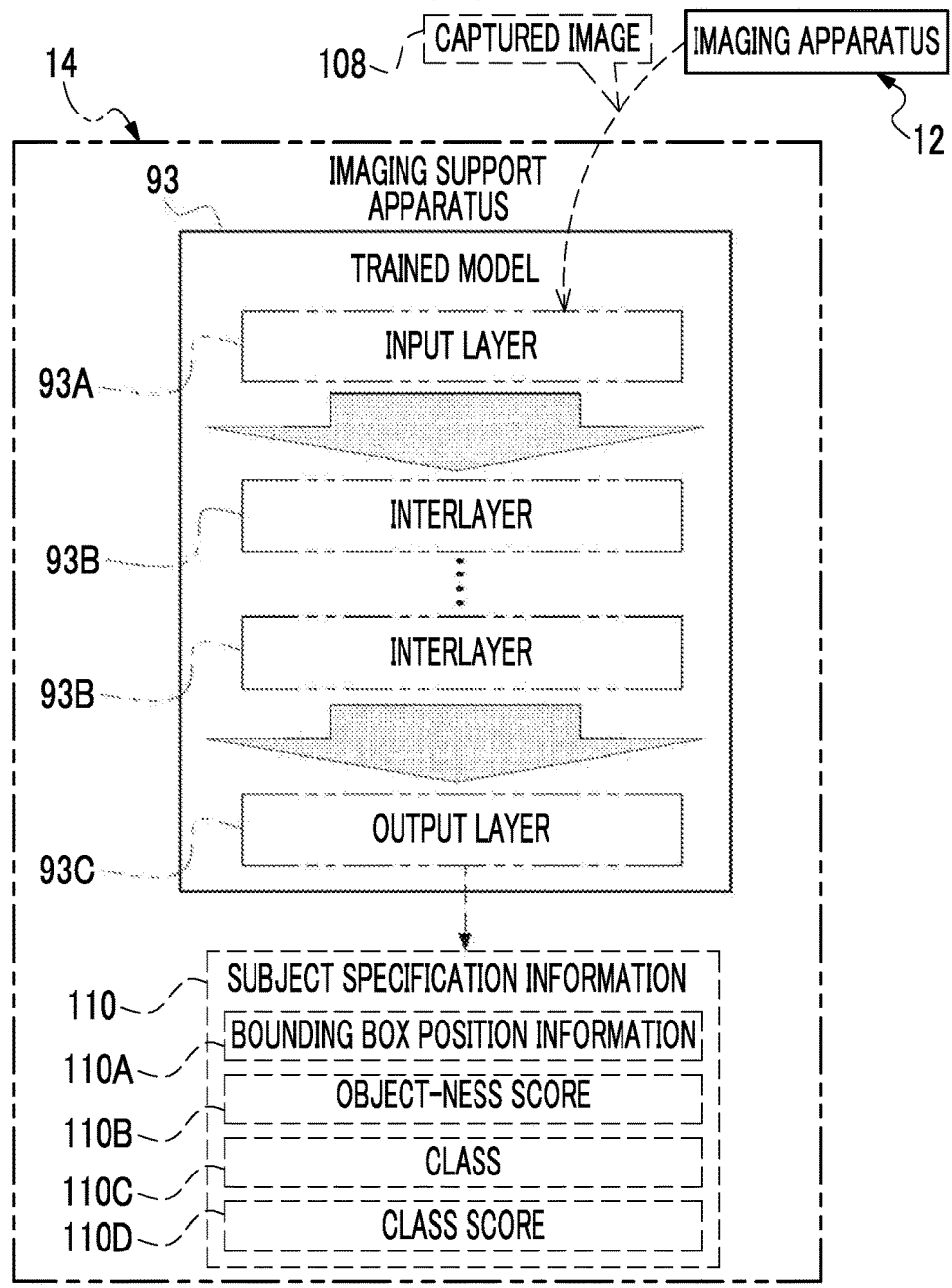
FIG. 7 is a block diagram showing an example of an aspect in which subject specification information is extracted from the trained model in a case where a captured image is provided to the trained model.

As an example shown in FIG. 7, the trained model 93 has an input layer 93A, a plurality of interlayers 93B, and an output layer 93C. The input layer 93A is a layer obtained by optimizing the input layer 96A shown in FIG. 5, the plurality of interlayers 93B are layers obtained by optimizing the plurality of interlayers 96B shown in FIG. 5, and the output layer 93C is a layer obtained by optimizing the output layer 96C shown in FIG. 5.

In the imaging support apparatus 14, subject specification information 110 is output from the output layer 93C by providing the captured image 108 to the input layer 93A of the trained model 93. The subject specification information 110 is information including bounding box position information 110A, an object-ness score 110B, a class 110C, and a class score 110D. The bounding box position information 110A is position information capable of specifying a relative position of a bounding box 116 (see FIG. 9) in the captured image 108. Although the captured image 108 is illustrated here, this is merely an example, and an image based on the captured image 108 (for example, a live view image 130) may be used.

The object-ness score 110B is a probability that an object is present within the bounding box 116. Although the probability that an object is present within the bounding box 116 is illustrated here, this is merely an example, and a value that is obtained by fine-tuning the probability that the object is present within the bounding box 116 may be used, or a value based on the probability that the object is present within the bounding box 116 may be used.

The class 110C is a type of the subject. The class score 110D is a probability that an object, which is present within the bounding box 116, belongs to a specific class 110C. Although the probability that an object, which is present within the bounding box 116, belongs to the specific class 110C is illustrated here, this is merely an example, and a value that is obtained by fine-tuning the probability that an object, which is present within the bounding box 116, belongs to the specific class 110C may be used, and a value based on the probability that an object, which is present within the bounding box 116, belongs to the specific class 110C may be used.

Examples of the specific class 110C include a specific person, a face of the specific person, a specific automobile, a specific passenger plane, a specific bird, a specific train, and the like. A plurality of specific classes 110C is present, and a class score 110D is assigned to each class 110C.

Figure 8:
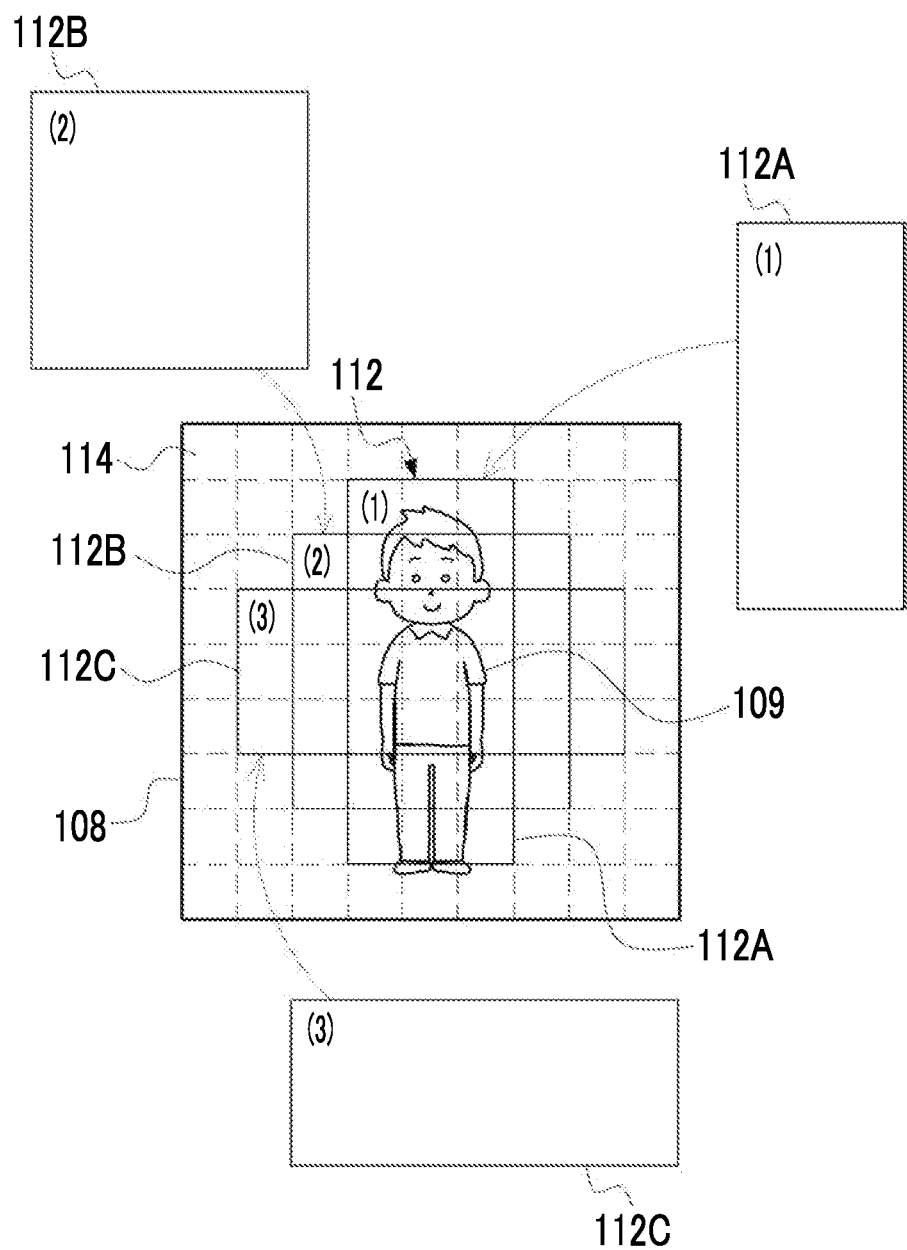
FIG. 8 is a conceptual diagram showing an example of an aspect in which an anchor box is applied to a captured image.

In a case where the captured image 108 is input to the trained model 93, an anchor box 112 is applied to the captured image 108 as an example shown in FIG. 8. The anchor box 112 is a set of a plurality of virtual frames, each of which has a predetermined height and width. In the example shown in FIG. 8, a first virtual frame 112A, a second virtual frame 112B, and a third virtual frame 112C are shown as an example of the anchor box 112. The first virtual frame 112A and the third virtual frame 112C have the same shape (an oblong shape in the example shown in FIG. 8) and the same size. The second virtual frame 112B has a square shape. In the captured image 108, the centers of the first virtual frame 112A, the second virtual frame 112B, and the third virtual frame 112C coincide with each other. Further, the outer frame of the captured image 108 has a rectangular shape, and the first virtual frame 112A, the second virtual frame 112B, and the third virtual frame 112C are disposed in the captured image 108 in such a direction that a short side of the first virtual frame 112A, one specific side of the second virtual frame 112B, and a long side of the third virtual frame 112C are parallel to one specific side of the outer frame of the captured image 108.

In the example shown in FIG. 8, the captured image 108 includes a person image 109 showing a person, and a part of the person image 109 is included in each of the first virtual frame 112A, the second virtual frame 112B, and the third virtual frame 112C. In the following, for convenience of explanation, in a case where it is not necessary to distinguish among the first virtual frame 112A, the second virtual frame 112B, and the third virtual frame 112C, it is referred to as a "virtual frame" without a reference number.

The captured image 108 is divided into a plurality of virtual cells 114. In a case where the captured image 108 is input to the trained model 93, the CPU 86 positions the center of the anchor box 112 with respect to the center of the cell 114 for each cell 114, and calculates the anchor box score and the anchor class score.

The anchor box score refers to the probability that the person image 109 is included within the anchor box 112. The anchor box score is a probability obtained based on a probability that the person image 109 is included within the first virtual frame 112A (hereinafter referred to as a "first virtual frame probability"), a probability that the person image 109 is included within the second virtual frame 112B (hereinafter referred to as a "second virtual frame probability"), and a probability that the person image 109 is included within the third virtual frame 112C (hereinafter referred to as a "third virtual frame probability"). For example, the anchor box score is an average value of the first virtual frame probability, the second virtual frame probability, and the third virtual frame probability.

The anchor class score refers to a probability that the subject (for example, a person), which is shown in the image (in the example shown in FIG. 8, the person image 109) included within the anchor box 112, belongs to the specific class 110C (for example, a specific person). The anchor class score is a probability obtained based on a probability that the subject, which is shown in the image within the first virtual frame 112A, belongs to the specific class 110C (hereinafter referred to as a "first virtual frame class probability"), a probability that the subject, which is shown in the image within the second virtual frame 112B, belongs to the specific class 110C (hereinafter referred to as a "second virtual frame class probability"), and a probability that the subject, which is shown in the image within the third virtual frame 112C, belongs to the specific class 110C (hereinafter referred to as a "third virtual frame class probability"). For example, the anchor class score is an average value of the first virtual frame class probability, the second virtual frame class probability, and the third virtual frame class probability.

The CPU 86 calculates an anchor box value in a case where the anchor box 112 is applied to the captured image 108. The anchor box value is a value obtained based on cell specification information, the anchor box score, the anchor class score, and an anchor box constant. The cell specification information refers to information for specifying the width of the cell 114, the height of the cell 114, and the position of the cell 114 (for example, two-dimensional coordinates capable of specifying the position in the captured image 108) in the captured image 108. The anchor box constant refers to a constant predetermined for the type of the anchor box 112.

The anchor box value is calculated according to an expression "(anchor box value)=(number of all cells 114 present in captured image 108)×{(cell specification information), (anchor box score), (anchor class score)}×(anchor box constant)".

The CPU 86 calculates the anchor box value by applying the anchor box 112 for each cell 114. Thereafter, the CPU 86 specifies the anchor box 112 having an anchor box value that exceeds an anchor box threshold value. The anchor box threshold value may be a fixed value and may be a variable value that is changed according to an instruction given to the imaging support apparatus 14 and/or changes according to various conditions.

The CPU 86 specifies the maximum virtual frame probability from the first virtual frame probability, the second virtual frame probability, and the third virtual frame probability related to the anchor box 112 having the anchor box value that exceeds the anchor box threshold value. The maximum virtual frame probability refers to one largest value among the first virtual frame probability, the second virtual frame probability, and the third virtual frame probability.

Figure 9:
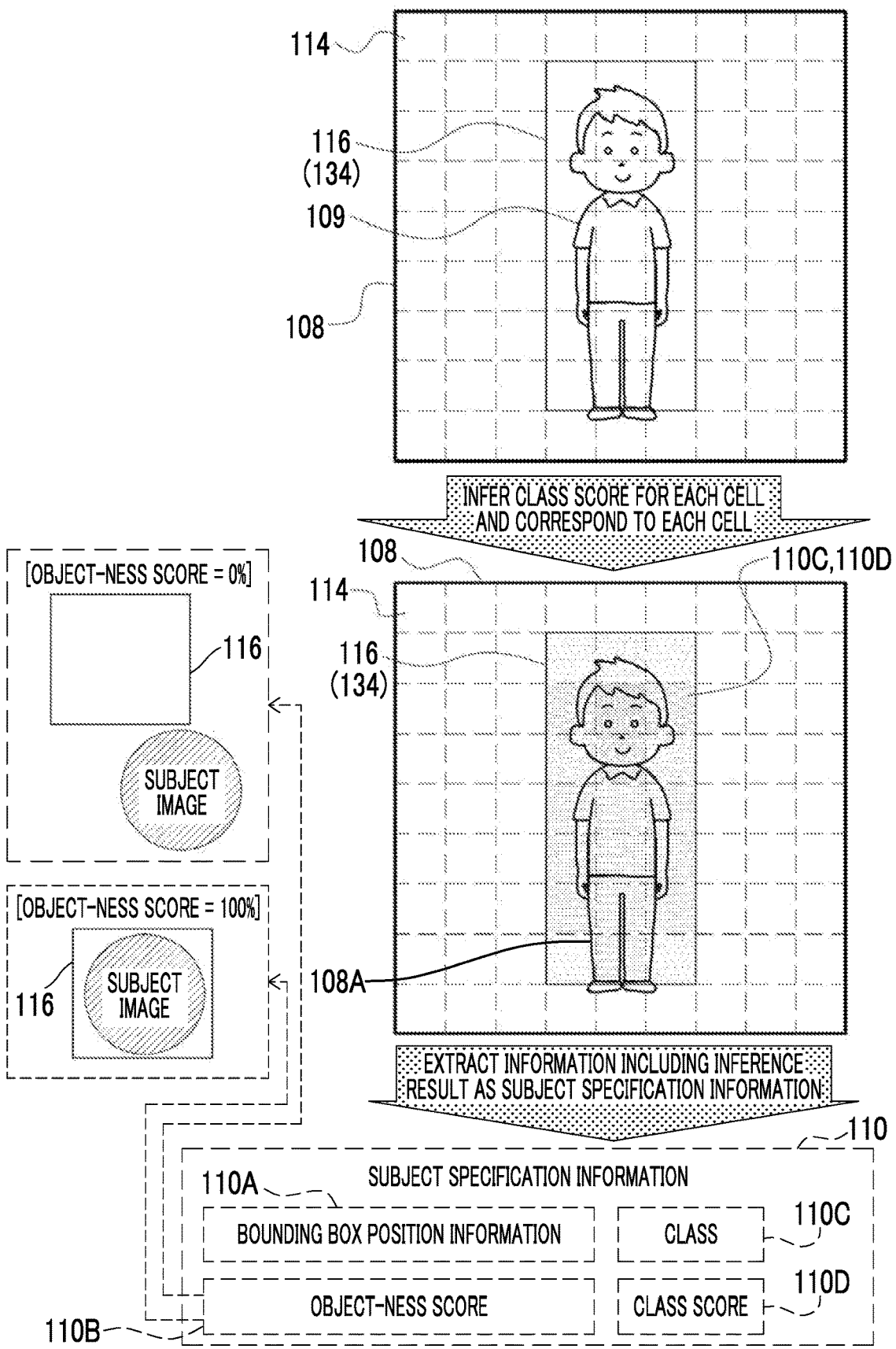
FIG. 9 is a conceptual diagram showing an example of an inference method using a bounding box.

As an example shown in FIG. 9, the CPU 86 determines a virtual frame having the maximum virtual frame probability as the bounding box 116, and the remaining virtual frames are erased. In the example shown in FIG. 9, in the captured image 108, the first virtual frame 112A is determined as the bounding box 116, and the second virtual frame 112B and the third virtual frame 112C are erased. The bounding box 116 is used as the AF area frame 134. The AF area frame 134 is an example of a "frame" and a "focus frame: according to the present disclosed technology. The AF area frame 134 is a frame surrounding the subject. In the captured image 108, the AF area frame 134 is a frame surrounding a subject image (the person image 109 in the example shown in FIG. 8) showing a specific subject (for example, a specific person). The AF area frame 134 refers to a focus frame for defining an area (hereinafter, also referred to as a "focus candidate area") becoming a candidate on which the focus of the focus lens 40B is set in the AF mode. Although the AF area frame 134 is illustrated here, this is merely an example, and it may be used as a focus frame for defining a focus candidate area in the MF mode.

The CPU 86 infers the class 110C and the class score 110D for each cell 114 within the bounding box 116, and the class 110C and the class score 110D correspond to each cell 114. Thereafter, the CPU 86 extracts information including the inference result, which is inferred for each cell 114 within the bounding box 116, from the trained model 93 as the subject specification information 110.

In the example shown in FIG. 9, as the subject specification information 110, information is shown that includes bounding box position information 110A related to the bounding box 116 within the captured image 108, an object-ness score 110B related to the bounding box 116 within the captured image 108, a plurality of classes 110C obtained from each class 110C that corresponds each cell 114 within the bounding box 116, and a plurality of class scores 110D obtained from each class score 110D corresponds to each cell 114 within the bounding box 116.

The object-ness score 110B included in the subject specification information 110 is a probability that the subject is present within the bounding box 116 specified from the bounding box position information 110A included in the subject specification information 110. For example, the object-ness score of 110B of 0% means that no subject image (for example, the person image 109 or the like) that shows the subject is present within the bounding box 116, and the object-ness score 110B of 100% means that the subject image that shows the subject is definitely present within the bounding box 116.

In the subject specification information 110, the class score 110D is present for each class 110C. That is, each of the plurality of classes 110C, which is included in the subject specification information 110, individually has one class score 110D. The class score 110D, which is included in the subject specification information 110, is, for example, an average value of all the class scores 110D corresponding all the cells 114 within the bounding box 116, for the corresponding class 110C.

The CPU 86 determines that the class 110C, among the plurality of classes 110C, having the highest class score 110D is likely to be a class 110C to which the subject, which is shown in the subject image presenting within the bounding box 116, belongs. The class 110C determined to be plausible is the class 110C corresponding to the overall highest class score 110D among the class scores 110D corresponding each cell 114 within the bounding box 116. The overall highest class score 110D refers to, for example, the class 110C having the highest average value of all class scores 110D corresponding to all cells 114 among all classes 110C corresponding to all cells 114 within the bounding box 116.

Figure 10:
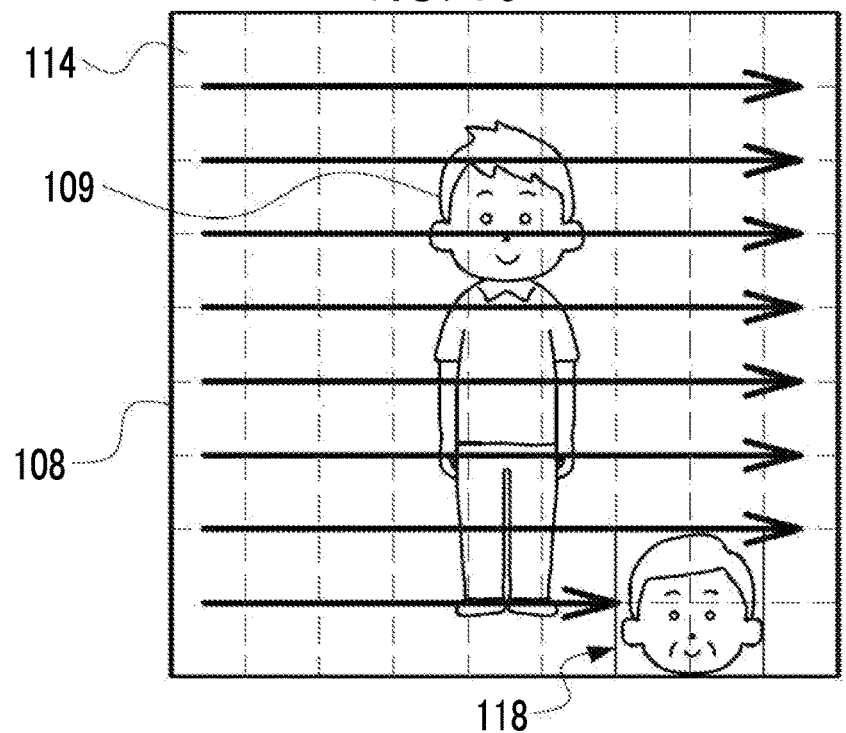
FIG. 10 is a conceptual diagram showing an example of a subject recognition method using a template matching method.

A method of recognizing a subject by using the subject specification information 110 is a subject recognition method by using AI (hereinafter, also referred to as an "AI subject recognition method"). Examples of other subject recognition methods include a method of recognizing a subject by using a template matching (hereinafter, also referred to as a "template matching method"). In the template matching method, for example, a subject recognition template 118 is used as shown in FIG. 10. In the example shown in FIG. 10, the CPU 86 uses the subject recognition template 118 that is an image showing a reference subject (for example, a face created by machine learning or the like as a general face of a person). The CPU 86 detects the person image 109 included in the captured image 108 by performing a raster scan (scan along a direction of the straight arrow in the example shown in FIG. 10) in the captured image 108 with the subject recognition template 118 while changing the size of the subject recognition template 118. In the template matching method, the CPU 86 measures a difference between the entire subject recognition template 118 and a portion of the captured image 108, and calculates a ratio of coincidence between the subject recognition template 118 and a portion of the captured image 108 (hereinafter, also simply referred to as a "ratio of coincidence") based on the measured difference.

Figure 11:
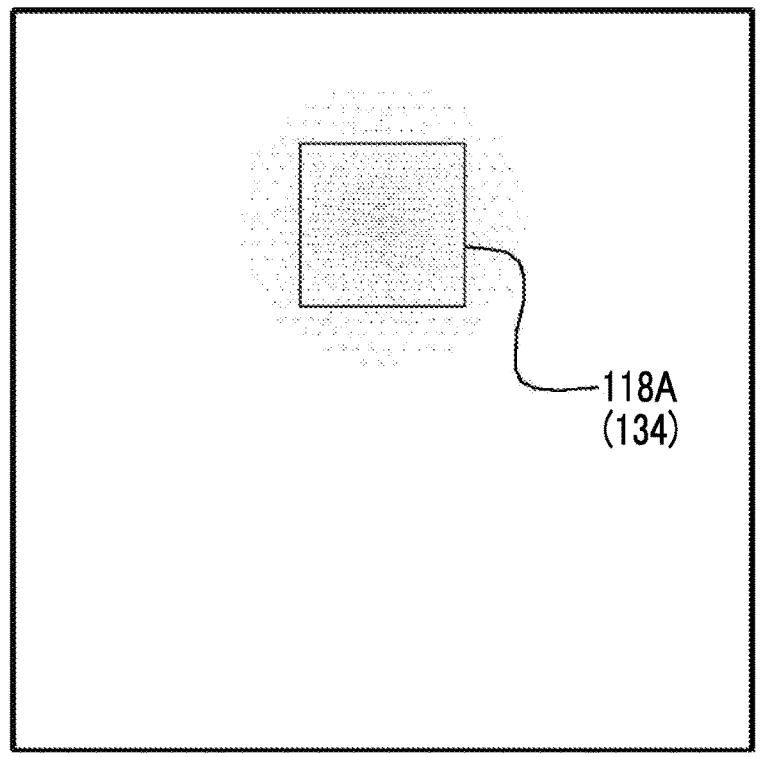
FIG. 11 is a conceptual diagram showing an example of a recognition result in a case where a subject is recognized by using the template matching method.

As an example shown in FIG. 11, the ratio of coincidence is distributed radially from the pixel having the highest ratio of coincidence in the captured image 108. In the example shown in FIG. 11, the ratio of coincidence is distributed radially from the center of the outer frame 118A of the subject recognition template 118. In this case, the outer frame 118A that is disposed with the pixel having the maximum ratio of coincidence in the captured image 108 as the center is used as the AF area frame 134.

As described above, in the template matching method, the ratio of coincidence with the subject recognition template 118 is calculated, whereas in the AI subject recognition method, a probability that a specific subject (for example, the specific class 110C) is present is inferred, thereby the template matching method and the AI subject recognition method have completely different indicators used for contributing to the evaluation of the subject. In the template matching method, a single value, which is similar to the class score 110D, that is, a single value, in which the object-ness score 110B and the class score 110D are mixed and which has stronger tendency for class score 110D than the object-ness score 110B, contributes to the evaluation of the subject as the ratio of coincidence. In contrast to this, in the AI subject recognition method, two values of the object-ness score 110B and the class score 110D contribute to the evaluation of the subject.

In the template matching method, in a case where the condition of the subject is changed, the ratio of coincidence is distributed radially from the pixel having the highest ratio of coincidence in the captured image 108 even in a case where the level of the ratio of coincidence changes. Therefore, for example, in a case where the ratio of coincidence within the outer frame 118A is equal to or higher than a threshold value corresponding to the class threshold value used in comparison with the class score 110D to measure the reliability degree of the class score 110D, it may be recognized as the specific class 110C or may be recognized as a class 110C other than the specific class 110C. That is, as an example shown in FIG. 12, there may be a case where the class 110C is positively recognized or may be a case where the class 110C is erroneously recognized. In a case where the captured image 108, which is obtained by being captured by the imaging apparatus 12 under a constant environment (for example, an environment where conditions such as a subject and lighting are constant), is used in the template matching method, the subject is considered to be substantially positively recognized, but in a case where the captured image 108, which is obtained by being captured by the imaging apparatus 12 under a changing environment (for example, an environment where conditions such as a subject and lighting change), is used in the template matching method, the subject is more likely to be erroneously recognized as compared in a case where the imaging is performed under a constant environment.

Figure 12:
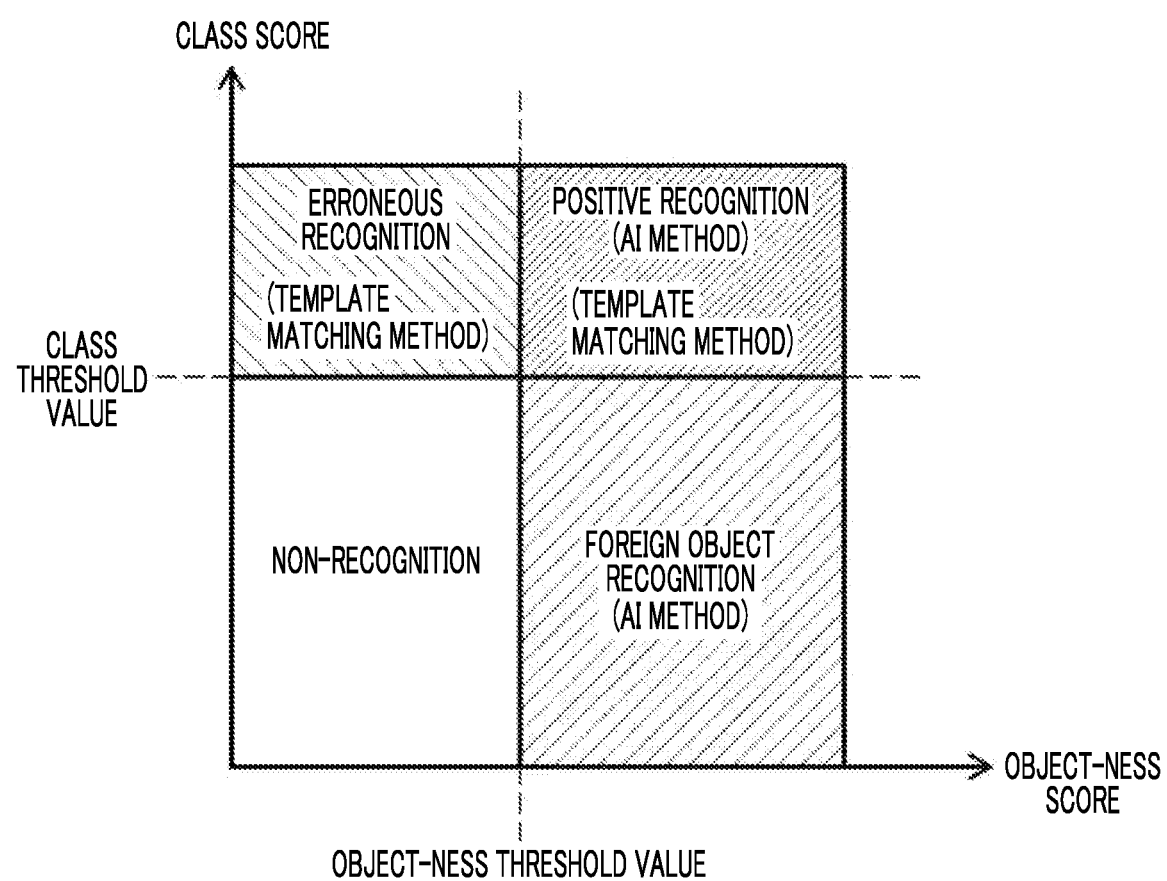
FIG. 12 is a conceptual diagram showing an example of a difference between a recognition result obtained in a case where subject recognition is performed by using the template matching method and a recognition result obtained in a case where subject recognition is performed by using an AI subject recognition method.

In contrast to this, in the AI subject recognition method, as an example shown in FIG. 12, an object-ness threshold value, which is used in comparison with the object-ness score 110B, is used in measuring the reliability degree of the object-ness score 110B. In the AI subject recognition method, in a case where the object-ness score 110B is equal to or higher than the object-ness threshold value, it is determined that the subject image is included within the bounding box 116. Further, in the AI subject recognition method, assuming that it is determined that the subject image is included within the bounding box 116 and in a case where the class score 110D is equal to or higher than the class threshold value, it is determined that the subject belongs to the specific class 110C. Even in a case where it is determined that the subject image is included within the bounding box 116, in a case where the class score 110D is lower than the class threshold value, it is determined that the subject does not belong to the specific class 110C.

Further, in a case where subject recognition is performed on a zebra image showing a zebra with the template matching method by using a horse image showing a horse as the subject recognition template 118, the zebra image is not recognized. In contrast to this, in a case where the subject recognition is performed on the zebra image with the AI subject recognition method by using the trained model 93 obtained by machine learning by using the horse image as the training image 100A, it is determined that the object-ness score 110B is equal to or higher than the object-ness threshold value, the class score 110D is lower than the class threshold value, and a zebra shown in the zebra image does not belong to the specific class 110C (here, a horse as an example). That is, the zebra shown in the zebra image is recognized as a foreign object other than the specific subject.

The reason why the recognition results of the subject differ between the template matching method and the AI subject recognition method is that in the template matching method, a difference between the pattern of the horse and the zebra affects the ratio of coincidence, and the ratio of coincidence is the only value that contributes to the recognition of the subject, whereas in the AI subject recognition method, it is probabilistically determined whether or not it is the specific subject based on a set of partial feature data such as an overall shape of the horse, a face of the horse, four legs, and a tail.

In the present embodiment, the AI subject recognition method is used for control of the AF area frame 134. Examples of the control of the AF area frame 134 include adjustment of the size of the AF area frame 134 in accordance with the subject and selection of a division method of dividing the AF area frame 134 in accordance with the subject.

Since the bounding box 116 is used as the AF area frame 134 in the AI subject recognition method, it can be said that the size of the AF area frame 134 in a case where the object-ness score 110B is high (for example, in a case where the object-ness score 110B is equal to or higher than the object-ness threshold value), has higher reliability than the size of the AF area frame 134 in a case where the object-ness score 110B is low (for example, in a case where the object-ness score 110B is lower than the object-ness threshold value). On the contrary, it can be said that the size of the AF area frame 134 in a case where the object-ness score 110B is low, has lower reliability than the size of the AF area frame 134 in a case where the object-ness score 110B is high, and there is a high possibility that the subject is out of the focus candidate area. In this case, for example, the AF area frame 134 may be expanded or the AF area frame 134 may be deformed.

By the way, in a known technology in the related art, in a case where the AF area frame 134 is divided, the number of divisions is changed according to the size of the subject image surrounded by the AF area frame 134. However, in a case where the number of divisions is changed according to the size of the subject image, a division line 134A1 (see FIGS. 22 and 25 to 27), that is, a boundary line between a plurality of division areas 134A (see FIGS. 22 and 25 to 27) obtained by division, may overlap a portion corresponding to an important position of the subject. In general, it is expected that the important position of the subject has a high tendency to be desired as a target on which the focus is set as compared to a location that has nothing to do with the important position of the subject.

Figure 13:
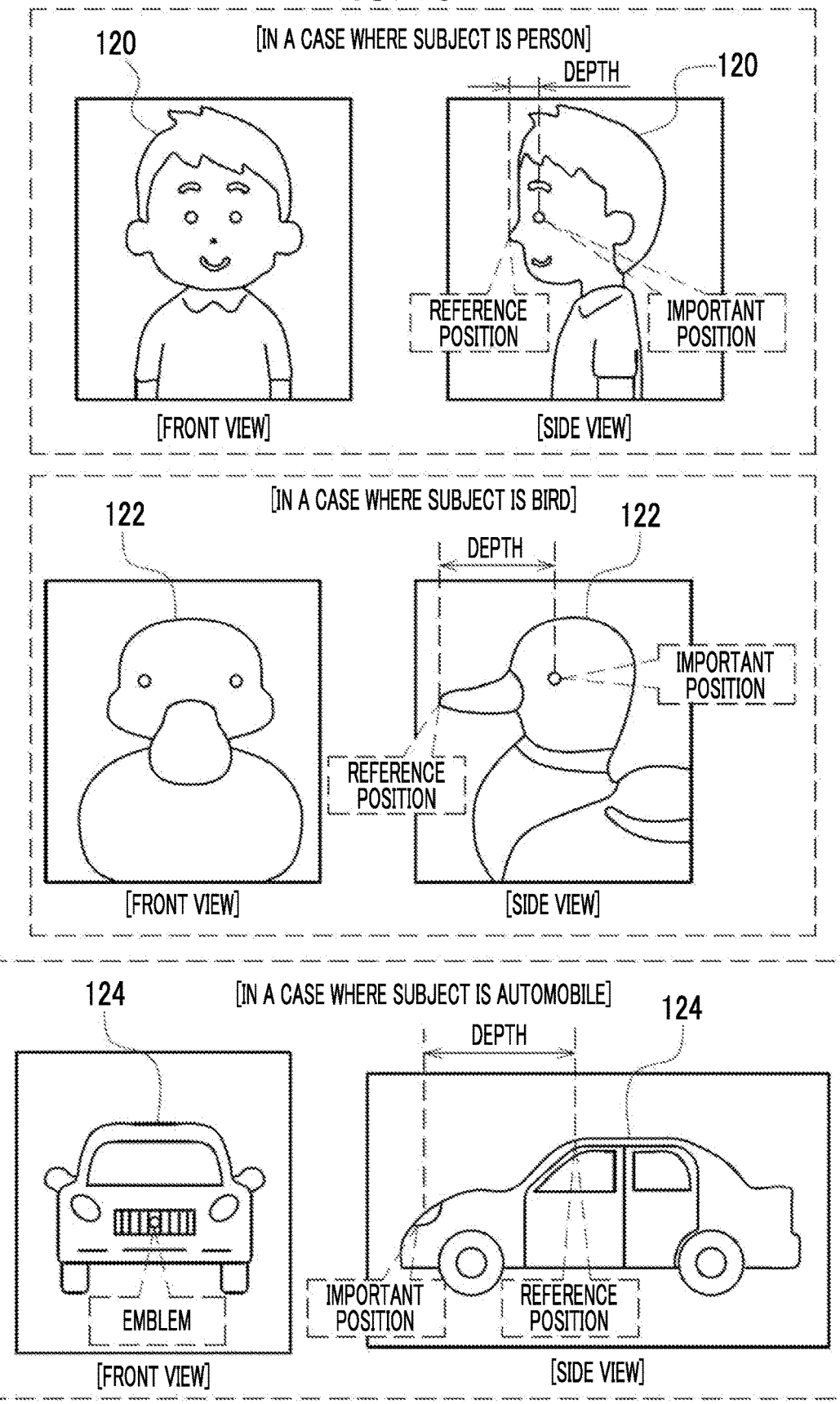
FIG. 13 is a conceptual diagram showing an example of a difference among a length in a depth direction in a case where the subject is a person, a length in the depth direction in a case where the subject is a bird, and a length in the depth direction in a case where the subject is an automobile.

For example, as shown in FIG. 13, in a case where the subject is a person 120, the pupils of the person 120 can be considered as one of the important positions of the subject. Further, in a case where the subject is a bird 122, the pupils of the bird 122 can be considered as one of the important positions of the subject. Further, in a case where the subject is an automobile 124, a position of an emblem on the front side of the automobile 124 can be considered as one of the important positions of the subject.

Further, in a case where the imaging apparatus 12 images the subject from the front side, the length of the subject in the depth direction, that is, the length from the reference position to the important position of the subject differs depending on the subject. The reference position of the subject in a case where the imaging apparatus 12 images the subject from the front side is, for example, a distal end of the nose of the person 120 in a case where the subject is the person 120, a distal end of the beak of the bird 122 in a case where the subject is the bird 122, and between the roof and the windshield of the automobile 124 in a case where the subject is the automobile 124. As described above, even though the length from the reference position to the important position of the subject differs depending on the subject, the image showing the important position of the subject in the captured image 108 becomes blurred in a case where imaging is performed while the focus is set on the reference position of the subject. In this case, in a case where a portion corresponding to the important position of the subject is included within the division area 134A of the AF area frame 134 without overlapping the division area 134A of the AF area frame 134, it becomes easier to set the focus on the important position of the subject in the captured image 108 as compared with a case where the portion corresponding to the important position of the subject is not included within the division area 134A of the AF area frame 134 and the portion corresponding to the reference position of the subject is included within the division area 134A of the AF area frame 134.

Figure 14:
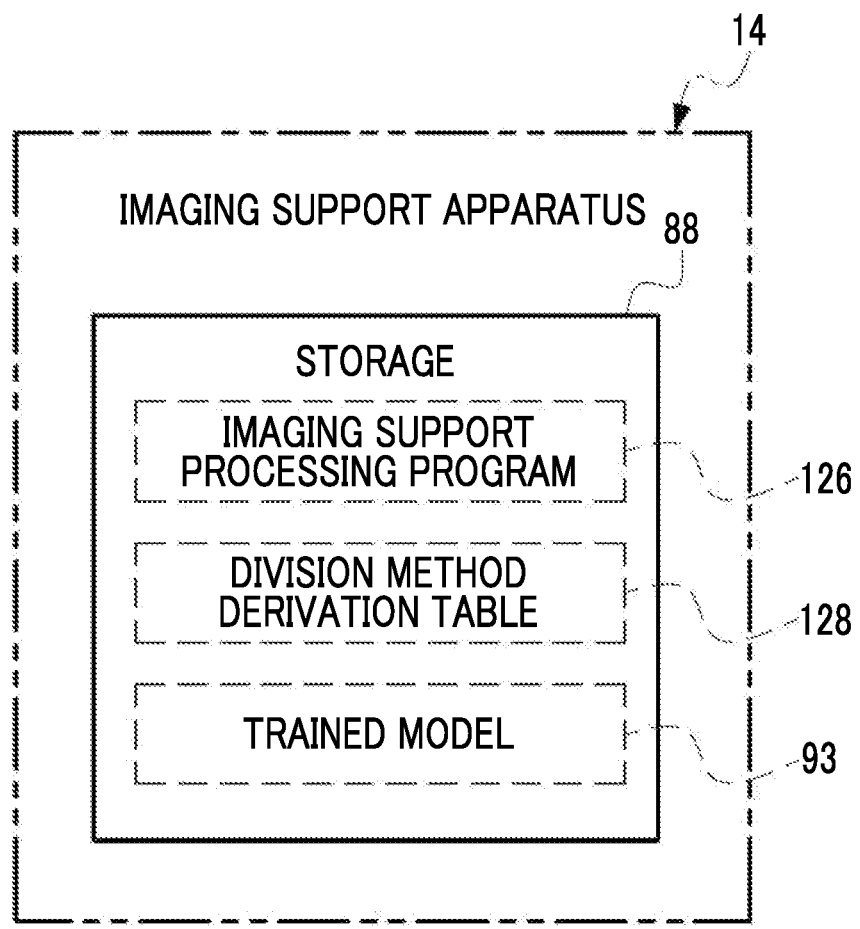
FIG. 14 is a block diagram showing an example of a storage content of a storage of the imaging support apparatus.

Therefore, in order to include the portion corresponding to the important position of the subject within the division area of the AF area frame 134 without overlapping the division area, the storage 88 of the imaging support apparatus 14 stores an imaging support processing program 126 and a division method derivation table 128 in addition to the trained model 93 as an example, as shown in FIG. 14. The imaging support processing program 126 is an example of a "program" according to the present disclosed technology.

Figure 15:
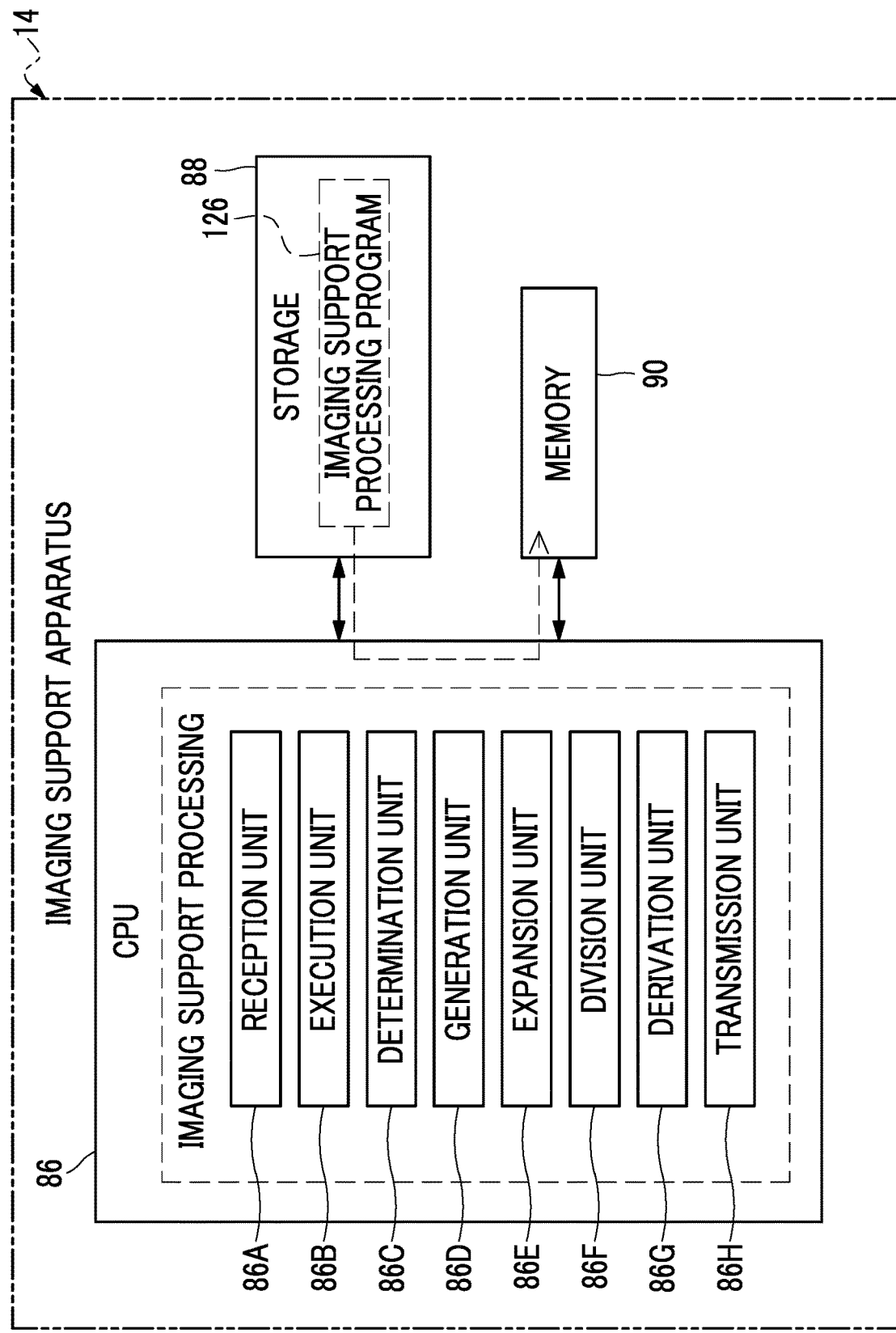
FIG. 15 is a block diagram showing an example of main functions of a CPU included in the imaging support apparatus.

As an example shown in FIG. 15, the CPU 86 reads the imaging support processing program 126 from the storage 88 and executes the read imaging support processing program 126 on the memory 90. The CPU 86 performs imaging support processing according to the imaging support processing program 126 executed on the memory 90 (see also FIGS. 31A and 31B).

The CPU 86 acquires the class 110C based on the captured image 108 by performing the imaging support processing and outputs information indicating the division method of dividing a divided region, where the subject is divided to be identifiable from other regions in an imaging range, according to the acquired class 110C. Further, the CPU 86 acquires the class 110C based on the subject specification information 110 that is output from the trained model 93 by providing the captured image 108 to the trained model 93. The subject specification information 110 is an example of an "output result" according to the present disclosed technology.

By executing the imaging support processing program 126, the CPU 86 operates as a reception unit 86A, an execution unit 86B, a determination unit 86C, a generation unit 86D, an expansion unit 86E, a division unit 86F, a derivation unit 86G, and a transmission unit 86H. Specific contents of the processing by the reception unit 86A, the execution unit 86B, the determination unit 86C, the generation unit 86D, the expansion unit 86E, the division unit 86F, the derivation unit 86G, and the transmission unit 86H will be described later with reference to FIGS. 17 to 28, 31A, and 31B.

Figure 16:
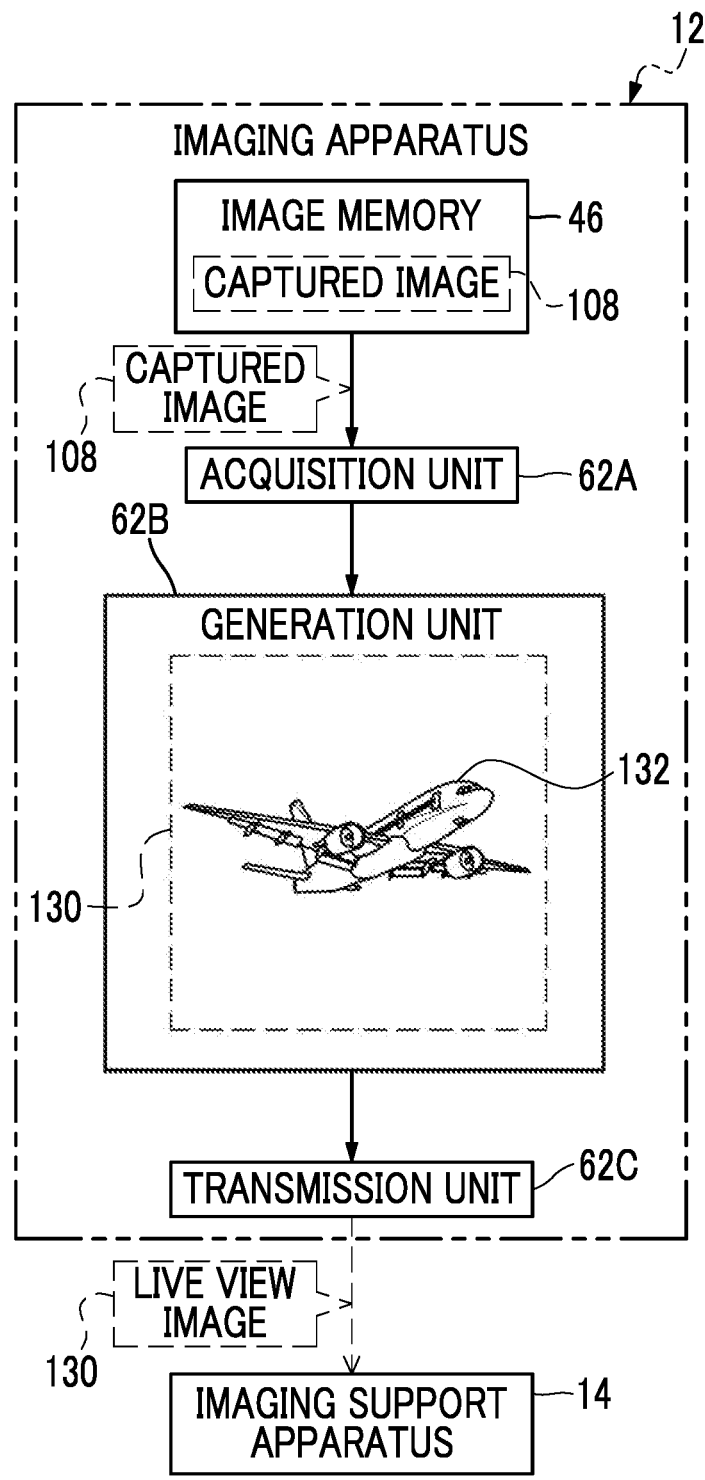
FIG. 16 is a block diagram showing an example of a content of processing of an acquisition unit, a generation unit, and a transmission unit of the imaging apparatus.

As an example shown in FIG. 16, in a case where the captured image 108 is stored in the image memory 46 in the imaging apparatus 12, the acquisition unit 62A acquires the captured image 108 from the image memory 46. The generation unit 62B generates a live view image 130 based on the captured image 108 acquired by the acquisition unit 62A. The live view image 130 is, for example, an image obtained by thinning out pixels from the captured image 108 according to a predetermined rule. In the example shown in FIG. 16, as the live view image 130, an image including a passenger plane image 132 showing a passenger plane is shown. The transmission unit 62C transmits the live view image 130 to the imaging support apparatus 14 via the communication I/F 52.

Figure 17:
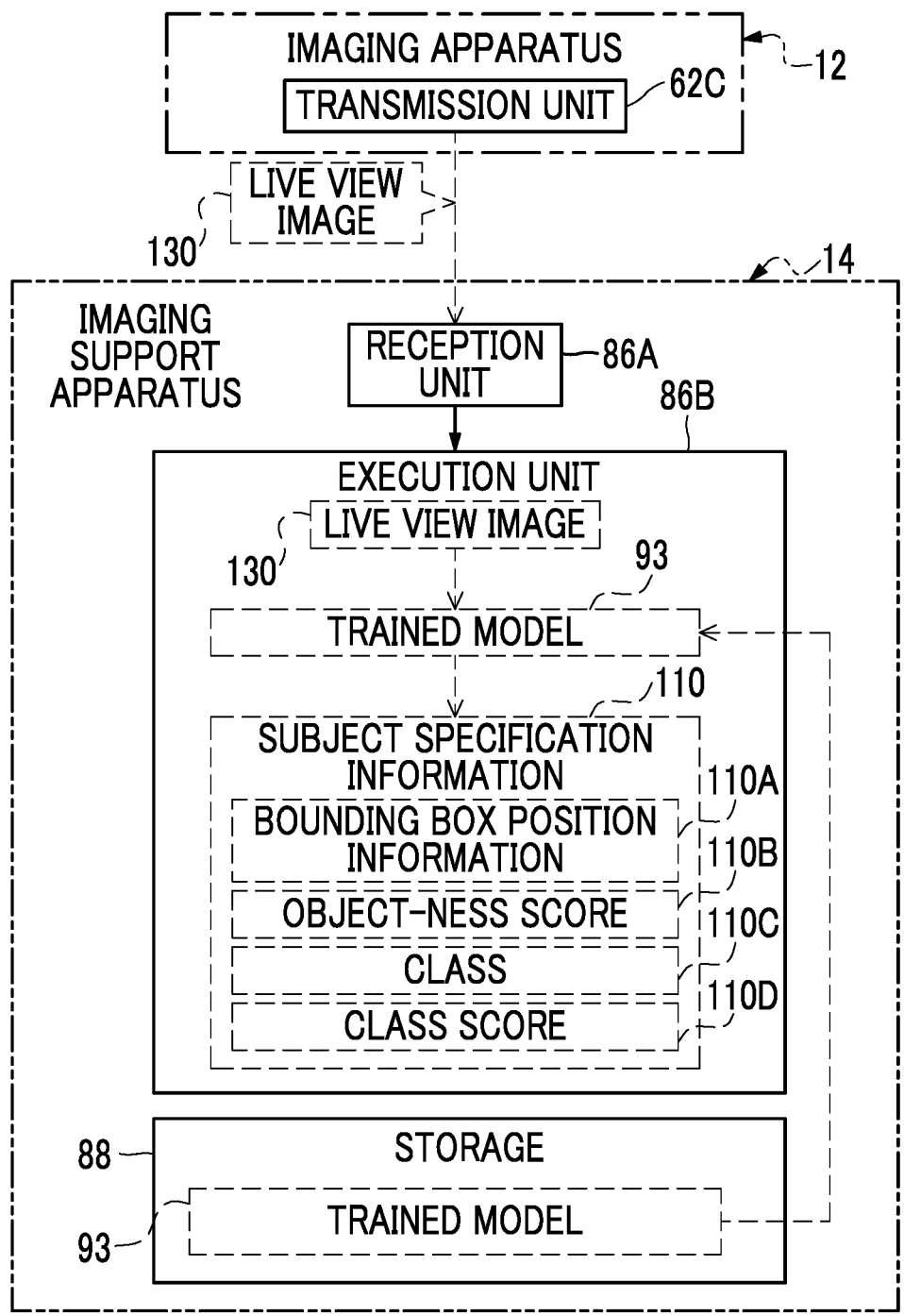
FIG. 17 is a block diagram showing an example of a content of processing of a reception unit and an execution unit of the imaging support apparatus.

As an example shown in FIG. 17, in the imaging support apparatus 14, the reception unit 86A receives the live view image 130 transmitted from the transmission unit 62C of the imaging apparatus 12. The execution unit 86B executes subject recognition processing based on the live view image 130 received from the reception unit 86A. The subject recognition processing refers to processing including processing of detecting a subject by using the AI subject recognition method (that is, processing of determining the presence or absence of the subject) and processing of specifying the type of the subject by using the AI subject recognition method.

The execution unit 86B executes the subject recognition processing by using the trained model 93 in the storage 88. The execution unit 86B extracts the subject specification information 110 from the trained model 93 by providing the live view image 130 to the trained model 93.

Figure 18:
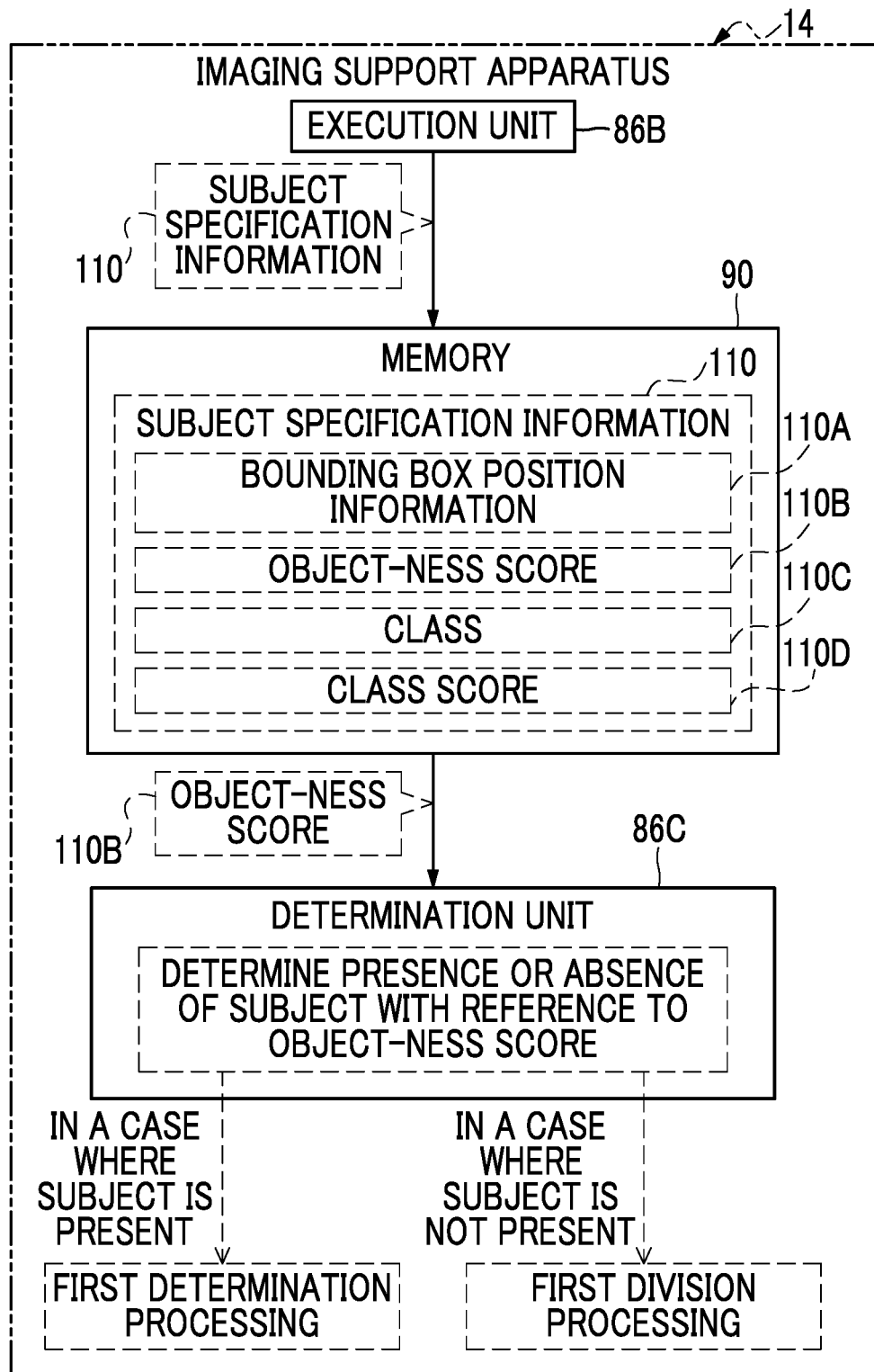
FIG. 18 is a block diagram showing an example of a content of processing of the execution unit and a determination unit of the imaging support apparatus.

As an example shown in FIG. 18, the execution unit 86B stores the subject specification information 110 in the memory 90. The determination unit 86C acquires the object-ness score 110B from the subject specification information 110 in the memory 90, and determines the presence or absence of the subject with reference to the acquired object-ness score 110B. For example, in a case where the object-ness score 110B is a value larger than "0", it is determined that the subject is present, and in a case where the object-ness score 110B is "0", it is determined that the subject is not present. In a case where the determination unit 86C determines that the subject is present, the CPU 86 performs first determination processing. In a case where the determination unit 86C determines that the subject is not present, the CPU 86 performs first division processing.

Figure 19:
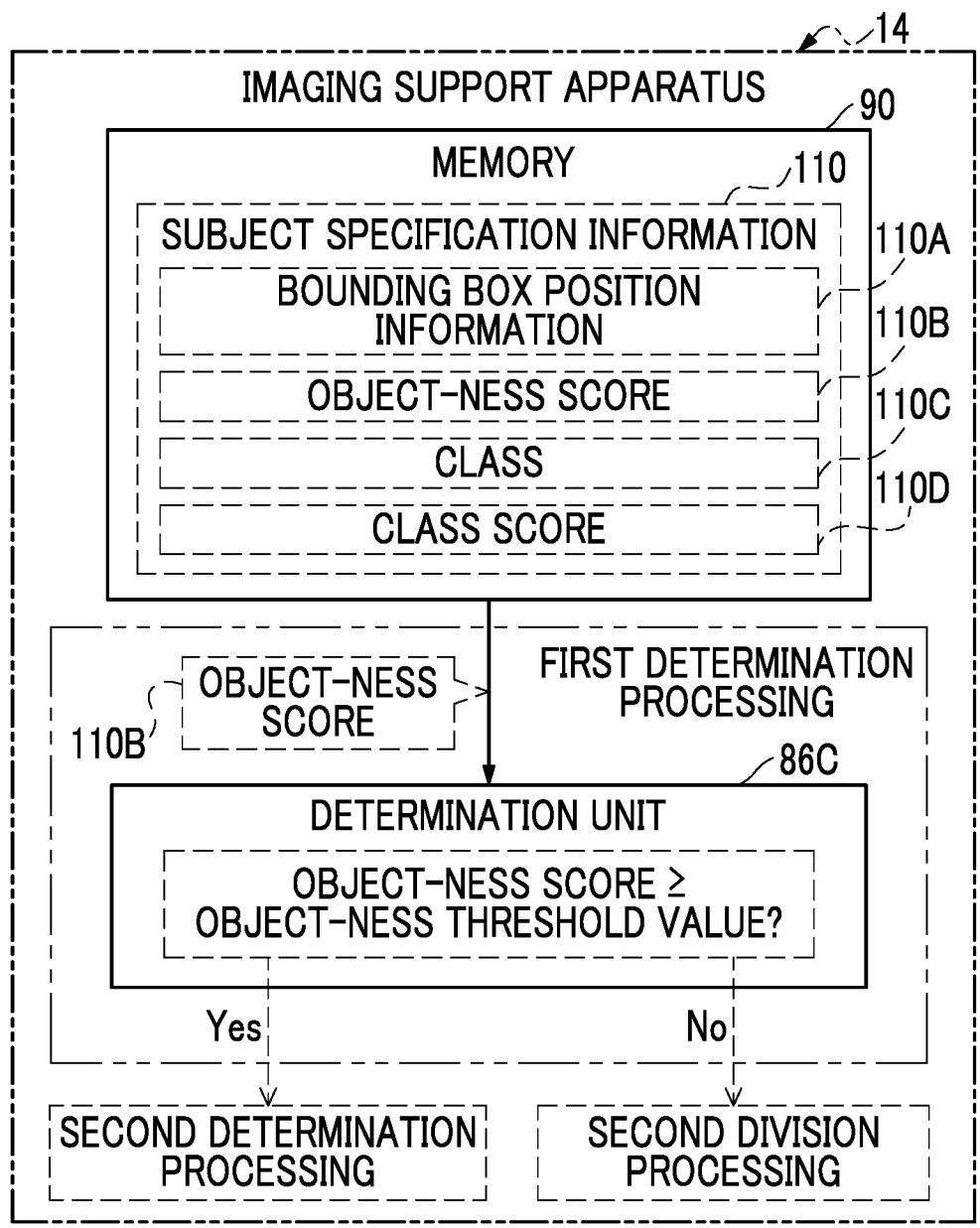
FIG. 19 is a block diagram showing an example of a content of first determination processing.

As an example shown in FIG. 19, in the first determination processing, the determination unit 86C acquires an object-ness score 110B from the subject specification information 110 in the memory 90 and determines whether or not the acquired object-ness score 110B is equal to or higher than the object-ness threshold value. In a case where the object-ness score 110B is equal to or higher than the object-ness threshold value, the CPU 86 performs second determination processing. In a case where the object-ness score 110B is lower than the object-ness threshold value, the CPU 86 performs second division processing. The object-ness score 110B that is equal to or higher than the object-ness threshold value is an example of an "output result" and a "value based on a probability that an object, which is included within the bounding box applied to the image, belongs to a specific class" according to the present disclosed technology. Further, the object-ness threshold value in a case where the imaging support processing shifts to the second division processing is an example of a "first threshold value" according to the present disclosed technology.

Figure 20:
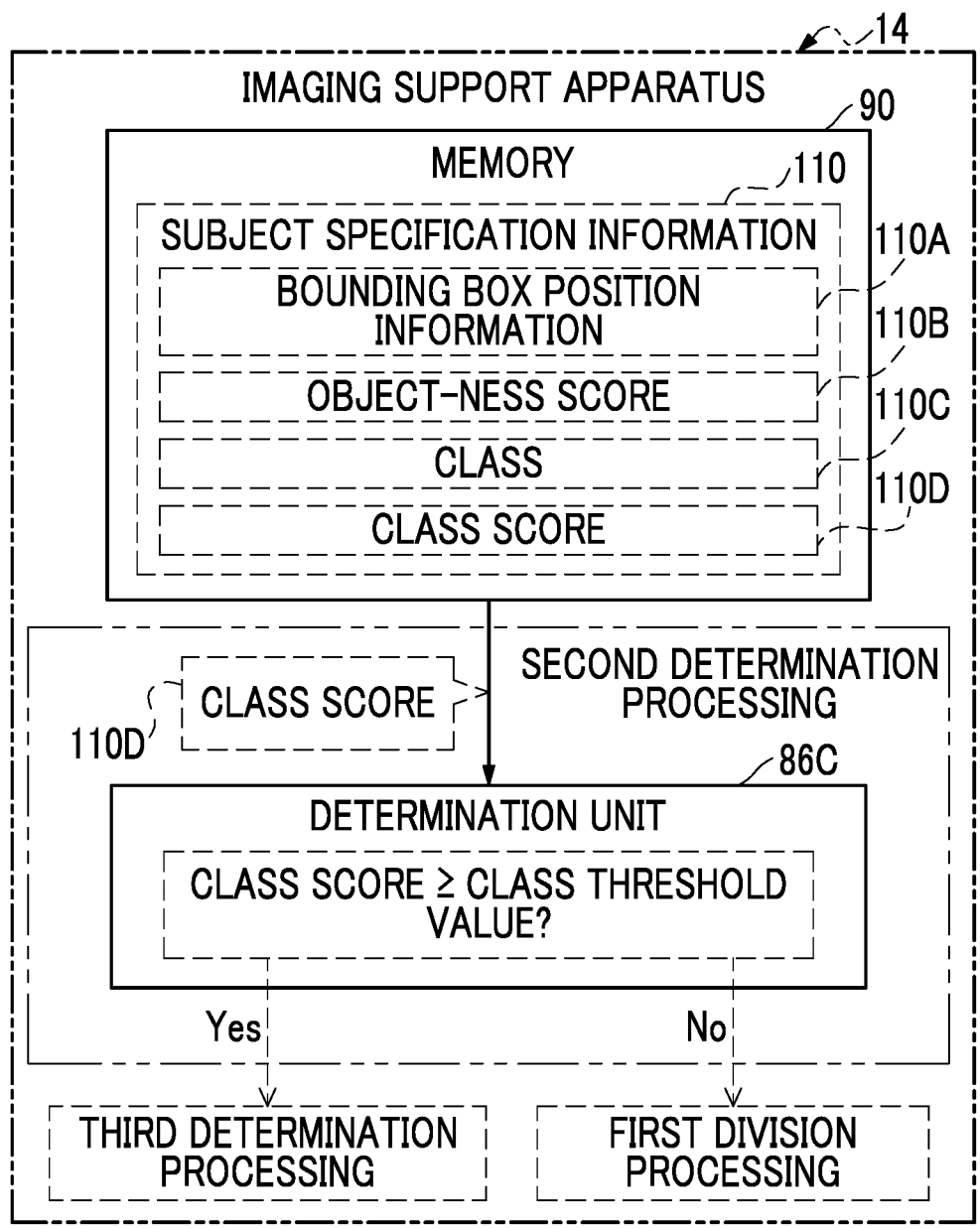
FIG. 20 is a block diagram showing an example of a content of second determination processing.

As an example shown in FIG. 20, in the second determination processing, the determination unit 86C acquires the class score 110D from the subject specification information 110 in the memory 90, and determines whether or not the acquired class score 110D is equal to or higher than the class threshold value. In a case where the class score 110D is equal to or higher than the class threshold value, the CPU 86 performs third division processing. In a case where the class score 110D is lower than the class threshold value, the CPU 86 performs the first division processing. The class score 110D that is equal to or higher than the class threshold value is an example of an "output result" and a "value equal to or higher than a second threshold value, among values based on a probability that the object belongs to the specific class" according to the present disclosed technology. Further, the class threshold value is an example of a "second threshold value" according to the present disclosed technology.

Figure 21:
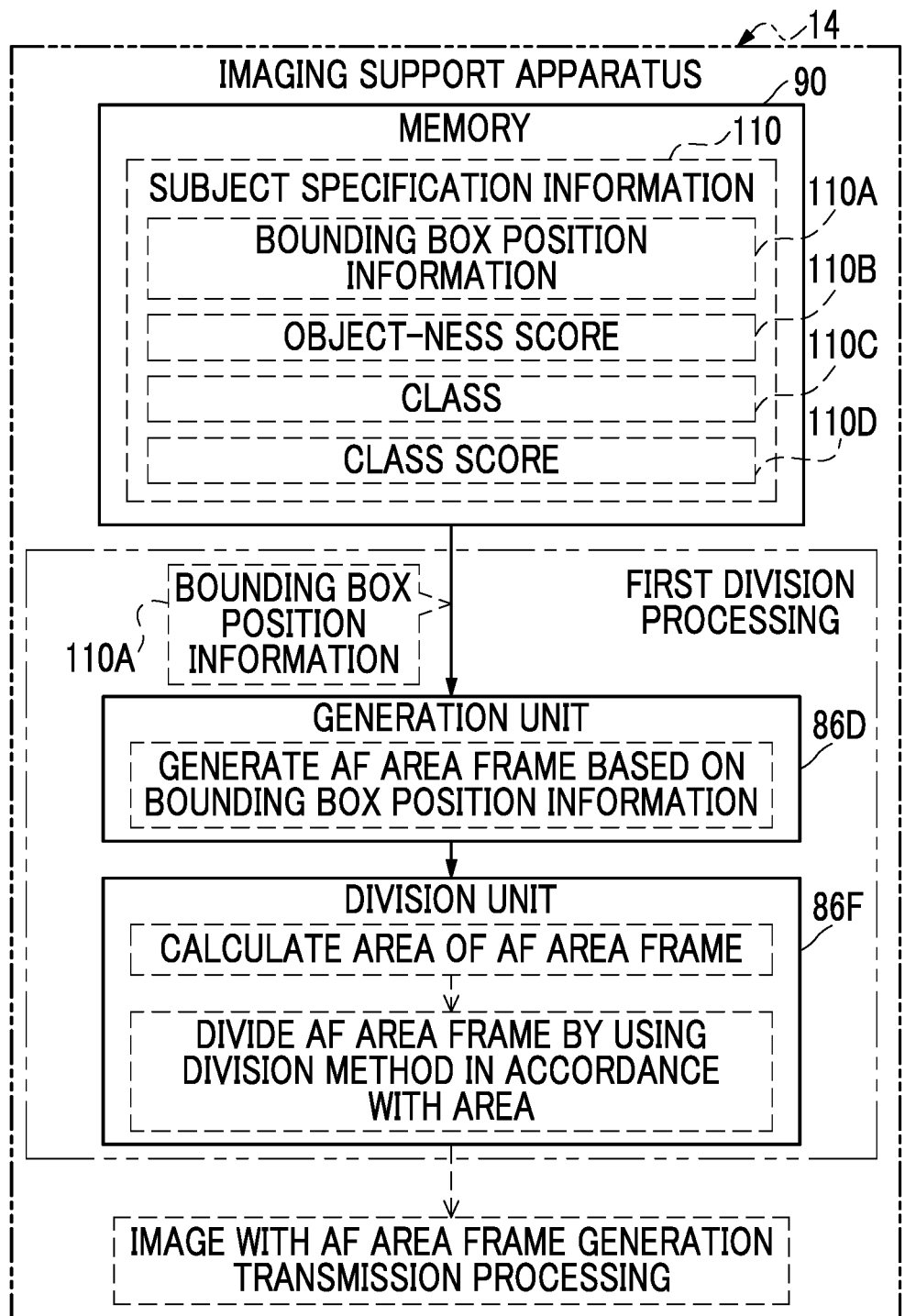
FIG. 21 is a block diagram showing an example of a content of first division processing.

As an example shown in FIG. 21, in the first division processing, the generation unit 86D acquires the bounding box position information 110A from the subject specification information 110 in the memory 90 and generates the AF area frame 134 based on the acquired bounding box position information 110A. The division unit 86F calculates an area of the AF area frame 134 generated by the generation unit 86D and divides the AF area frame 134 by using the division method in accordance with the calculated area. After the AF area frame 134 is divided by using the division method in accordance with the area, the CPU 86 performs the image with AF area frame generation transmission processing.

The division method defines the number of divisions into which a divided region (hereinafter also simply referred to as a "divided region"), which is identifiably divided from other regions in the captured image 108 by being surrounded by the AF area frame 134, is divided, that is, the number of divisions into which the AF area frame 134 is divided. The divided region is defined by a vertical direction and a horizontal direction orthogonal to the vertical direction. The vertical direction corresponds to the row direction of the row direction and the column direction defining the captured image 108, and the horizontal direction corresponds to the column direction. The division method defines the number of divisions in the vertical direction and the number of divisions in the horizontal direction. The row direction is an example of a "first direction" according to the present disclosed technology, and the column direction is an example of a "second direction" according to the present disclosed technology.

Figure 22:
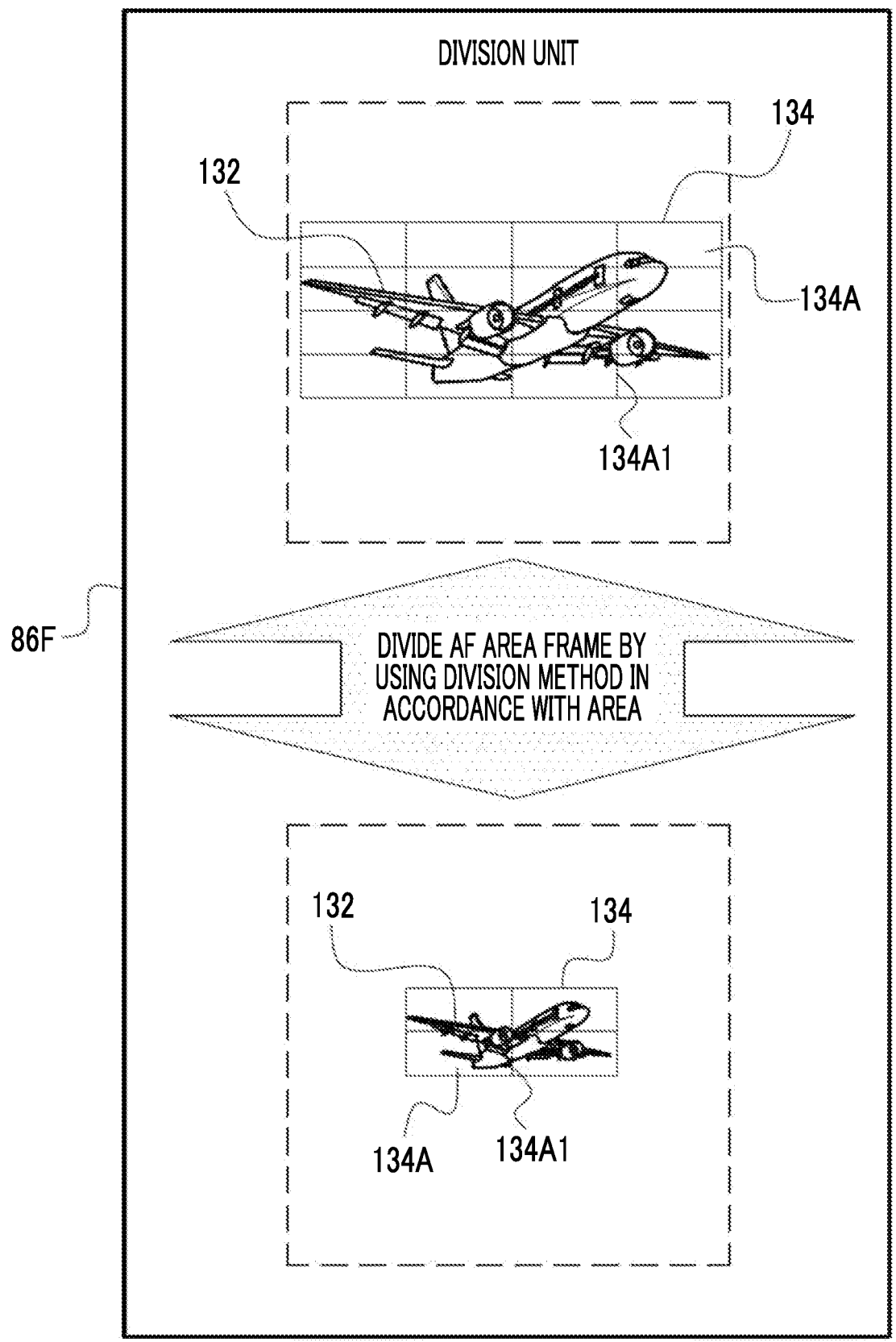
FIG. 22 is a conceptual diagram showing an example of an aspect of an AF area frame divided according to an area of the AF area frame.

As an example shown in FIG. 22, in the first division processing, the division unit 86F changes the number of divisions of the AF area frame 134, that is, the number of division areas 134A of the AF area frame 134 within a predetermined number range (for example, within a range where the lower limit value is 2 and the upper limit value is 30) according to the area of the AF area frame 134. That is, the division unit 86F increases the number of division areas 134A within the predetermined number range as the area of the division areas 134A is larger. Specifically, the division unit 86F increases the number of divisions in the vertical direction and the horizontal direction as the area of the division area 134A is larger.

Further, the division unit 86F reduces the number of division areas 134A within the predetermined number range as the number of division areas 134A is smaller. Specifically, the division unit 86F reduces the number of divisions in the vertical direction and the horizontal direction as the number of division areas 134A is smaller.

Figure 23:
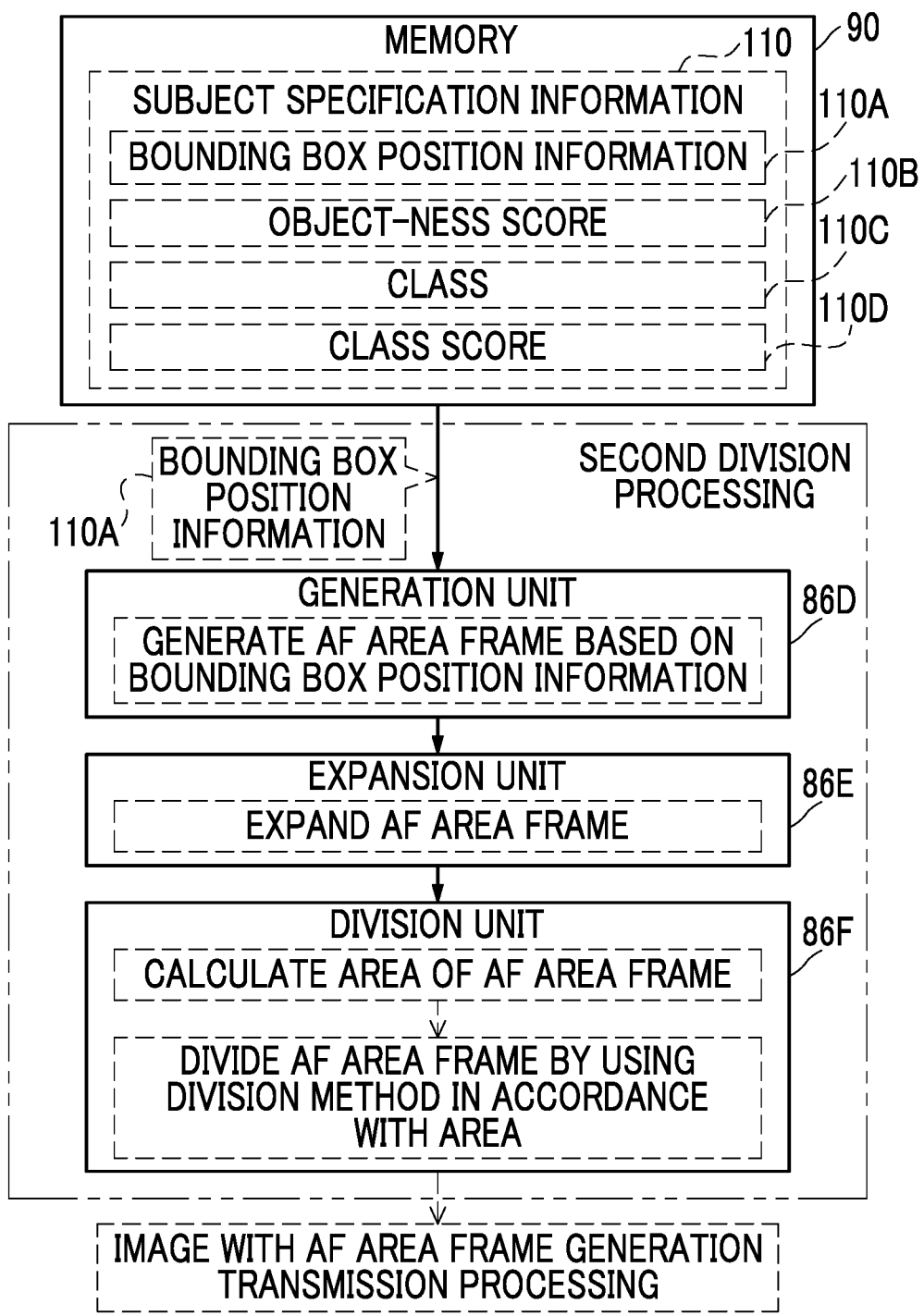
FIG. 23 is a block diagram showing an example of a content of second division processing.

As an example shown in FIG. 23, in the second division processing, the generation unit 86D acquires the bounding box position information 110A from the subject specification information 110 in the memory 90 and generates the AF area frame 134 based on the acquired bounding box position information 110A. The expansion unit 86E expands the AF area frame 134 at a predetermined magnification (for example, 1.25 times). The predetermined magnification may be a variable value that changes according to an instruction provided to the imaging support apparatus 14 and/or various conditions, or may be a fixed value.

In the second division processing, the division unit 86F calculates the area of the AF area frame 134 that is expanded by the expansion unit 86E and divides the AF area frame 134 by using the division method in accordance with the calculated area. After the AF area frame 134 is divided by using the division method in accordance with the area, the CPU 86 performs the image with AF area frame generation transmission processing.

Figure 24:
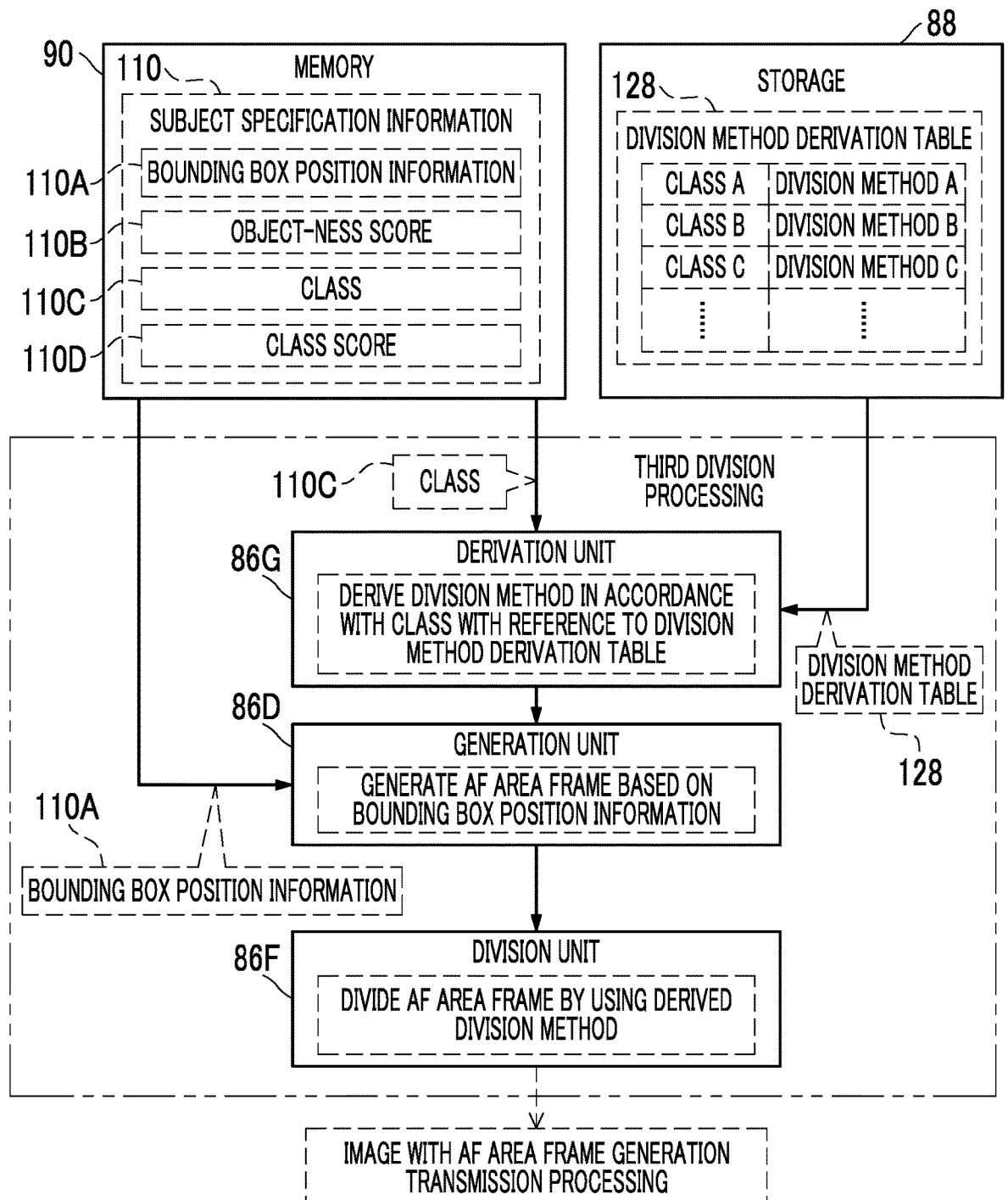
FIG. 24 is a block diagram showing an example of a content of third division processing.

As an example shown in FIG. 24, the division method derivation table 128 in the storage 88 is a table in which the class 110C and the division method correspond to each other. A plurality of classes 110C are present, and the division method is uniquely defined for each of the plurality of classes 110C. In the example shown in FIG. 24, a division method A corresponds to a class A, a division method B corresponds to a class B, and a division method C corresponds to a class C.

The derivation unit 86G acquires the class 110C corresponding to the class score 110D that is equal to or higher than the class threshold value from the subject specification information 110 in the memory 90 and derives the division method corresponding to the acquired class 110C from the division method derivation table 128. The generation unit 86D acquires the bounding box position information 110A from the subject specification information 110 in the memory 90 and generates the AF area frame 134 based on the acquired bounding box position information 110A. The division unit 86F divides the AF area frame 134, which is generated by the generation unit 86D, by using the division method derived by the derivation unit 86G The fact that the AF area frame 134 is divided by using the division method derived by the derivation unit 86G means that the a region surrounded by the AF area frame 134 as a divided region, where the subject is divided to be identifiable from other regions in the imaging range, is divided by using the division method derived by the derivation unit 86G.

In general, a subject image having a stereoscopic effect can be obtained in a case where the subject is imaged from an oblique direction rather than from the front as compared with a case where the subject is imaged from the front. As described above, in a case where the imaging is performed with a composition that makes a viewing person (hereinafter also referred to as a "viewer") of the live view image 130 feel a sense of depth, it is important to make the number of divisions of the AF area frame 134 in the vertical direction larger than the number of divisions in the horizontal direction according to the class 110C, or to make the number of divisions in the horizontal direction larger than the number of divisions in the vertical direction.

Therefore, the number of divisions of the AF area frame 134 in the vertical direction and the horizontal direction by using the division method derived by the derivation unit 86G is defined based on the composition of the subject image surrounded by the AF area frame 134 within the live view image 130.

Figure 25:
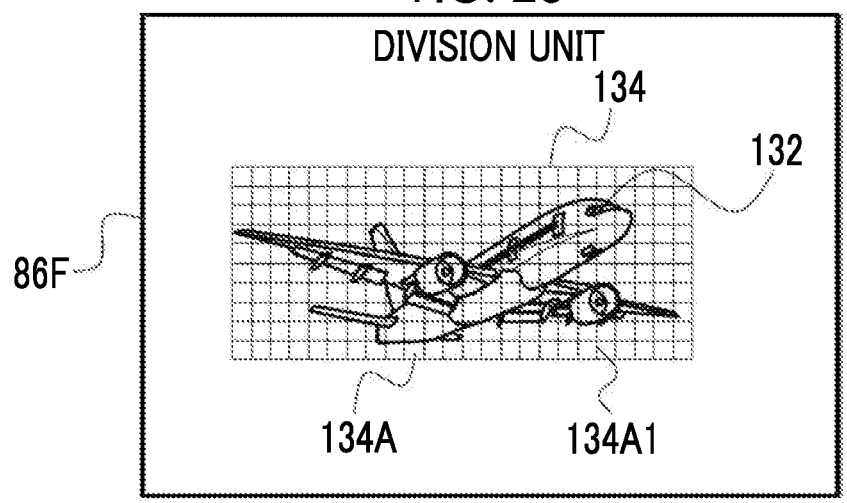
FIG. 25 is a conceptual diagram showing an example of an aspect of an AF area frame divided by using a division method derived according to a class that is acquired from the subject specification information.

As an example shown in FIG. 25, in a case of a composition in which a passenger plane is imaged by the imaging apparatus 12 from the obliquely lower side, the division unit 86F divides the AF area frame 134 such that the number of divisions of the AF area frame 134, which surrounds the passenger plane image 132 within the live view image 130, in the horizontal direction is larger than the number of divisions of the AF area frame 134 in the vertical direction. In the example shown in FIG. 25, the AF area frame 134 is divided into 24 parts in the horizontal direction, and the AF area frame 134 is divided into 10 parts in the vertical direction. Further, the AF area frame 134 is equally divided in each of the horizontal direction and the vertical direction. As described above, the divided region surrounded by the AF area frame 134 is divided into 240 (=24×10) division areas 134A. In the example shown in FIG. 25, the 240 division areas 134A are an example of "a plurality of division regions" according to the present disclosed technology.

Figure 26:
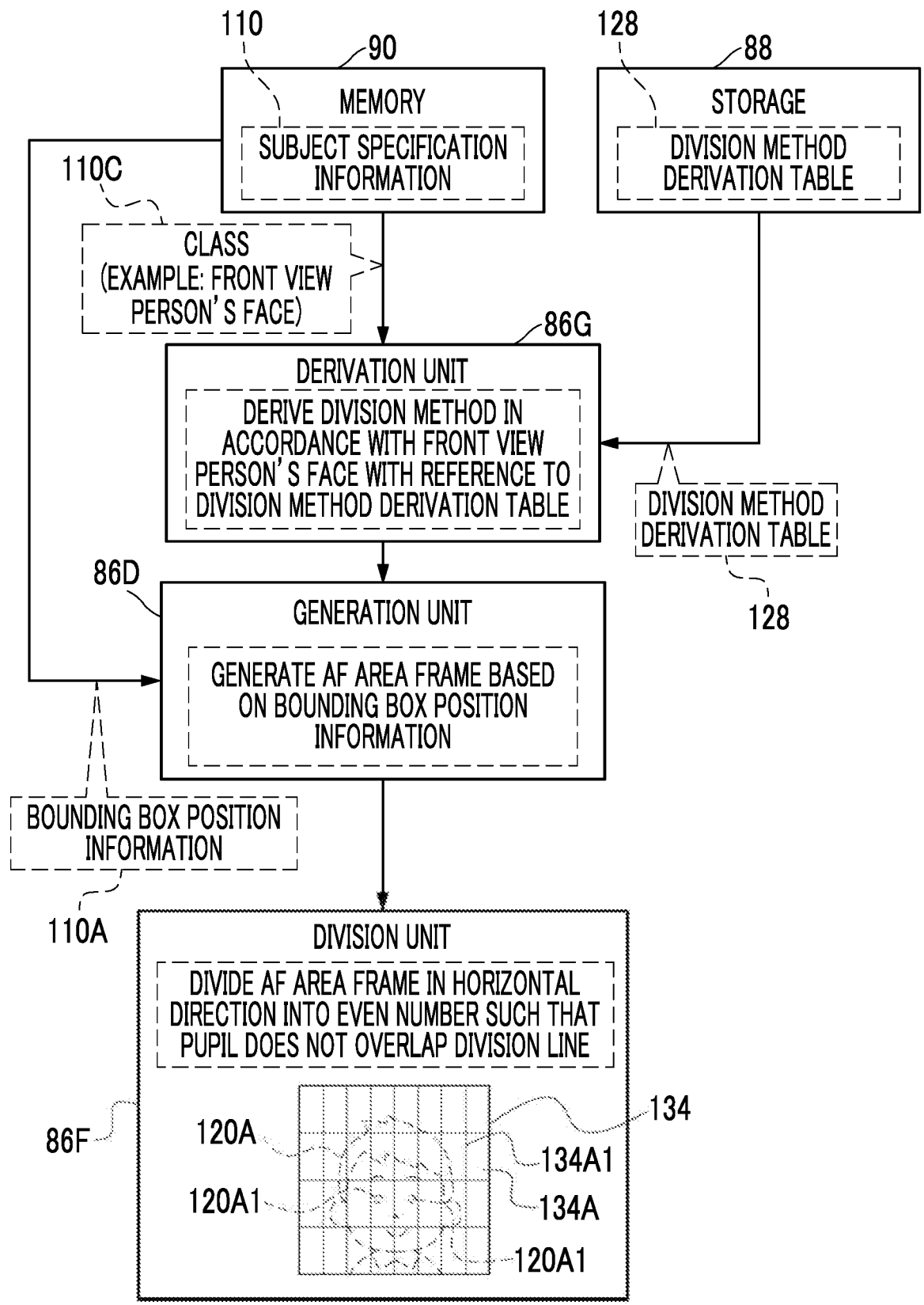
FIG. 26 is a conceptual diagram showing an example of an aspect of an AF area frame divided by using a division method derived according to a class that is acquired from the subject specification information in a case where the AF area frame surrounds a person image.

Further, as an example shown in FIG. 26, in a case where a face image 120A, which is obtained by imaging the face of a person 120 (see FIG. 13) from the front side, is surrounded by the AF area frame 134, and the face image 120A is positioned at a first predetermined location of AF area frame 134, the division unit 86F equally divides the AF area frame 134 in the horizontal direction into an even number ("8" in the example shown in FIG. 26). The first predetermined location refers to a location where a portion corresponding to the nose of the person 120 is positioned at the center of the AF area frame 134 in the horizontal direction. As described above, by equally dividing the AF area frame 134 in the horizontal direction into an even number, a portion 120A1 corresponding to the pupil in the face image 120A within the AF area frame 134 can easily be included into one division area 134A without overlapping the division area 134A as compared with the case of being equally divided in the horizontal direction into an odd number. In other words, the above description means that the portion 120A1 corresponding to the pupil in the face image 120A is less likely to be overlapped with a division line 134A1 as compared with a case where the AF area frame 134 is equally divided in the horizontal direction into an odd number. The AF area frame 134 is also equally divided in the vertical direction. The number of divisions in the vertical direction is smaller than the number of divisions in the horizontal direction ("4" in the example shown in FIG. 26). In the example shown in FIG. 26, the AF area frame 134 is also divided in the vertical direction, but this is merely an example, and the AF area frame 134 may not be divided in the vertical direction. The size of the division area 134A is a size derived in advance by a simulator or the like, as a size in which the portion 120A1 corresponding to the pupil in the face image 120A is included within one division area 134A without overlapping the division area 134A.

Figure 27:
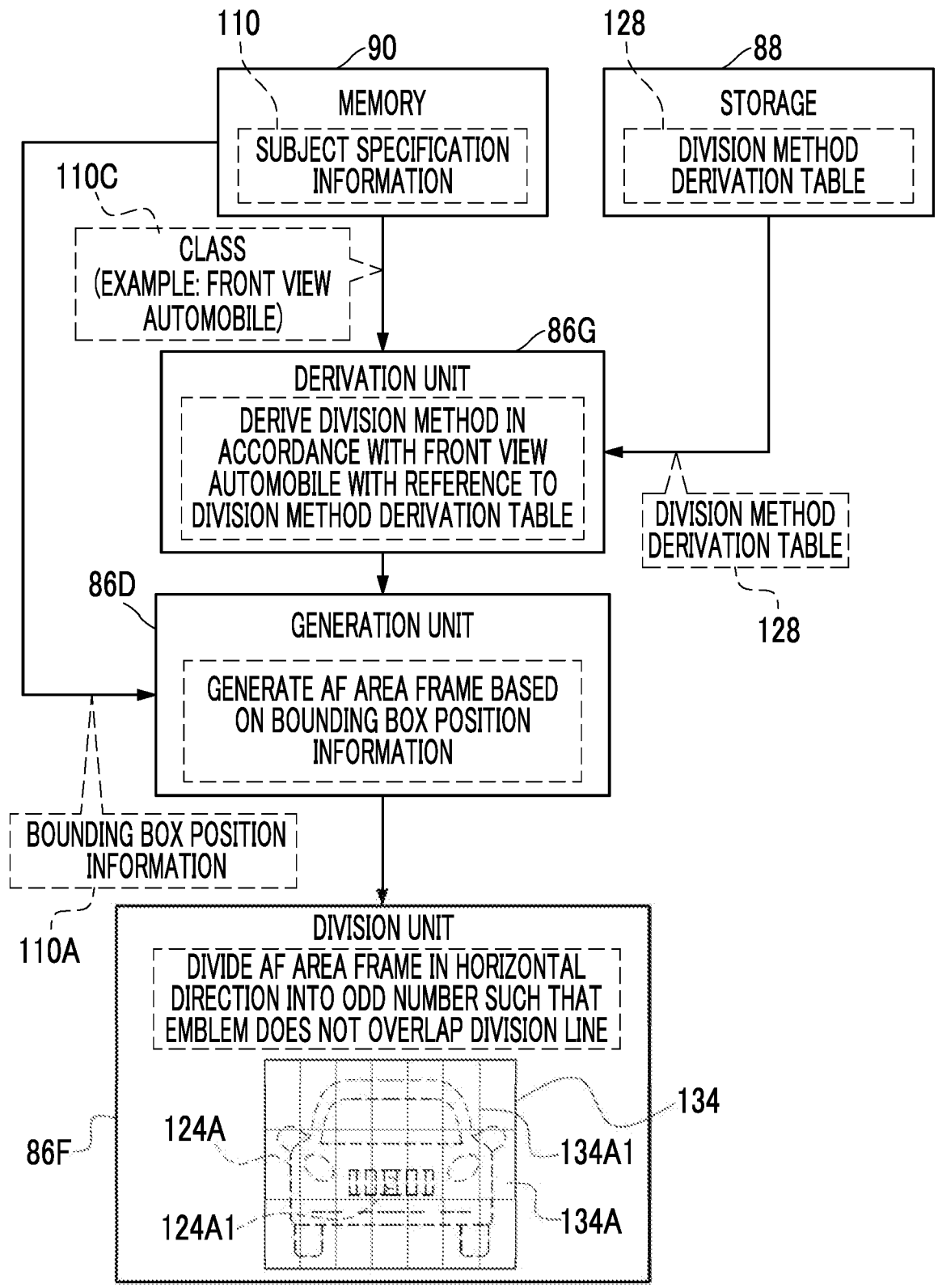
FIG. 27 is a conceptual diagram showing an example of an aspect of an AF area frame divided by using a division method derived according to a class that is acquired from the subject specification information in a case where an AF area frame surrounds an automobile image.

Further, as an example shown in FIG. 27, in a case where an automobile image 124A, which is obtained by imaging the automobile 124 (see FIG. 13) from the front side, is surrounded by the AF area frame 134, and the automobile image 124A is positioned at a second predetermined location of AF area frame 134, the division unit 86F equally divides the AF area frame 134 in the horizontal direction into an odd number ("7" in the example shown in FIG. 27). The second predetermined location refers to a location where the center of the front view (for example, an emblem) of the automobile is positioned at the center of the AF area frame 134 in the horizontal direction. As described above, by equally dividing the AF area frame 134 in the horizontal direction into an odd number, a portion 124A1 corresponding to the emblem in the automobile image 124A within the AF area frame 134 can easily be included into one division area 134A without overlapping the division area 134A as compared with the case of being equally divided in the horizontal direction into an even number.

In other words, the above description means that the portion 124A1 corresponding to the emblem in the automobile image 124A is less likely to be overlapped with a division line 134A1 as compared with a case where the AF area frame 134 is equally divided in the horizontal direction into an even number.

The AF area frame 134 is also equally divided in the vertical direction. The number of divisions in the vertical direction is smaller than the number of divisions in the horizontal direction ("3" in the example shown in FIG. 27). In the example shown in FIG. 27, the AF area frame 134 is also divided in the vertical direction, but this is merely an example, and the AF area frame 134 may not be divided in the vertical direction. The size of the division area 134A is a size derived in advance by a simulator or the like, as a size in which the portion 124A1 corresponding to the emblem in the automobile image 124A is included within one division area 134A without overlapping the division area 134A.

Figure 28:
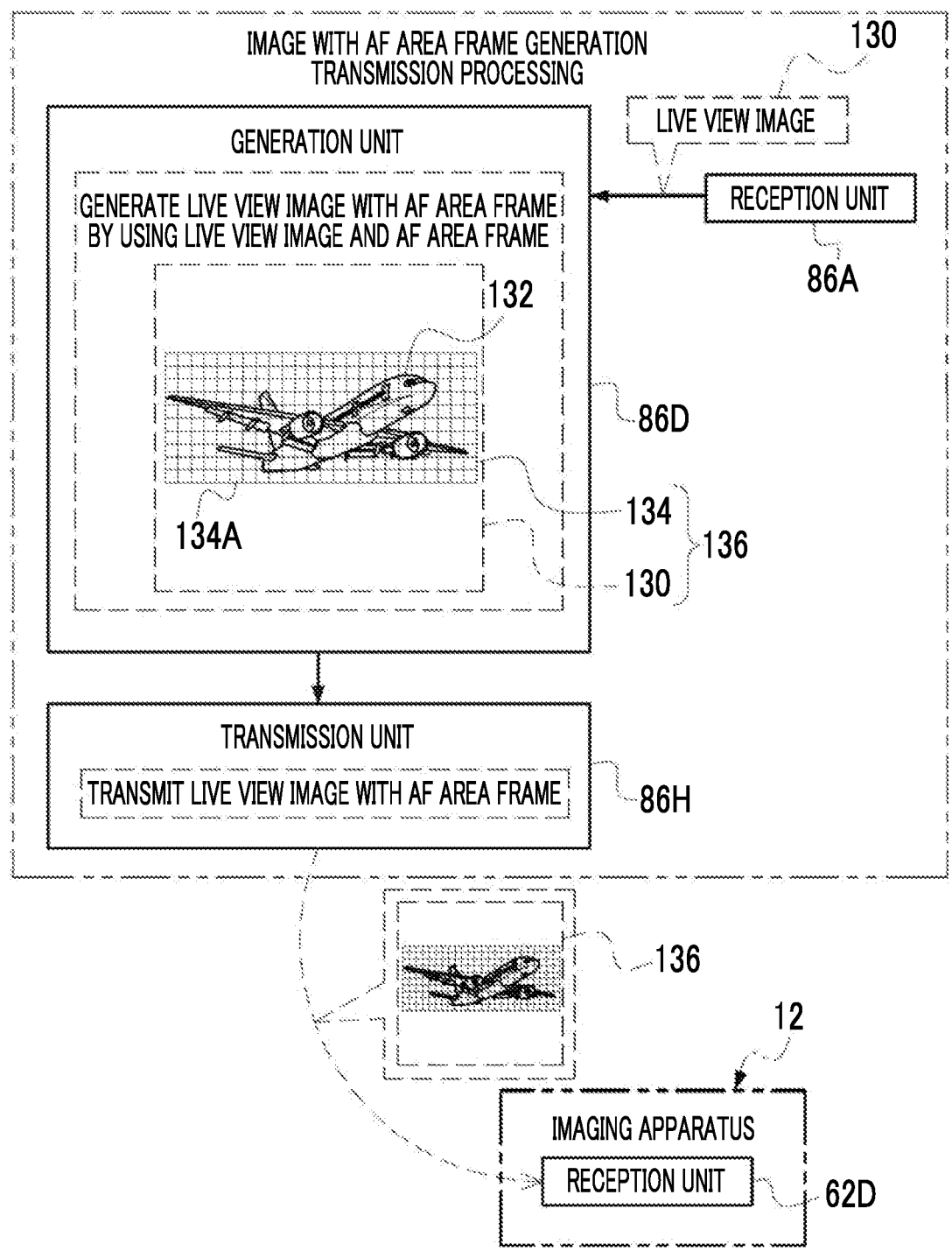
FIG. 28 is a block diagram showing an example of a content of image with AF area frame generation transmission processing.

As an example shown in FIG. 28, in the image with AF area frame generation transmission processing, the generation unit 86D generates a live view image 136 with an AF area frame by using the live view image 130 received by the reception unit 86A and the AF area frame 134 divided into a plurality of division areas 134A by the division unit 86F. The live view image 136 with an AF area frame is an image in which the AF area frame 134 is superimposed on the live view image 130. The AF area frame 134 is disposed in the live view image 130 at a position surrounding the passenger plane image 132. The transmission unit 86H displays the live view image 130, which is based on the captured image 108, on the display 28 of the imaging apparatus 12 and transmits the live view image 136 with an AF area frame, which is generated by the generation unit 86D, to the imaging apparatus 12 via the communication I/F 84 (see FIG. 4) as information for displaying the AF area frame 134 in the live view image 130. The division method, which is derived by the derivation unit 86G, can be specified from the AF area frame 134 that is divided into a plurality of division areas 134A by the division unit 86F, thereby the transmission of the live view image 136 with an AF area frame to the imaging apparatus 12 means outputting the information indicating the division method to the imaging apparatus 12. The AF area frame 134, which is divided into the plurality of division areas 134A by the division unit 86F, is an example of "information indicating a division method" according to the present disclosed technology.

In the imaging apparatus 12, the reception unit 62D receives the live view image 136 with an AF area frame, which is transmitted from the transmission unit 86H, via the communication I/F 52 (see FIG. 2).

Figure 29:
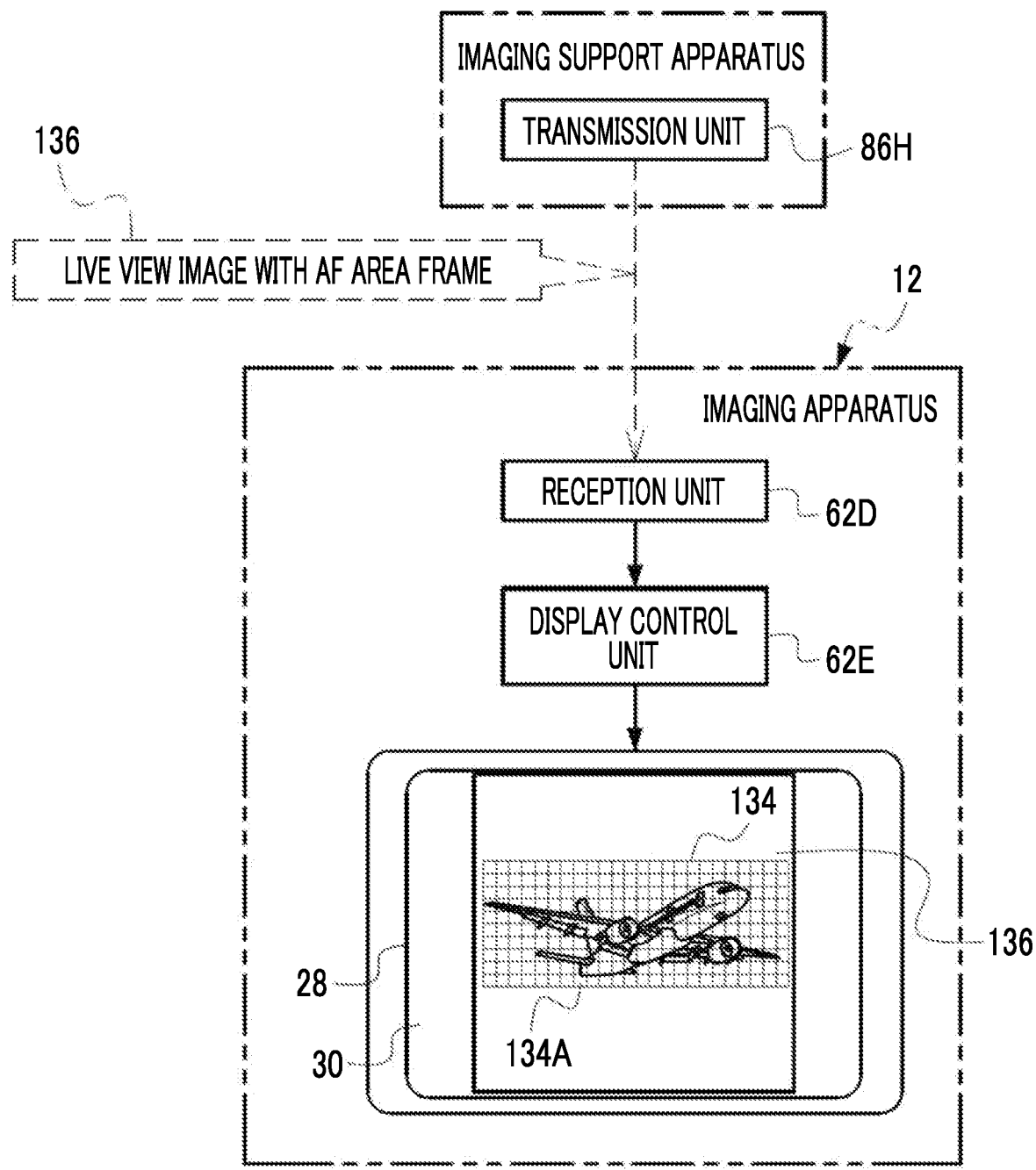
FIG. 29 is a conceptual diagram showing an example of a content of processing in the imaging apparatus in a case where an image with an AF area frame is displayed on a display of the imaging apparatus.

As an example shown in FIG. 29, in the imaging apparatus 12, the display control unit 62E displays the live view image 136 with an AF area frame received by the reception unit 62D on the display 28. For example, the AF area frame 134 is displayed on the live view image 136 with an AF area frame, and the AF area frame 134 is divided into the plurality of division areas 134A. For example, the plurality of division areas 134A are selectively designated in accordance with an instruction (for example, a touch operation) received from a touch panel 30. The CPU 62 performs AF control to set a focus on a real space region corresponding to the designated division area 134A. The CPU 62 performs the AF control for the real space region, as a target, corresponding to the designated division area 134A. That is, the CPU 62 calculates a focusing position with respect to the real space region corresponding to the designated division area 134A and moves the focus lens 40B to the calculated focusing position. The AF control may be a so-called phase difference AF method control or may be a contrast AF method control. Further, an AF method, which is based on a distance measurement result using the parallax of a pair of images obtained from a stereo camera, or an AF method, in which a distance measurement result of a TOF method using a laser beam or the like is used, may be adopted.

Next, the operation of the imaging system 10 will be described with reference to FIGS. 30 to 31B.

Figure 30:
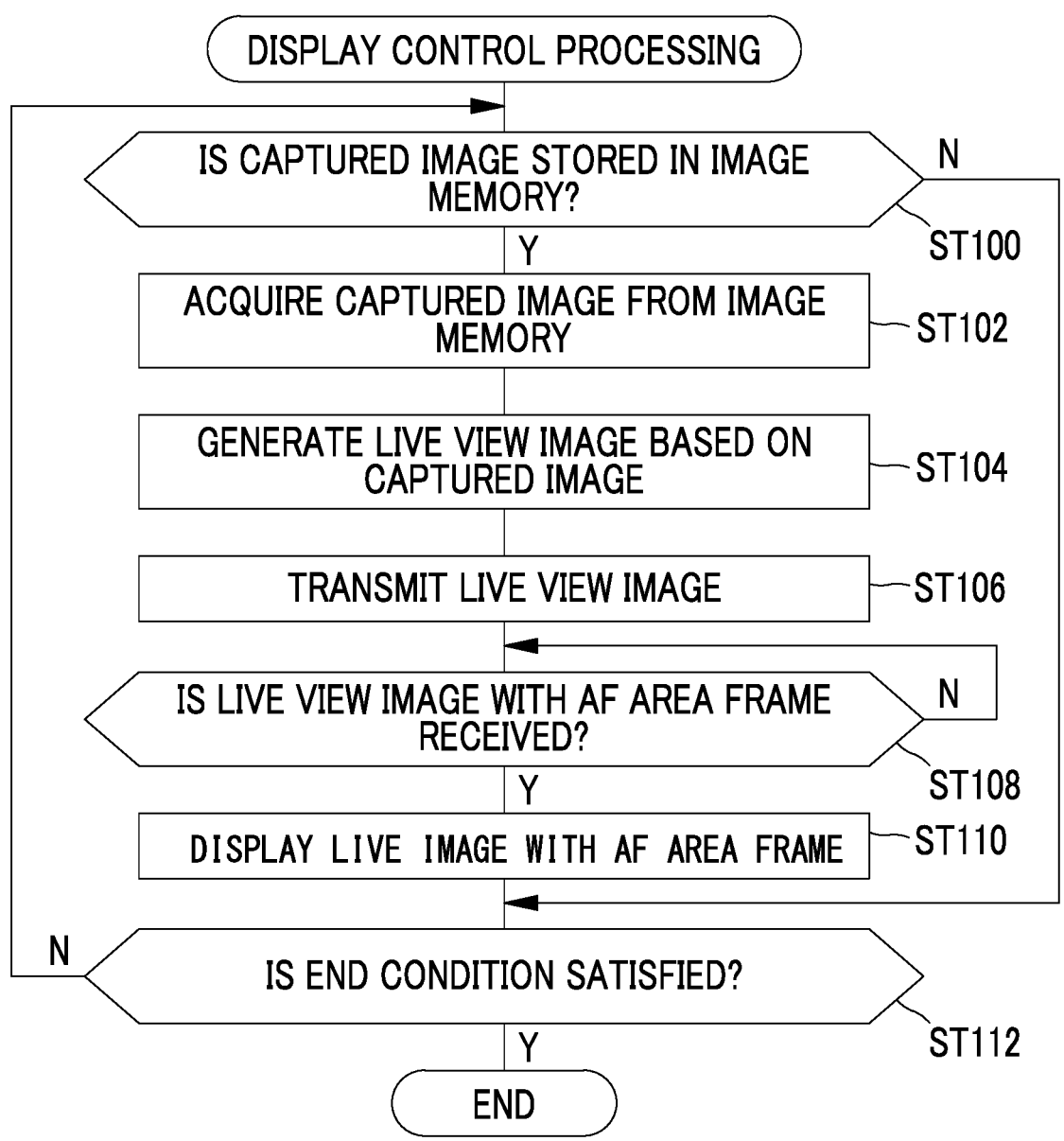
FIG. 30 is a flowchart showing an example of a flow of display control processing.

FIG. 30 shows an example of a flow of display control processing performed by the CPU 62 of the imaging apparatus 12. In the display control processing shown in FIG. 30, first, in step ST100, the acquisition unit 62A determines whether or not the captured image 108 is stored in the image memory 46. In step ST100, in a case where the captured image 108 is not stored in the image memory 46, the determination is set as negative, and the display control processing shifts to step ST112. In step ST100, in a case where the captured image 108 is stored in the image memory 46, the determination is set as positive, and the display control processing shifts to step ST102.

In step ST102, the acquisition unit 62A acquires the captured image 108 from the image memory 46. After the processing in step ST102 is executed, the display control processing shifts to step ST104.

In step ST104, the generation unit 62B generates the live view image 130 based on the captured image 108 acquired in step ST102. After the processing in step ST104 is executed, the display control processing shifts to step ST106.

In step ST106, the transmission unit 62C transmits the live view image 130 generated in step ST104 to the imaging support apparatus 14 via the communication I/F 52. After the processing in step ST106 is executed, the display control processing shifts to step ST108.

Figure 31A:
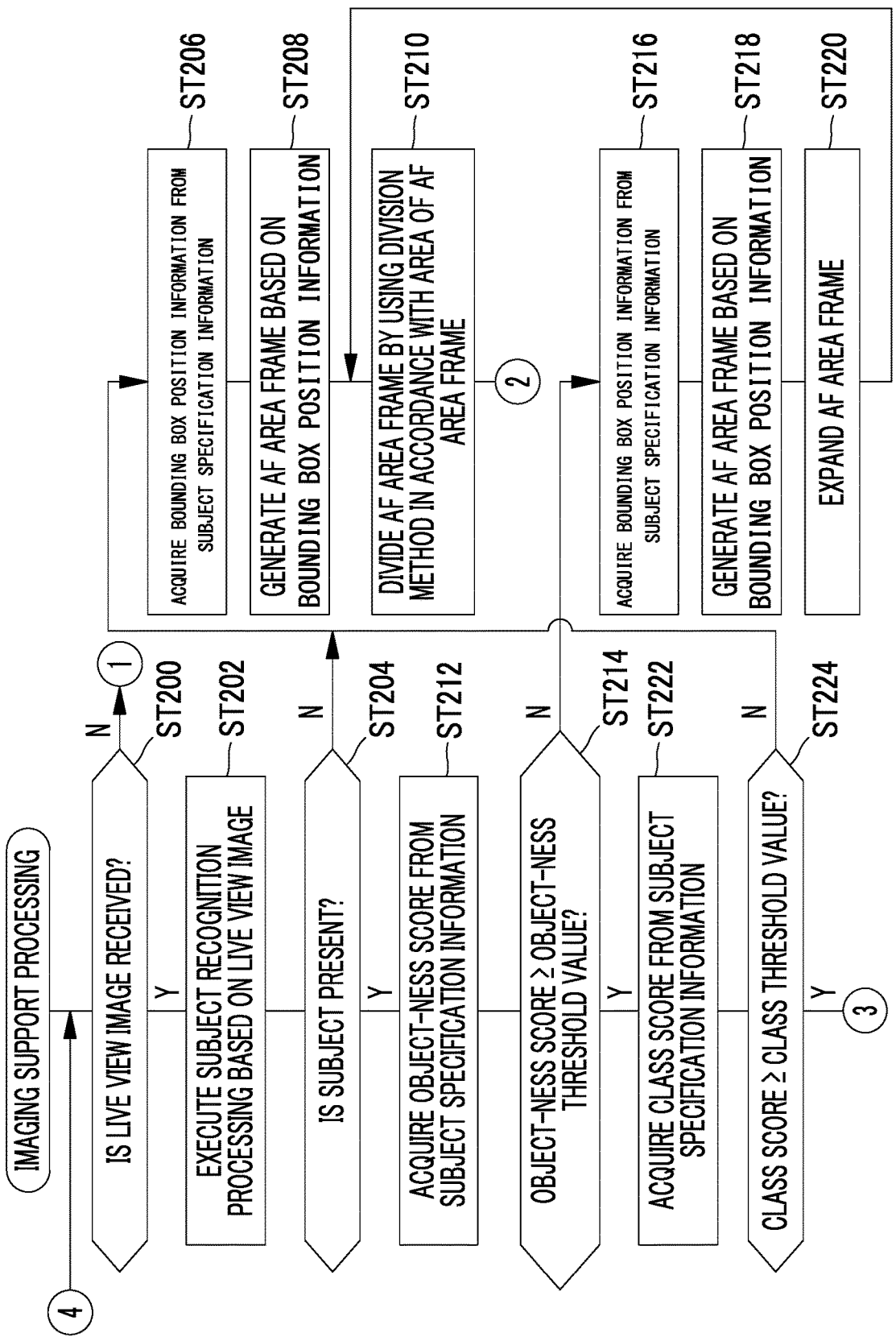
FIG. 31A is a flowchart showing an example of a flow of imaging support processing.
Figure 31B:
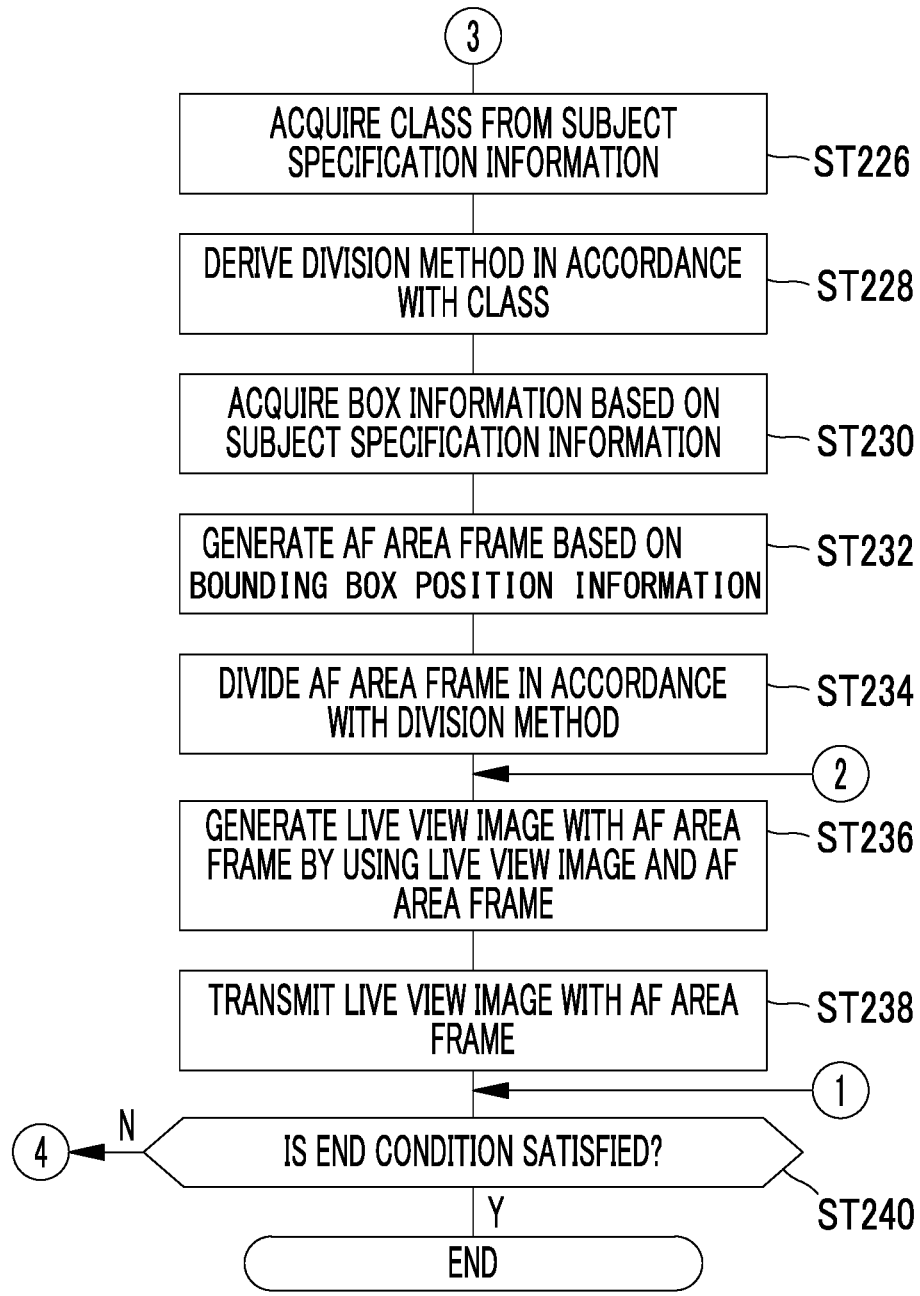
FIG. 31B is a continuation of the flowchart shown in FIG. 31A.

In step ST108, the reception unit 62D determines whether or not the live view image 136 with an AF area frame, which is transmitted from imaging support apparatus 14 by executing the processing in step ST238 that is included in the imaging support processing shown in FIG. 31B, is received by the communication I/F 52. In step ST108, in a case where the live view image 136 with an AF area frame is not received by the communication I/F 52, the determination is set as negative, and the determination in step ST108 is performed again. In step ST108, in a case where the live view image 136 with an AF area frame is received by the communication I/F 52, the determination is set as positive, and the display control processing shifts to step ST110.

In step ST110, the display control unit 62E displays the live view image 136 with an AF area frame received in step ST108 on the display 28. After the processing in step ST110 is executed, the display control processing shifts to step ST112.

In step ST112, the display control unit 62E determines whether or not the condition for ending the display control processing (hereinafter, also referred to as a "display control processing end condition") is satisfied. Examples of the display control processing end condition include a condition that the imaging mode that is set for the imaging apparatus 12 is canceled, a condition that an instruction to end the display control processing is received by a reception device 76, or the like. In step ST112, in a case where the display control processing end condition is not satisfied, the determination is set as negative, and the display control processing shifts to step ST100. In step ST112, in a case where the display control processing end condition is satisfied, the determination is set as positive, and the display control processing is ended.

FIGS. 31A and 31B show an example of a flow of the imaging support processing performed by the CPU 86 of the imaging support apparatus 14. The flow of the imaging support processing shown in FIGS. 31A and 31B is an example of an "imaging support method" according to the present disclosed technology.

In the imaging support processing shown in FIG. 31A, in step ST200, the reception unit 86A determines whether or not the live view image 130, which is transmitted by executing the processing in step ST106 shown in FIG. 30, is received by the communication I/F 84. In step ST200, in a case where the live view image 130 is not received by the communication I/F 84, the determination is set as negative, and the imaging support processing shifts to step ST240 shown in FIG. 31B. In step ST200, in a case where the live view image 130 is received by the communication I/F 84, the determination is set as positive, and the imaging support processing shifts to step ST202.

In step ST202, the execution unit 86B executes the subject recognition processing based on the live view image 130 received in step ST200. The execution unit 86B executes the subject recognition processing by using the trained model 93. That is, by providing the live view image 130 to the trained model 93, the execution unit 86B extracts the subject specification information 110 from the trained model 93 and stores the extracted subject specification information 110 in the memory 90. After the processing in step ST202 is executed, the imaging support processing shifts to step ST204.

In step ST204, the determination unit 86C determines whether or not the subject is detected by the subject recognition processing. That is, the determination unit 86C acquires the object-ness score 110B from the subject specification information 110 in the memory 90, and determines the presence or absence of the subject with reference to the acquired object-ness score 110B. In step ST204, in a case where the subject is not present, the determination is set as negative, and the imaging support processing shifts to step ST206. In step ST204, in a case where the subject is present, the determination is set as positive, and the imaging support processing shifts to step ST212.

In step ST206, the generation unit 86D acquires the bounding box position information 110A from the subject specification information 110 in the memory 90. After the processing in step ST206 is executed, the imaging support processing shifts to step ST208.

In step ST208, the generation unit 86D generates the AF area frame 134 based on the bounding box position information 110A acquired in step ST206. After the processing in step ST208 is executed, the imaging support processing shifts to step ST210.

In step ST210, the division unit 86F calculates an area of the AF area frame 134 generated in step ST208 or step ST220, and divides the AF area frame by using the division method in accordance with the calculated area (see FIG. 22). After the processing in step ST210 is executed, the imaging support processing shifts to step ST236 shown in FIG. 31B.

In step ST212, the determination unit 86C acquires the object-ness score 110B from the subject specification information 110 in the memory 90. After the processing in step ST212 is executed, the imaging support processing shifts to step ST214.

In step ST214, the determination unit 86C determines whether or not the object-ness score 110B, which is acquired in step ST212, is equal to or higher than the object-ness threshold value. In step ST214, in a case where the object-ness score 110B is lower than the object-ness threshold value, the determination is set as negative, and the imaging support processing shifts to step ST216. In step ST214, in a case where the object-ness score 110B is equal to or higher than the object-ness threshold value, the determination is set as positive, and the imaging support processing shifts to step ST222. The object-ness threshold value in a case where the imaging support processing shifts to step ST216 is an example of a "third threshold value" according to the present disclosed technology.

In step ST216, the generation unit 86D acquires the bounding box position information 110A from the subject specification information 110 in the memory 90. After the processing in step ST216 is executed, the imaging support processing shifts to step ST218.

In step ST218, the generation unit 86D generates the AF area frame 134 based on the bounding box position information 110A acquired in step ST216. After the processing in step ST218 is executed, the imaging support processing shifts to step ST220.

In step ST220, the expansion unit 86E expands the AF area frame 134 at a predetermined magnification (for example, 1.25 times). After the processing in step ST220 is executed, the imaging support processing shifts to step ST210.

In step ST222, the determination unit 86C acquires the class score 110D from the subject specification information 110 in the memory 90. After the processing in step ST222 is executed, the imaging support processing shifts to step ST224.

In step ST224, the determination unit 86C determines whether or not the class score 110D, which is acquired in step ST222, is equal to or higher than the class threshold value. In step ST224, in a case where the class score 110D is lower than the class threshold value, the determination is set as negative, and the imaging support processing shifts to step ST206. In step ST224, in a case where the class score 110D is equal to or higher than the class threshold value, the determination is set as positive, and the imaging support processing shifts to step ST226 shown in FIG. 31B.

In step ST226 shown in FIG. 31B, the derivation unit 86G acquires the class 110C from the subject specification information 110 in the memory 90. The class 110C acquired here is a class 110C having the largest class score 110D among the classes 110C included in the subject specification information 110 in the memory 90.

In step ST228, the derivation unit 86G refers to the division method derivation table 128 in the storage 88 to derive the division method in accordance with the class 110C acquired in step ST226. That is, the derivation unit 86G derives the division method corresponding to the class 110C acquired in step ST226, from the division method derivation table 128.

In step ST230, the generation unit 86D acquires the bounding box position information 110A from the subject specification information 110 in the memory 90. After the processing in step ST230 is executed, the imaging support processing shifts to step ST232.

In step ST232, the generation unit 86D generates the AF area frame 134 based on the bounding box position information 110A acquired in step ST230. After the processing in step ST232 is executed, the imaging support processing shifts to step ST234.

In step ST234, the division unit 86F divides the AF area frame 134 generated in step ST232 by using the division method derived in step ST228 (see FIGS. 25 to 27).

In step ST236, the generation unit 86D generates the live view image 136 with an AF area frame using the live view image 130, which is received in step ST200, and the AF area frame 134, which is obtained in step ST234 (see FIG. 28). After the processing in step ST236 is executed, the imaging support processing shifts to step ST238.

In step ST238, the transmission unit 86H transmits the live view image 136 with an AF area frame, which is generated in step ST236, to the imaging apparatus 12 via the communication I/F 84 (see FIG. 4). After the processing in step ST238 is executed, the imaging support processing shifts to step ST240.

In step ST240, the determination unit 86C determines whether or not the condition for ending the imaging support processing (hereinafter, also referred to as an "imaging support processing ending condition") is satisfied. Examples of the imaging support processing end condition include a condition that the imaging mode that is set for the imaging apparatus 12 is canceled, a condition that an instruction to end the imaging support processing is received by a reception device 76, or the like. In step ST240, in a case where the imaging support processing end condition is not satisfied, the determination is set as negative, and the imaging support processing shifts to step ST200 shown in FIG. 31A. In step ST240, in a case where the imaging support processing end condition is satisfied, the determination is set as positive, and the imaging support processing is ended.

As described above, in the imaging support apparatus 14, the type of the subject is acquired by the derivation unit 86G as the class 110C based on the captured image 108. The AF area frame 134 surrounds a divided region, where the subject is divided to be identifiable from other regions in the imaging range. The AF area frame 134 is divided by the division unit 86F according to the division method derived from the division method derivation table 128. The above description means that the divided region, which is surrounded by the AF area frame 134, is divided according to the division method derived from the division method derivation table 128. The division method for dividing the AF area frame 134 is derived from the division method derivation table 128 according to the class 110C acquired by the derivation unit 86G The AF area frame 134, which is divided by using the division method derived from the division method derivation table 128, is included in the live view image 136 with an AF area frame, and the live view image 136 with an AF area frame is transmitted to the imaging apparatus 12 by the transmission unit 86H. Since the division method can be specified from the AF area frame 134 included in the live view image 136 with an AF area frame, the fact that the live view image 136 with an AF area frame is transmitted to the imaging apparatus 12 means that the information indicating the division method, which is derived from the division method derivation table 128, is also transmitted to the imaging apparatus 12. Therefore, according to the present configuration, the control (for example, the AF control) related to imaging on a subject by the image sensor 20 of the imaging apparatus 12 can be performed with high accuracy as compared with a case where the AF area frame 134 is constantly divided by a fixed division method regardless of the type of subject.

Further, in the imaging support apparatus 14, the class 110C is inferred based on the subject specification information 110 that is the output result output from the trained model 93 by providing the live view image 130 to the trained model 93. Therefore, according to the present configuration, it is possible to accurately grasp the class 110C to which the subject belongs, as compared with a case where the class 110C is acquired only by using the template matching method without using the trained model 93.

Further, in the imaging support apparatus 14, the trained model 93 makes an object (for example, the subject image such as the passenger plane image 132, the face image 120A, or the automobile image 124A), which is within the bounding box 116 applied to the live view image 130, belong to the corresponding class 110C. The subject specification information 110, which is the output result output from the trained model 93, includes the class score 110D, which is a value based on the probability that the object, which is included within the bounding box 116 applied to the live view image 130, belongs to the specific class 110C. Therefore, according to the present configuration, the class 110C to which the subject belongs can be grasped with high accuracy as compared with a case where the class 110C is inferred only by using the template matching method without using the class score 110D that is obtained from the trained model 93.

Further, in the imaging support apparatus 14, the class score 110D is acquired as a value based on the probability that the object, which is included within the bounding box 116, belongs to the specific class 110C in a case where the object-ness score 110B is equal to or higher than the object-ness threshold value. Thereafter, the class 110C to which the subject belongs is inferred based on the acquired class score 110D. Therefore, according to the present configuration, the class 110C to which the subject belongs, that is, the type of subject can be specified with high accuracy as compared with a case where a class 110C is inferred based on the class score 110D acquired as a value based on the probability that the object, which is included within the bounding box 116, belongs to the specific class 110C whether or not the object is present within the bounding box 116.

Further, in the imaging support apparatus 14, the class 110C to which the subject belongs is inferred based on the class score 110D that is equal to or higher than the class threshold value. Therefore, according to the present configuration, the class 110C to which the subject belongs, that is, the type of the subject can be specified with high accuracy as compared with a case where the class 110C to which the subject belongs is inferred based on the class score 110D that is lower than the class threshold value.

Further, in the imaging support apparatus 14, the AF area frame 134 is expanded in a case where the object-ness score 110B is lower than the object-ness threshold value. Therefore, according to the present configuration, it is possible to increase the probability that the object is present within the AF area frame 134 as compared with a case where the AF area frame 134 has a constant size.

Further, in the imaging support apparatus 14, the number of divisions, into which the AF area frame 134 is divided, is defined by using the division method derived from the division method derivation table 128 by the derivation unit 86G Therefore, according to the present configuration, it is possible to accurately perform control related to imaging on a location within the subject, where the user or the like intends to perform imaging, by the image sensor 20 as compared with a case where the number of divisions of the AF area frame 134 is constant.

Further, in the imaging support apparatus 14, the number of divisions of the AF area frame 134 in the vertical direction and the horizontal direction is defined by using the division method derived from the division method derivation table 128 by the derivation unit 86G Therefore, according to the present configuration, it is possible to accurately perform control related to imaging on a location within the subject, where the user or the like intends to perform imaging, by the image sensor 20 as compared with a case where the number of divisions of the AF area frame 134 is defined in only one of the vertical direction and horizontal direction.

Further, in the imaging support apparatus 14, the number of divisions of the AF area frame 134 in the vertical direction and the number of divisions of the AF area frame 134 in the horizontal direction, into which the AF area frame 134 is divided by using the division method derived from the division method derivation table 128 by the derivation unit 86G are defined based on the composition of the subject image (for example, the passenger plane image 132 shown in FIG. 25) in the live view image 130. Therefore, according to the present configuration, it is possible to accurately perform control related to imaging on a location within the subject, where the user or the like intends to perform imaging, by the image sensor 20 as compared with a case where the number of divisions of the AF area frame 134 in the vertical direction and the number of divisions of the AF area frame 134 in the horizontal direction are defined regardless of the composition of the subject image in the live view image 130.

Further, in the imaging support apparatus 14, the live view image 136 with an AF area frame is transmitted to the imaging apparatus 12. Thereafter, the live view image 136 with an AF area frame is displayed on the display 28 of the imaging apparatus 12. Therefore, according to the present configuration, it is possible to make the user or the like recognize a subject that is a target of control related to imaging performed by the image sensor 20 of the imaging apparatus 12.

In the above-described embodiment, although an example of the embodiment in which the live view image 136 with an AF area frame, which includes an AF area frame 134 divided according to the division method, is transmitted to the imaging apparatus 12 by the transmission unit 86H has been described, the present disclosed technology is not limited to this. For example, the CPU 86 of the imaging support apparatus 14 may transmit the information, which is used for contributing to moving the focus lens 40B to the focusing position in accordance with the class 110C acquired from the subject specification information 110, to the imaging apparatus 12 via the communication I/F 84. Specifically, the CPU 86 of the imaging support apparatus 14 may transmit the information, which is used for contributing to moving the focus lens 40B to the focusing position corresponding to the division area 134A in accordance with the class 110C acquired from the subject specification information 110 among the plurality of division areas 134A, to the imaging apparatus 12 via the communication I/F 84.

Figure 32:
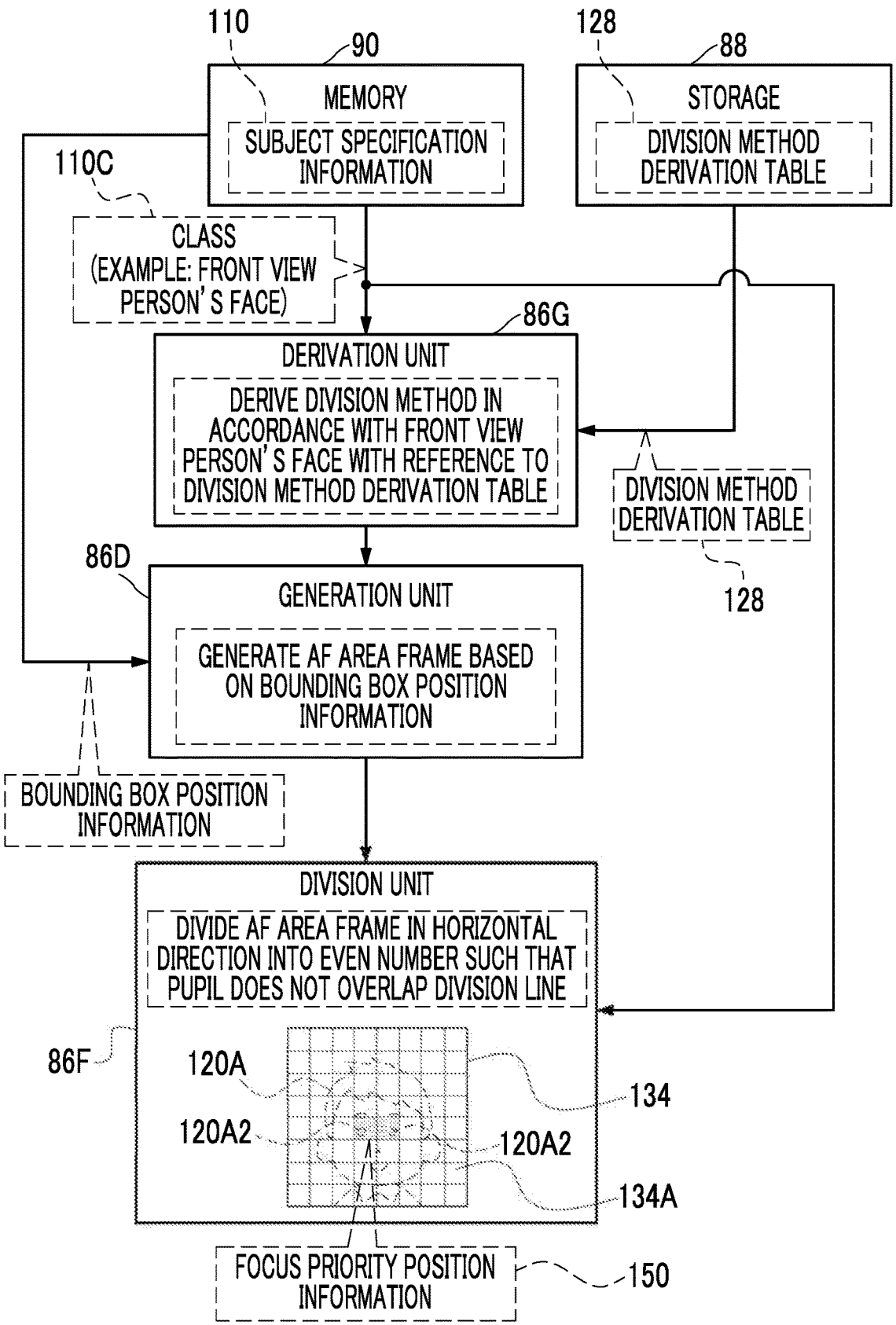
FIG. 32 is a conceptual diagram showing an example of an aspect in which focus priority position information is added to an AF area frame.

In this case, as an example shown in FIG. 32, in a case where a face image 120A, which is obtained by imaging the face of a person 120 (see FIG. 13) from the front side, is surrounded by the AF area frame 134, and the face image 120A is positioned at a first predetermined location of AF area frame 134, as in the above embodiment, the division unit 86F equally divides the AF area frame 134 in the horizontal direction into an even number. Thereafter, the division unit 86F acquires the class 110C from the subject specification information 110 in the memory 90, similarly to the derivation unit 86G Thereafter, the division unit 86F detects a pupil image 120A2 showing the pupil from the face image 120A and adds the focus priority position information 150 to the division area 134A including the detected pupil image 120A2. The focus priority position information 150 is information used for contributing to moving the focus lens 40B to the focusing position where a focus is set on the pupil shown by the pupil image 120A2. The focus priority position information 150 includes position information that can be used for specifying a relative position of the division area 134A within the AF area frame 134. The focus priority position information 150 is an example of "information used for contributing to moving a focus lens to a focusing position corresponding to a division region obtained in accordance with the type" and "information used for contributing to moving a focus lens to a focusing position obtained in accordance with the type" according to the present disclosed technology.

Figure 33:
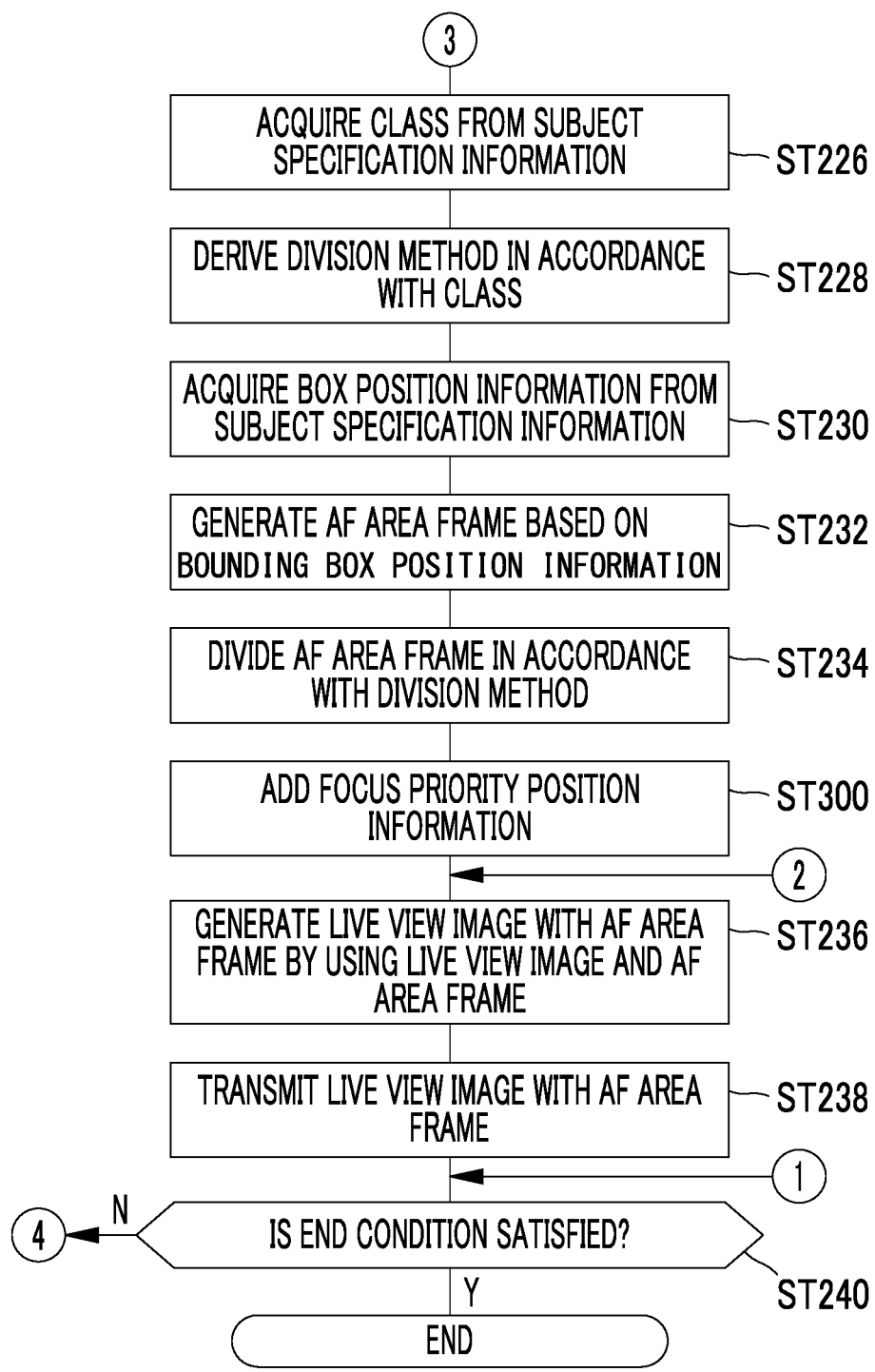
FIG. 33 is a flowchart showing a first modification example of a flow of the imaging support processing.

In the imaging support processing shown in FIG. 33, step ST300 is added between step ST234 and step ST236. In step ST300, the division unit 86F detects the pupil image 120A2 showing the pupil from the face image 120A and adds the focus priority position information 150 to the division area 134A including the detected pupil image 120A2 among the plurality of division areas 134A included in the AF area frame 134 divided in step ST234.

As a result, the live view image 136 with an AF area frame includes the AF area frame 134 to which the focus priority position information 150 is added. The live view image 136 with an AF area frame is transmitted to the imaging apparatus 12 by the transmission unit 86H (see step ST238 shown in FIG. 33).

The CPU 62 of the imaging apparatus 12 receives the live view image 136 with an AF area frame transmitted by the transmission unit 86H, and performs AF control according to the focus priority position information 150 of the AF area frame 134 included in the received live view image 136 with an AF area frame. That is, the CPU 62 moves the focus lens 40B to the focusing position where a focus is set on the position of the pupil specified from the focus priority position information 150. In this case, it is possible to perform focusing on the important position of the subject with high accuracy as compared with a case where the focus lens 40B is moved only to the focusing position corresponding to the same location constantly in the imaging range.

The embodiment in which the AF control is performed in accordance with the focus priority position information 150 is merely an example, and the important position of the subject may be notified to the user or the like by using the focus priority position information 150. In this case, for example, the division area 134A, to which the focus priority position information 150 is added in the AF area frame 134 displayed on the display 28 of the imaging apparatus 12, may be displayed in an aspect (for example, an aspect of emphasizing the frame of the division area 134A) identifiable from the other division areas 134A. As a result, it is possible for the user or the like to visually recognize which position in the AF area frame 134 is the important position.

In the above-described embodiment, although an example of the embodiment in which the bounding box 116 is used as it is as the AF area frame 134 has been described, the present disclosed technology is not limited to this. For example, the CPU 62 may change the size of the AF area frame 134 according to the class score 110D acquired from the subject specification information 110.

Figure 34:
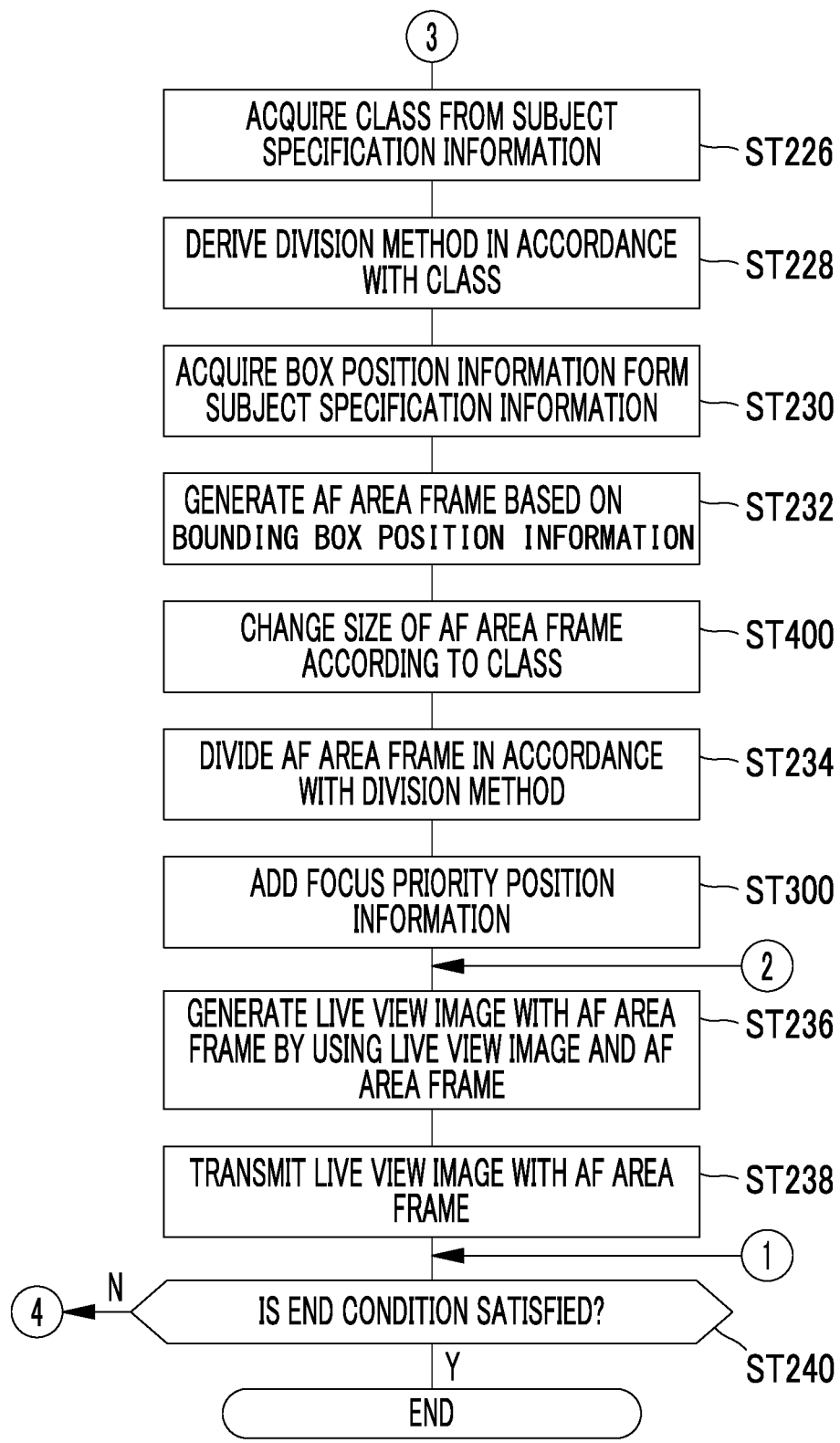
FIG. 34 is a flowchart showing a second modification example of a flow of the imaging support processing.

In this case, as an example shown in FIG. 34, in the imaging support processing, step ST400 is added between step ST232 and step ST234. In step ST400, the generation unit 86D acquires the class score 110D from the subject specification information 110 in the memory 90 and changes the size of the AF area frame 134 generated in step ST232 according to the acquired class score 110D. In the example shown in FIG. 35, an example of the embodiment in which the size of the AF area frame 134 is reduced according to the class score 110D is shown. In this case, the AF area frame 134 may be reduced to a size surrounding a region in which the class scores 110D that is equal to or higher than a reference value is distributed, among the class scores 110D (see FIG. 9) added to each cell 114 (see FIG. 9) of the AF area frame 134 before reduction. The reference value may be a variable value that is changed according to the instruction, which is provided to the imaging support apparatus 14, and/or various conditions, or may be a fixed value.

Figure 35:
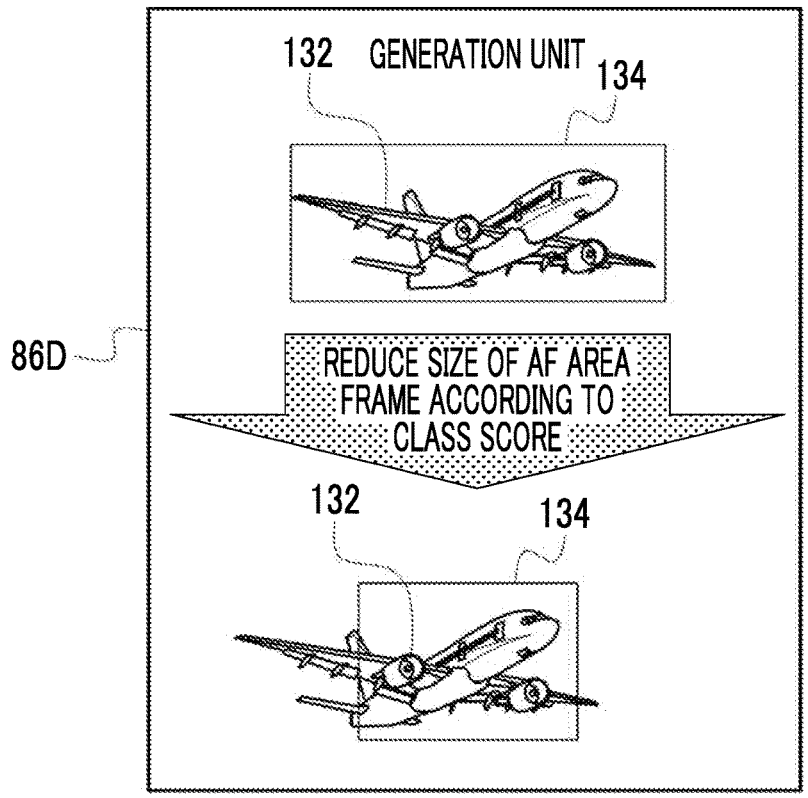
FIG. 35 is a conceptual diagram showing an example of an aspect of an AF area frame in which size is reduced according to a class score.

According to the examples shown in FIGS. 34 and 35, since the size of the AF area frame 134 is changed in accordance to the class score 110D that is acquired from the subject specification information 110, it is possible to improve the accuracy of control related to imaging on the subject by the image sensor 20 as compared with a case where the size of the AF area frame 134 is constant.

Figure 36:
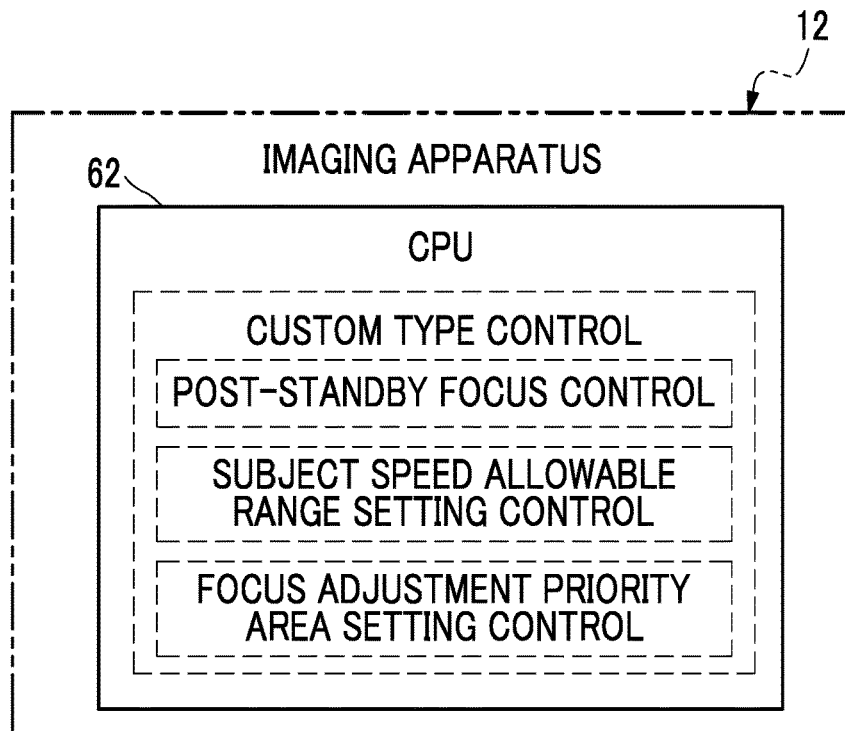
FIG. 36 is a block diagram showing an example of a content of custom type control.

In the above-described embodiment, although an example in which the imaging apparatus 12 performs the AF control by using the AF area frame 134 included in the live view image 136 with an AF area frame has been described, the present disclosed technology is not limited to this, and the imaging apparatus 12 may perform control related to imaging other than the AF control by using the AF area frame 134 included in the live view image 136 with an AF area frame. For example, as shown in FIG. 36, the control related to the imaging other than the AF control may include custom type control. The custom type control has a recommendation of changing the control content (hereinafter also simply referred to as a "control content") of control related to imaging according to the subject and is control for changing the control content in response to the provided instruction. The CPU 86 acquires the class 110C from the subject specification information 110 in the memory 90 and outputs information used for contributing to changing the control content according to the acquired class 110C.

For example, the custom type control is control including at least one of post-standby focus control, subject speed allowable range setting control, and focus adjustment priority area setting control. The post-standby focus control is control for moving the focus lens 40B toward the focusing position after waiting for a predetermined time (for example, 10 seconds) in a case where a position of the focus lens 40B is out of the focusing position where the focus is set on the subject. The subject speed allowable range setting control is control for setting an allowable range of the speed of the subject on which the focus is set. The focus adjustment priority area setting control is control for setting which division area 134A, among the plurality of division areas 134A in the AF area frame 134, is prioritized for adjustment of the focus.

Figure 37:
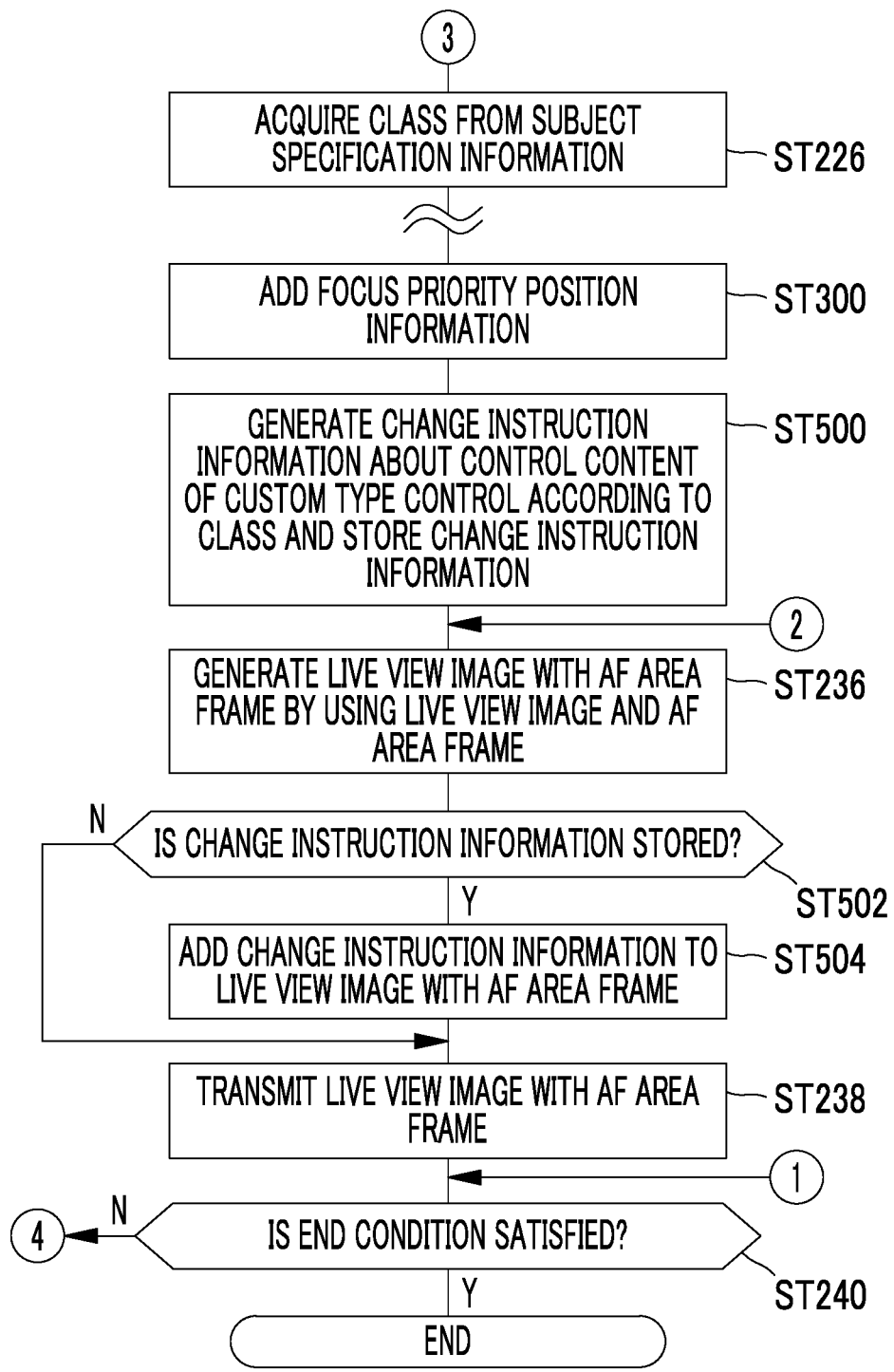
FIG. 37 is a flowchart showing a third modification example of a flow of the imaging support processing.

In such a case where the AF area frame 134 is used for the custom type control, for example, the imaging support processing shown in FIG. 37 is performed by the CPU 86. The imaging support processing shown in FIG. 37 differs from the imaging support process shown in FIG. 34 in that step ST500 is provided between step ST300 and step ST236 and step ST502 and step ST504 are provided between step ST236 and step ST238.

In the imaging support processing shown in FIG. 37, in step ST500, the CPU 86 acquires the class 110C from the subject specification information 110 in the memory 90, generates change instruction information for providing an instruction of changing in the control content of the custom type control according to the acquired class 110C, and stores the change instruction information in the memory 90. Examples of the control content include standby time used in the subject speed allowable range setting control, an allowable range used in the subject speed allowable range setting control, and information that can be used for specifying a relative position of the focus priority division area (that is, the division area 134A to be prioritized for adjustment of the focus) used in the focus adjustment priority area setting control within the AF area frame 134. Further, the change instruction information may include the specific content for changing. The content for changing may be, for example, a content predetermined for each class 110C. The change instruction information is an example of "information used for contributing to changing the control content" according to the present disclosed technology.

In step ST502, the CPU 86 determines whether or not the change instruction information is stored in the memory 90. In step ST502, in a case in which the change instruction information is not stored in the memory 90, the determination is set as negative, and the imaging support processing shifts to step ST238. In step ST502, in a case in which the change instruction information is stored in the memory 90, the determination is set as positive, and the imaging support processing shifts to step ST504.

In step ST504, the CPU 86 adds the change instruction information in the memory 90 to the live view image 136 with an AF area frame generated in step ST236. Thereafter, the change instruction information is erased from the memory 90.

In a case where the live view image 136 with an AF area frame is transmitted to the imaging apparatus 12 by executing the processing in step ST238, the CPU 62 of the imaging apparatus 12 receives the live view image 136 with an AF area frame. Thereafter, the CPU 62 displays an alert prompting the user to change the control content of the custom type control in accordance with the change instruction information that is added to the live view image 136 with an AF area frame on the display 28.

Further, although an example of the embodiment in which the alert is displayed on the display 28 has been described here, the present disclosed technology is not limited to this, and the CPU 62 may change the control content of the custom type control in accordance with the change instruction information. Further, the CPU 62 may store a history of receiving the change instruction information in the NVM 64. In a case where the history of receiving the change instruction information is stored in the NVM 64, the live view image 136 with an AF area frame to which the change instruction information is added, the live view image 130 included in the live view image 136 with an AF area frame to which the change instruction information is added, a thumbnail image of the live view image 136 with an AF area frame to which the change instruction information is added, or a thumbnail image of the live view image 130 included in the live view image 136 with an AF area frame to which the change instruction information is added, may be associated with the history and stored in NVM 64. In this case, it is possible to make the user or the like know in what kind of scene the custom type control should be performed.

According to the example shown in FIG. 36 and FIG. 37, the control related to the imaging other than the AF control includes the custom type control, and the CPU 86 acquires the class 110C from the subject specification information 110 in the memory 90 and outputs the information used for contributing to changing the control content according to the acquired class 110C. Therefore, it is possible to realize imaging using the custom type control suitable for the class 110C as compared with a case where the control content of the custom type control is changed according to an instruction provided from the user or the like, relying only on user's own intuition.

In the example shown in FIGS. 36 and 37, although an example of the embodiment in which the CPU 86 acquires the class 110C from the subject specification information 110 in the memory 90 and outputs the information used for contributing to changing the control content according to the acquired class 110C has been described, the present disclosed technology is not limited to this. For example, the subject specification information 110 may have a subject state (for example, the subject is being moved, the subject is stopped, the speed of movement of the subject, the trajectory of the movement of the subject, or the like) as a subclass in addition to the class 110C. In this case, the CPU 86 acquires the class 110C and the subclass from the subject specification information 110 in the memory 90 and outputs information used for contributing to changing the control content according to the acquired class 110C and the subclass. As a result, it is possible to realize imaging using the custom type control suitable for the class 110C and the subclass as compared with a case where the control content of the custom type control is changed according to an instruction provided from the user or the like, relying only on user's own intuition.

Figure 38:
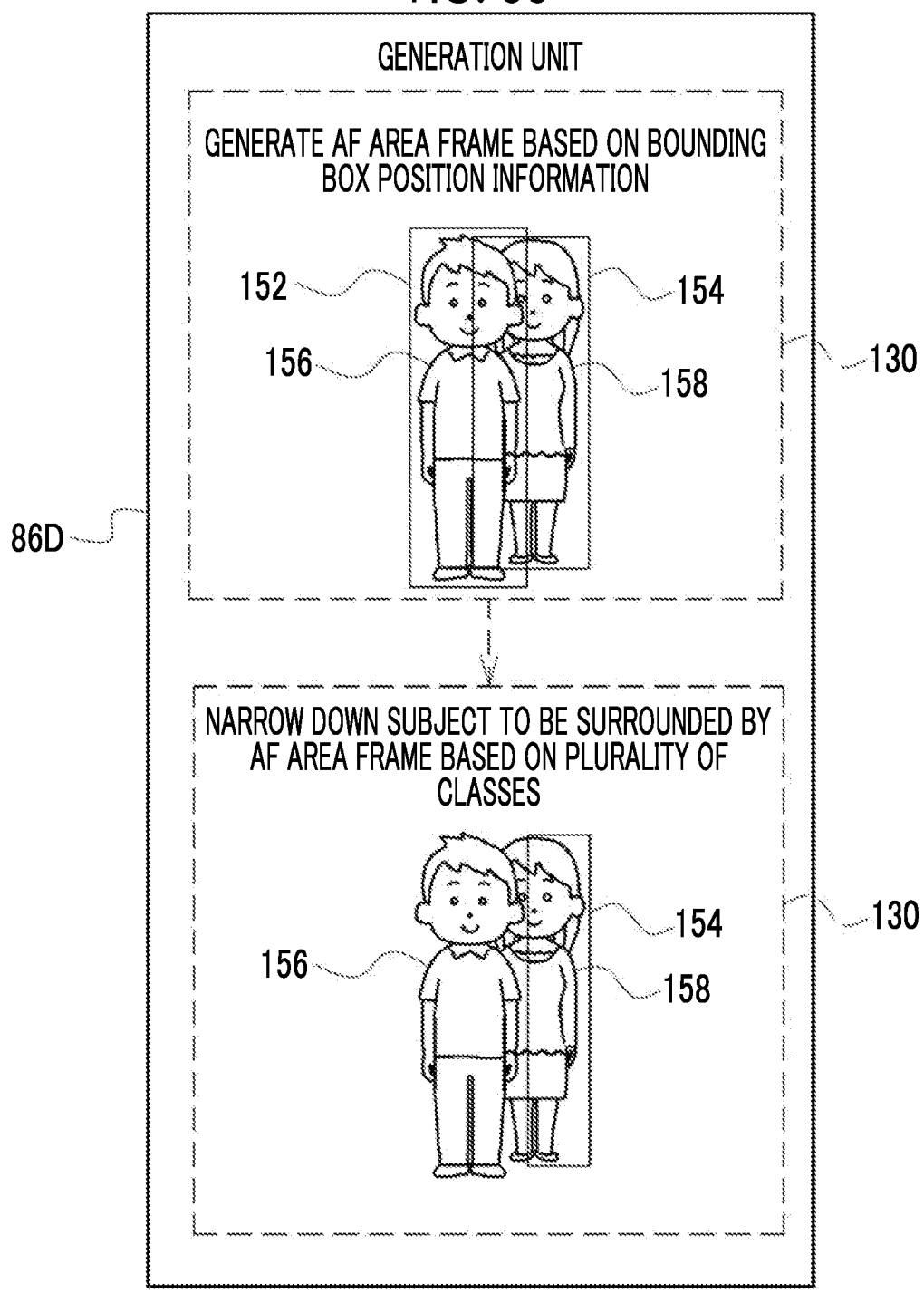
FIG. 38 is a conceptual diagram showing an example of a content of processing of narrowing down a subject to be surrounded by an AF area frame in a case where a plurality of AF area frames overlap with each other.

In the above-described embodiment, for convenience of explanation, although an example of the embodiment in which one bounding box 116 is applied to one frame of the live view image 130 has been described, a plurality of bounding boxes 116 appear for one frame of the live view image 130 in a case where a plurality of subjects are included in the imaging range. Further, it is conceivable that the plurality of bounding boxes 116 overlap each other. For example, in a case where two bounding boxes 116 overlap each other, as an example shown in FIG. 38, one bounding box 116 is generated as an AF area frame 152 and the other bounding box 116 is generated as an AF area frame 154 by the generation unit 86D, and the AF area frame 152 and the AF area frame 154 overlap each other. In this case, the person image 156, which is an object in the AF area frame 152, and the person image 158, which is an object in the AF area frame 154, overlap each other. In the example shown in FIG. 38, since the person image 158 overlaps the person image 156 on the back side, in a case where the AF area frame 154 surrounding the person image 158 is used for the AF control, the focus may be set on the person shown in the person image 156.

Therefore, the generation unit 86D acquires the class 110C, to which the person image 156 within the AF area frame 152 belongs, and the class 110C, to which the person image 158 within the AF area frame 154 belongs, from the subject specification information 110 (see FIG. 18) described in the above embodiment. The class 110C to which the person image 156 belongs and the class 110C to which the person image 158 belongs are examples of "object specific class information" according to the present disclosed technology.

The generation unit 86D narrows down an image to be surrounded by a frame from the person image 156 and the person image 158 based on the class 110C to which the person image 156 belongs and the class 110C to which the person image 158 belongs. For example, different priority levels are assigned in advance to the class 110C to which the person image 156 belongs and the class 110C to which the person image 158 belongs, and the generation unit 86D narrows down the image of the class 110C having a high priority level in the frame as a narrowing-down target. In the example shown in FIG. 38, since a priority level of the class 110C to which the person image 158 belongs is higher than a priority level of the class 110C to which the person image 156 belongs, a range of the person image 158 surrounded by the AF area frame 154 is narrowed down to a range excluding a region (in the example shown in FIG. 38, a region where the AF area frame 152 and the AF area frame 154 overlap each other) overlapping the person image 156. As described above, the AF area frame 154, which is narrowed down to the range surrounding the person image 158, is divided by using the division method described in the embodiment. The live view image 136 with an AF area frame including the AF area frame 154 is transmitted to the imaging apparatus 12 by the transmission unit 86H. As a result, the CPU 62 of the imaging apparatus 12 performs the AF control or the like by using the AF area frame 154 (that is, the AF area frame 154 which is narrowed down to the range excluding a region where the range of the person image 158 overlaps the person image 156), which is narrowed down to the range surrounding the person image 158. In this case, even in a case where the person shown in the person image 156 and the person shown in the person image 158 overlap in the depth direction, it is possible to make it easier for the user or the like to set the focus on the intended person as compared with a case where the AF area frames 154 and 156 are used for the AF control or the like without adjustment. Further, although a person is illustrated here as a subject, it is needless to say that this is merely an example and may be a subject other than a person.

Figure 39:
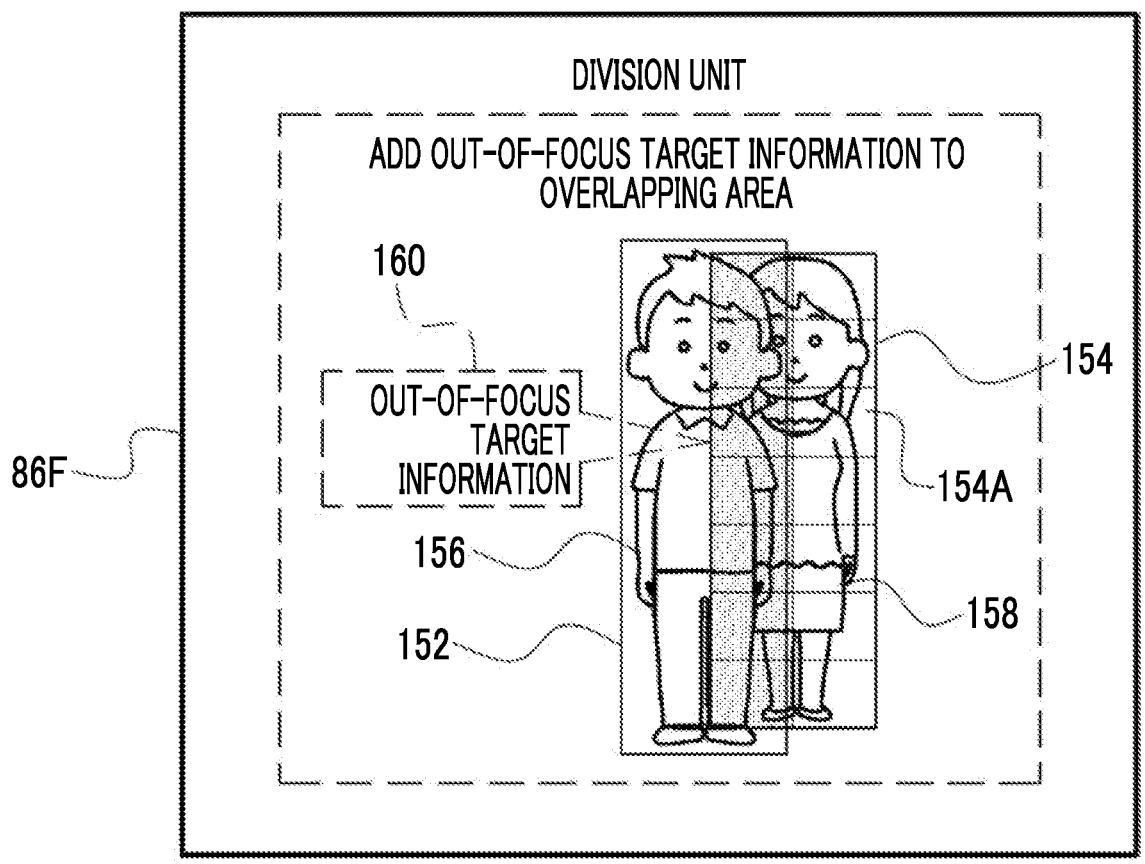
FIG. 39 is a conceptual diagram showing an example of an aspect in which out-of-focus target information is added to one AF area frame in a case where a plurality of AF area frames overlap with each other.

Further, as an example shown in FIG. 39, the out-of-focus target information 160 may be added to a portion of the AF area frame 154 that overlaps with the AF area frame 152 by the division unit 86F. The out-of-focus target information 160 is information indicating that an area excluded from a target on which the focus is set. Further, although the out-of-focus target information 160 is illustrated here, the present disclosed technology is not limited to this, and out-of-imaging related control target information may be applied instead of the out-of-focus target information 160. The out-of-imaging related control target information is information indicating that the area is excluded from the above-described imaging related control target.

In the above-described embodiment, although an example of the embodiment in which the division method where the composition of the passenger plane image 132 is reflected is derived from the division method derivation table 128 has been described, the present disclosed technology is not limited to this. For example, a division method, where a composition of the high-rise building image obtained by capturing the high-rise building from an obliquely lower side or an oblique upper side is reflected, may be derived from the division method derivation table 128. In this case, the AF area frame 134 surrounding the high-rise building image is formed to be vertically long, and the number of divisions in the vertical direction is larger than the number of divisions in the horizontal direction. For images that are obtained by capturing the subject with a composition to have a stereoscopic effect not only the passenger plane image 132 and the high-rise building image, a division method in accordance with the composition may be derived from the division method derivation table 128.

In the above-described embodiment, although the AF area frame 134 has been illustrated, the present disclosed technology is not limited to this, and instead of the AF area frame 134, or together with the AF area frame 134, an area frame for limiting targets such as exposure control, white balance control, and/or gradation control may be used. Also in this case, as in the above embodiment, the area frame is generated by the imaging support apparatus 14, and the generated area frame is transmitted from the imaging support apparatus 14 to the imaging apparatus 12 and used by the imaging apparatus 12.

In the above-described embodiment, although an example of the embodiment in which the subject is recognized by using the AI subject recognition method has been described, the present disclosed technology is not limited to this, and the subject may be recognized by using another subject recognition method such as a template matching method.

In the above-described embodiment, the live view image 130 has been illustrated, the present disclosed technology is not limited to this. For example, a post view image may be used instead of the live view image 130. That is, the subject recognition processing (see step ST202 shown in FIG. 31A) may be executed based on the post view image. Further, the subject recognition processing may be executed based on the captured image 108. Further, the subject recognition processing may be executed based on the phase difference image including a plurality of phase difference pixels. In this case, the imaging support apparatus 14 can provide the imaging apparatus 12 together with the plurality of phase difference pixels used for distance measurement together with the AF area frame 134.

Figure 40:
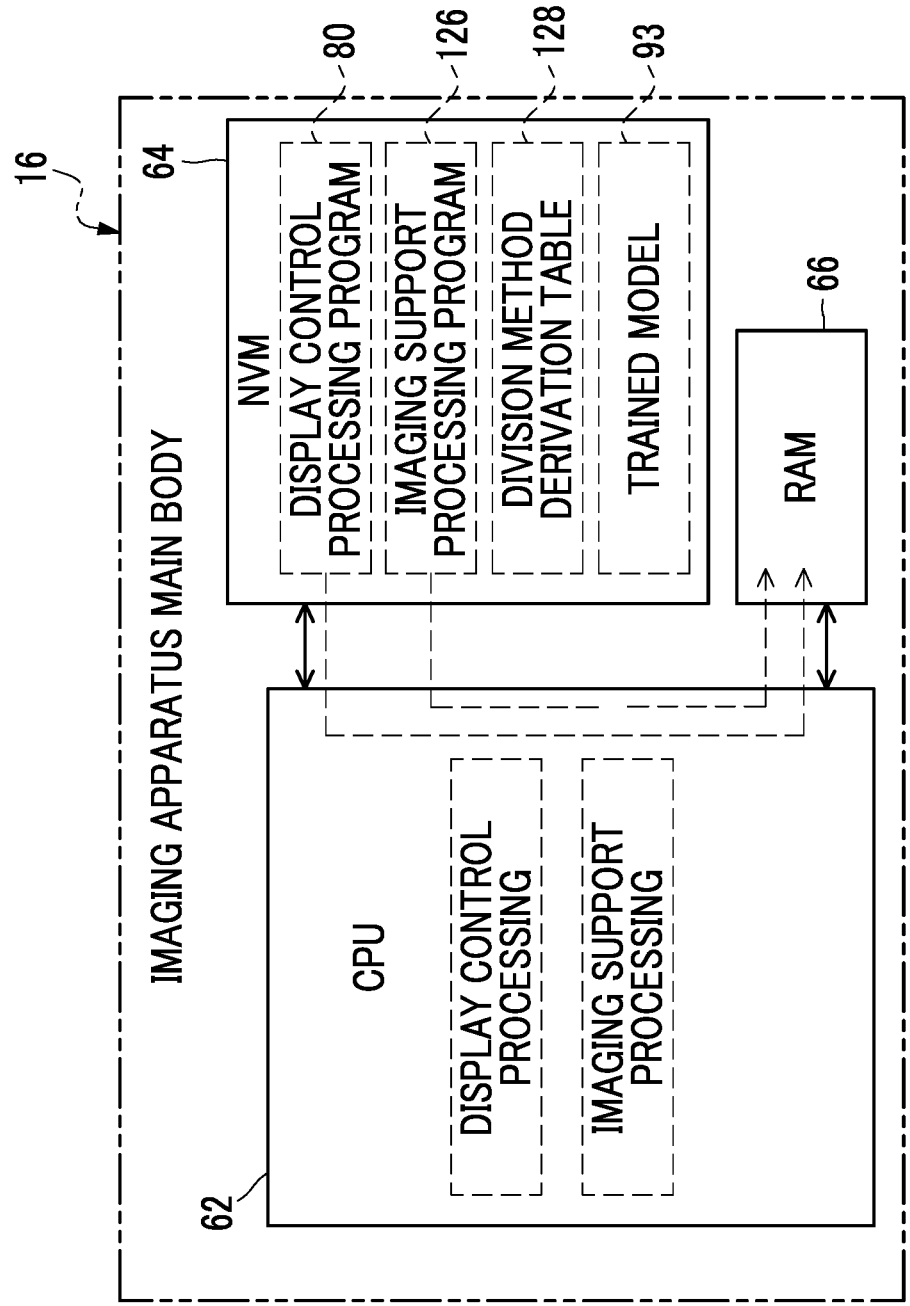
FIG. 40 is a block diagram showing an example of a configuration of the imaging apparatus main body in a case where functions of the imaging support apparatus are assigned to the imaging apparatus.

In the above embodiment, although an example of the embodiment in which the imaging apparatus 12 and the imaging support apparatus 14 are separated has been described, the present disclosed technology is not limited to this, and the imaging apparatus 12 and the imaging support apparatus 14 may be integrated. In this case, for example, as shown in FIG. 40, the NVM 64 of the imaging apparatus main body 16 may store the trained model 93, the imaging support processing program 126, and the division method derivation table 128 in addition to the display control processing program 80, and the CPU 62 may use the trained model 93, the imaging support processing program 126, and the division method derivation table 128 in addition to the display control processing program 80.

Further, as described above, in a case where the imaging apparatus 12 is to be responsible for the function of the imaging support apparatus 14, at least one other CPU, at least one GPU, and/or at least one TPU may be used instead of the CPU 62 or together with the CPU 62.

In the above embodiment, although an example of the embodiment in which the imaging support processing program 126 is stored in the storage 88 has been described, the present disclosed technology is not limited to this. For example, the imaging support processing program 126 may be stored in a portable non-temporary storage medium such as an SSD or a USB memory. The imaging support processing program 126 stored in the non-temporary storage medium is installed in a computer 82 of the imaging support apparatus 14. The CPU 86 executes the imaging support processing according to the imaging support processing program 126.

Further, the imaging support processing program 126 may be stored in the storage device such as another computer or a server device connected to the imaging support apparatus 14 via the network 34, the imaging support processing program 126 may be downloaded in response to the request of the imaging support apparatus 14, and the imaging support processing program 126 may be installed in the computer 82.

It is not necessary to store all of the imaging support processing programs 126 in the storage device such as another computer or a server device connected to the imaging support apparatus 14, or the storage 88, and a part of the imaging support processing program 126 may be stored.

Further, although the imaging apparatus 12 shown in FIG. 2 has a built-in controller 44, the present disclosed technology is not limited to this, for example, the controller 44 may be provided outside the imaging apparatus 12.

In the above embodiment, although the computer 82 is exemplified, the present disclosed technology is not limited to this, and a device including an ASIC, FPGA, and/or PLD may be applied instead of the computer 82. Further, instead of the computer 82, a combination of a hardware configuration and a software configuration may be used.

As a hardware resource for executing the imaging support processing described in the above embodiment, the following various processors can be used. Examples of the processor include software, that is, a CPU, which is a general-purpose processor that functions as a hardware resource for executing the imaging support processing by executing a program. Further, examples of the processor include a dedicated electric circuit, which is a processor having a circuit configuration specially designed for executing specific processing such as FPGA, PLD, or ASIC. A memory is built-in or connected to any processor, and each processor executes the imaging support processing by using the memory.

The hardware resource for executing the imaging support processing may be configured with one of these various processors or may be configured with a combination (for example, a combination of a plurality of FPGAs or a combination of a CPU and an FPGA) of two or more processors of the same type or different types. Further, the hardware resource for executing the imaging support processing may be one processor.

As an example of configuring with one processor, first, one processor is configured with a combination of one or more CPUs and software, and there is an embodiment in which this processor functions as a hardware resource for executing the imaging support processing. Secondly, as typified by SoC, there is an embodiment in which a processor that implements the functions of the entire system including a plurality of hardware resources for executing the imaging support processing with one IC chip is used. As described above, the imaging support processing is implemented by using one or more of the above-mentioned various processors as a hardware resource.

Further, as the hardware-like structure of these various processors, more specifically, an electric circuit in which circuit elements such as semiconductor elements are combined can be used. Further, the above-mentioned imaging support processing is only an example. Therefore, it goes without saying that unnecessary steps may be deleted, new steps may be added, or the processing order may be changed within a range that does not deviate from the purpose.

The contents described above and the contents shown in the illustration are detailed explanations of the parts related to the present disclosed technology and are only an example of the present disclosed technology. For example, the description related to the configuration, function, action, and effect described above is an example related to the configuration, function, action, and effect of a portion according to the present disclosed technology. Therefore, it goes without saying that unnecessary parts may be deleted, new elements may be added, or replacements may be made to the contents described above and the contents shown in the illustration, within the range that does not deviate from the purpose of the present disclosed technology. Further, in order to avoid complications and facilitate understanding of the parts of the present disclosed technology, in the contents described above and the contents shown in the illustration, the descriptions related to the common technical knowledge or the like that do not require special explanation in order to enable the implementation of the present disclosed technology are omitted.

In the present specification, "A and/or B" is synonymous with "at least one of A or B". That is, "A and/or B" means that it may be only A, it may be only B, or it may be a combination of A and B. Further, in the present specification, in a case where three or more matters are connected and expressed by "and/or", the same concept as "A and/or B" is applied.

All documents, patent applications, and technical standards described in the present specification are incorporated in the present specification by reference to the same extent in a case where it is specifically and individually described that the individual documents, the patent applications, and the technical standards are incorporated by reference.

What is claimed is:

1. An imaging support apparatus comprising:
a processor; and
a memory connected to or built into the processor,
wherein the processor is configured to:
acquire a type of a subject based on an image obtained by capturing an imaging range, which includes the subject, with an image sensor, and
output information indicating a division method for dividing a divided region, where the subject is divided to be identifiable from other regions in the imaging range, according to the acquired type,
the divided region being defined with a first direction and a second direction that intersects with the first direction,
the division method defining the number of divisions in the first direction and the number of divisions in the second direction, and
the number of divisions in the first direction and the number of divisions in the second direction being defined based on whether a subject image showing the subject has a composition with a sense of depth.

2. The imaging support apparatus according to claim 1, wherein the processor is configured to acquires, as the type, information related to a person, an animal, or a vehicle.

3. The imaging support apparatus according to claim 1, wherein the processor is configured to acquires, as the type, information related to a specific person, a face of the specific person, a specific automobile, a specific passenger plane, a specific bird, or a specific train.

4. The imaging support apparatus according to claim 1, wherein the processor is configured to acquire the type based on an output result, which is output from a trained model in which machine learning is performed by providing the image to the trained model.

5. The imaging support apparatus according to claim 4, wherein the trained model makes an object, which is within a bounding box applied to the image, belong to a corresponding class, and
the output result includes a value based on a probability that the object, which is within the bounding box applied to the image, belongs to a specific class.

6. The imaging support apparatus according to claim 5, wherein the output result includes a value based on a probability that the object, which is within the bounding box, belongs to a specific class in a case where a value, which is based on a probability that an object is present within the bounding box, is equal to or larger than a first threshold value.

7. The imaging support apparatus according to claim 5, wherein the output result includes a value equal to or larger than a second threshold value, among the values based on the probability that the object belongs to the specific class.

8. The imaging support apparatus according to claim 5, wherein the processor is configured to expand the bounding box in a case where a value, which is based on a probability that the object is present within the bounding box, is less than a third threshold value.

9. The imaging support apparatus according to claim 5, wherein the processor is configured to change a size of the divided region according to the value based on the probability that the object belongs to the specific class.

10. The imaging support apparatus according to claim 4, wherein a plurality of subjects is included in the imaging range,
the trained model makes each of a plurality of objects, which is within a plurality of bounding boxes applied to the image, belong to a corresponding class,
the output result includes object specific class information indicating each of the classes to which the plurality of objects, which is within the plurality of bounding boxes applied to the image, belongs, and
the processor is configured to narrow down at least one subject to be surrounded by the divided region from the plurality of subjects based on the object specific class information.

11. The imaging support apparatus according to claim 1, wherein in a case where a focus of a focus lens, which guides an incident light to the image sensor, is adjustable by moving the focus lens along an optical axis, the processor is configured to output information used for contributing to moving the focus lens to a focusing position corresponding to a division region obtained in accordance with the acquired type among a plurality of division regions obtained by dividing the divided region by the number of divisions in the first direction and the number of divisions in the second direction.

12. The imaging support apparatus according to claim 1, wherein in a case where a focus of a focus lens, which guides an incident light to the image sensor, is adjustable by moving the focus lens along an optical axis, the processor is configured to output information used for contributing to moving the focus lens to a focusing position obtained in accordance with the acquired type.

13. The imaging support apparatus according to claim 1, wherein the divided region is used for control related to imaging on the subject by the image sensor.

14. The imaging support apparatus according to claim 13, wherein the control related to the imaging includes custom type control,
the custom type control is control including at least one of post-standby focus control, subject speed allowable range setting control, or focus adjustment priority area setting control, and
the processor is configured to output information used for contributing to changing the custom type control according to the acquired type.

15. The imaging support apparatus according to claim 14, wherein the processor is configured to
further acquire a state of the subject based on the image, and
output the information used for contributing to changing the custom type control according to the acquired state and type.

16. The imaging support apparatus according to claim 15, wherein the state is the subject is being moved, the subject is being stopped, speed of movement of the subject, and/or a trajectory of movement of the subject.

17. The imaging support apparatus according to claim 14, wherein in a case where a focus of a focus lens, which guides an incident light to the image sensor, is adjustable by moving the focus lens along an optical axis, the post-standby focus control is control for moving the focus lens toward a focusing position, where the focus is set on the subject, after waiting for a predetermined time in a case where a position of the focus lens is out of the focusing position.

18. The imaging support apparatus according to claim 14, wherein in a case where a focus of a focus lens, which guides an incident light to the image sensor, is adjustable by moving the focus lens along an optical axis, the subject speed allowable range setting control is control for setting an allowable range of speed of the subject on which the focus is set.

19. The imaging support apparatus according to claim 14, wherein in a case where a focus of a focus lens, which guides an incident light to the image sensor, is adjustable by moving the focus lens along an optical axis, the focus adjustment priority area setting control is control for setting which area, among a plurality of areas in the divided region, is prioritized for adjustment of the focus.

20. The imaging support apparatus according to claim 1, wherein the divided region is a frame surrounding the subject.

21. The imaging support apparatus according to claim 20, wherein the processor is configured to
display a live view image based on the image, on a display, and
output information used for displaying the frame in the live view image.

22. The imaging support apparatus according to claim 20, wherein the processor is configured to adjust a focus of a focus lens, which guides an incident light to the image sensor, by moving the focus lens along an optical axis, and
the frame is a focus frame for defining an area as a candidate on which the focus is set.

23. An imaging apparatus comprising:
a processor;
a memory connected to or built into the processor; and
an image sensor,
wherein the processor is configured to;
- acquire a type of a subject based on an image obtained by capturing an imaging range, which includes the subject, with the image sensor, and
- output information indicating a division method for dividing a divided region, where the subject is divided to be identifiable from other regions in the imaging range, according to the acquired type,
- the divided region being defined with a first direction and a second direction that intersects with the first direction,
- the division method defining a number of divisions in the first direction and a number of divisions in the second direction, and
- the number of divisions in the first direction and the number of divisions in the second direction being defined based on whether a subject image showing the subject has a composition with a sense of depth.

24. An imaging support method comprising:
acquiring a type of a subject based on an image obtained by capturing an imaging range, which includes the subject, with an image sensor, and
outputting information indicating a division method for dividing a divided region, where the subject is divided to be identifiable from other regions in the imaging range, according to the acquired type,
the divided region being defined with a first direction and a second direction that intersects with the first direction,
the division method defining a number of divisions in the first direction and a number of divisions in the second direction, and
the number of divisions in the first direction and the number of divisions in the second direction being defined based on whether a subject image showing the subject has a composition with a sense of depth.

25. A non-transitory computer-readable storage medium storing a program executable by a computer to perform a process comprising:
acquiring a type of a subject based on an image obtained by capturing an imaging range, which includes the subject, with an image sensor, and
outputting information indicating a division method for dividing a divided region, where the subject is divided to be identifiable from other regions in the imaging range, according to the acquired type,
the divided region being defined with a first direction and a second direction that intersects with the first direction,
the division method defining a number of divisions in the first direction and a number of divisions in the second direction, and
the number of divisions in the first direction and the number of divisions in the second direction being defined based on whether a subject image showing the subject has a composition with a sense of depth.

* * * * *